US011716647B2

(12) United States Patent
Liu et al.

(10) Patent No.: US 11,716,647 B2
(45) Date of Patent: *Aug. 1, 2023

(54) SYSTEM AND METHOD FOR CHANNEL MEASUREMENT AND INTERFERENCE MEASUREMENT IN WIRELESS NETWORK

(71) Applicant: Huawei Technologies Co., Ltd., Shenzhen (CN)

(72) Inventors: Jialing Liu, Palatine, IL (US); Weimin Xiao, Hoffman Estates, IL (US); Qian Cheng, Naperville, IL (US); Ruiqi Zhang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/872,549

(22) Filed: Jul. 25, 2022

(65) Prior Publication Data

US 2022/0369148 A1 Nov. 17, 2022

Related U.S. Application Data

(63) Continuation of application No. 16/422,534, filed on May 24, 2019, now Pat. No. 11,399,299, which is a (Continued)

(51) Int. Cl.
*H04W 24/10* (2009.01)
*H04L 1/00* (2006.01)
(Continued)

(52) U.S. Cl.
CPC .......... *H04W 24/10* (2013.01); *H04L 1/0026* (2013.01); *H04L 5/0048* (2013.01);
(Continued)

(58) Field of Classification Search
CPC .... H04W 24/10; H04L 1/0026; H04L 5/0048; H04L 5/0057; H04L 5/007
See application file for complete search history.

(56) References Cited

U.S. PATENT DOCUMENTS

2013/0322376 A1 12/2013 Marinier et al.
2016/0344575 A1 11/2016 Gong et al.
(Continued)

FOREIGN PATENT DOCUMENTS

| CN | 106658584 A | 5/2017 |
| WO | 2016195335 A1 | 12/2016 |
| WO | 2019069227 A1 | 4/2019 |

OTHER PUBLICATIONS

3rd Generation Partnership Project; Technical Specification Group Radio Access Network; NR; Physical layer procedures for control (Release 15), 3GPP TS 38.213 V15.0.0, Dec. 2017, 56 pages.
(Continued)

*Primary Examiner* — Jackie Zuniga Abad
(74) *Attorney, Agent, or Firm* — Slater Matsil, LLP

(57) ABSTRACT

An embodiment method, by a user equipment (UE), includes performing a channel measurement (CM) on a first subset of a set of non-zero-power (NZP) CSI reference signal (CSI-RS) resources and an interference measurement (IM) on at least a second subset of the set of NZP CSI-RS resources. The second subset includes one or more NZP CSI-RS ports. The IM is performed according to assumptions: each NZP CSI-RS port in the second subset corresponds to an interference transmission layer, the IM being in accordance with a set of energy per resource element ratios each associated with one NZP CSI-RS resource in the second subset; and other interference not associated with the interference transmission layers is on the first and second subsets. The method includes generating a channel state information (CSI) report
(Continued)

based on the CM and IM and transmitting the CSI report to a network.

30 Claims, 25 Drawing Sheets

Related U.S. Application Data continuation of application No. PCT/US2018/061558, filed on Nov. 16, 2018.

(60) Provisional application No. 62/670,464, filed on May 11, 2018, provisional application No. 62/588,176, filed on Nov. 17, 2017.

(51) Int. Cl.
*H04L 5/00* (2006.01)
*H04L 25/02* (2006.01)

(52) U.S. Cl.
CPC .......... *H04L 5/0057* (2013.01); *H04L 5/0073* (2013.01); *H04L 5/001* (2013.01); *H04L 5/005* (2013.01); *H04L 5/0051* (2013.01); *H04L 5/0053* (2013.01); *H04L 25/02* (2013.01)

(56) References Cited

U.S. PATENT DOCUMENTS

| | | | |
|---|---|---|---|
| 2018/0183556 A1 | 6/2018 | Shin et al. | |
| 2018/0323923 A1 | 11/2018 | Wang et al. | |
| 2019/0058517 A1 | 2/2019 | Kang et al. | |
| 2019/0109626 A1* | 4/2019 | Park | H04B 7/0626 |
| 2020/0036457 A1 | 1/2020 | Yum et al. | |
| 2020/0245166 A1* | 7/2020 | Kwak | H04B 7/024 |
| 2020/0322022 A1 | 10/2020 | Gao et al. | |

OTHER PUBLICATIONS

Catt, "Details on interference measurement," 3GPP TSG RAN WG1 Meeting #90bis, R1-1717815, Prague, CZ, Oct. 9-13, 2017, 4 pages.

Huawei et al., "Advanced Link Adaptation for NR," 3GPP TSG RAN WG1 Meeting #85, R1-164382, May 23-27, 2016, Nanjing, China, 2 pages.

Huawei et al., "Channel and interference measurement for CSI acquisition," 3GPP TSG RAN WG1 Meeting #88bis, R1-1705072, Apr. 3-7, 2017, Spokane, USA, 8 pages.

Huawei et al., Channel and interference measurement for CSI acquisition, 3GPP TSG RAN WG1 Meeting #89, R1-1706927, May 15-19, 2017, Hangzhou, China, 12 pages.

Huawei et al., "Channel and interference measurement for CSI acquisition," 3GPP TSG RAN WG1 Meeting #91, R1-1719424, Nov. 27-Dec. 1, 2017, Reno, USA, 8 pages.

Huawei et al., "Consideration on interference measurement for downlink CSI acquisition," 3GPP TSG RAN WG1 Meeting # 88, R1-1701680, Feb. 13-17, 2017, Athens, Greece, 6 pages.

Huawei, Hisilicon, "Channel and interference measurement for CSI acquisition," 3GPP TSG RAN WG1 Meeting #90bis, R1-1717299, Prague, Czech Republic, Oct. 9-13, 2017, 6 pages.

Huawei, Hisilicon, "General framework for CSI acquisition and beam management," 3GPP TSG RAN WG1 Meeting #90, R1-1712226, Prague, Czech Republic, Aug. 21-25, 2017, 10 pages.

Huawei, Hisilicon, "Remaining issues on CSI measurement," 3GPP TSG RAN WG1 Meeting #92, R1 -1801451, Athens, Greece, Feb. 26-Mar. 2, 2018, 7 pages.

Huawei, Hisilicon,"Channel and interference measurement for CSI acquisition," 3GPP TSG RAN WG1 Meeting #90, RI-1712227, Prague, Czech Republic, Aug. 21-25, 2017, 9 pages.

"3rd Generation Partnership Project; Technical Specification Group Radio Access Network; NR; Physical layer procedures for data, (Release 15)," 3GPP TS 38.214, V1.0.0, Sep. 2017, 35 pages.

"3rd Generation Partnership Project; Technical Specification Group Radio Access Network; NR; Radio Resource Control (RRC): Protocol specification, (Release 15)," 3GPP TS 38.331, V0.1.0, Oct. 2017, 42 pages.

Spreadtrum Communications, "NZP CSI-RS for interference measurement", 3GPP TSG RAN WG1 Meeting 90bis, R1-1717754, Oct. 9-13, 2017, 5 pages, Prague, CZ.

Huawei et al., "WF on NZP CSI-RS based Interference measurement", 3GPP TSG RAN WG1 Meeting #90b, R1-1718986, Oct. 9-13, 2017, 5 Pages, Czech Republic.

Qualcomm Incorporated, "Clarification on supporting lower frequency domain density for Class A NZP CSI-RS", 3GPP TSG RAN WG1 Meeting #90bis, R1-1719079, Oct. 9-13, 2017, 6 Pages, Prague, Czechia.

ZTE, Sanechips, "Offline Summary of CSI measurement," 3GPP TSG RAN WG1 Meeting #90bis, R1-1719005, Prague, CZ, Oct. 9-13, 2017, 6 pages.

\* cited by examiner

SYSTEM AND METHOD FOR CHANNEL MEASUREMENT AND INTERFERENCE MEASUREMENT IN WIRELESS NETWORK

CROSS-REFERENCE TO RELATED APPLICATIONS

This application is a continuation of U.S. patent application Ser. No. 16/422,534, filed on May 24, 2019, now U.S. Pat. No. 11,399,299 issued on Jul. 26, 2022, entitled "System and Method for Channel Measurement and Interference Measurement in Wireless Network," which is a continuation of International Application No. PCT/US2018/061558, filed on Nov. 16, 2018, entitled "System and Method for Channel Measurement and Interference Measurement in Wireless Network," which claims priority to U.S. Provisional Application No. 62/588,176, filed on Nov. 17, 2017, entitled "System and Method for Channel Measurement and Interference Measurement in Wireless Network," and of U.S. Provisional Application No. 62/670,464, filed on May 11, 2018. The disclosures of the aforementioned applications are hereby incorporated by reference in their entireties.

TECHNICAL FIELD

This disclosure relates to systems and methods for wireless communications, and, in particular embodiments, to a system and method for channel measurement in wireless network.

BACKGROUND

Wireless communication systems include long term evolution (LTE), LTE-A, LTE-A-beyond systems, 5G LTE, 5G New Radio (NR), etc. A modern wireless communications system may include a plurality of NodeBs (NBs), which may also be referred to as base stations, network nodes, communications controllers, cells or enhanced NBs (eNBs), and so on. A NodeB may include one or more network points or network nodes using different radio access technologies (RATs) such as high speed packet access (HSPA) NBs or WiFi access points. A NodeB may be associated with a single network point or multiple network points. A cell may include a single network point or multiple network points, and each network point may have a single antenna or multiple antennas. A network point may correspond to multiple cells operating in multiple component carriers.

An eNB may be interconnected with another eNB via an X2 interface. An eNB may also be connected via an S1 interface to a Mobility Management Entity (MME) and to a Serving Gateway (S-GW). Additionally, a cell or NodeB may serve a number of users (also commonly referred to as User Equipment (UE), mobile stations, terminals, devices, and so forth) over a period of time. Network resources include a point, network point, transmission point (TP), transmission-reception point (TRP), node, network node, etc., to serve UE. Such network resources may be physically distributed or localized, and at a location there may be one or more sets of such resources (e.g., one or more network points). A network resource may act as a virtualized cell to a UE. The network or the UE may have multiple layers. Generally, Layer 1 is the physical (PHY) layer, Layer 2 is the medium access control (MAC) layer, Layer 3 the RRC layer, etc.

Generally speaking, in orthogonal frequency division multiplexing (OFDM) systems, the frequency bandwidth of the system is divided into multiple subcarriers in the frequency domain. In the time domain, one subframe is divided into multiple OFDM symbols. The OFDM symbol may have a cyclic prefix to avoid the inter-symbol interference caused by multi-path delays. One resource element (RE) is defined by the time/frequency resource within one subcarrier and one OFDM symbol. In a downlink transmission, reference signals (RSs) and other signals such as a data channel (e.g., a physical downlink shared channel (PDSCH)), a control channel (e.g., a physical downlink control channel (PDCCH)), and an enhanced PDCCH (EPDCCH) are orthogonal and multiplexed in different REs in the time/frequency domain. In an uplink transmission, physical uplink shared channel (PUSCH) and physical uplink control channel (PUCCH) are orthogonal and multiplexed in different time/frequency resources. A set of REs are grouped together to form a resource block (RB). For example, 12 subcarriers in a slot make up a RB.

Generally, to provide any data channels in either uplink (UL) or downlink (DL) transmissions such as PDSCH or PUSCH of an LTE-A system, reference signals are transmitted. There are reference signals for a UE to perform channel/signal estimation/measurements for demodulation of PDCCH and other common channels as well as for some measurements and feedback, which is the Common/Cell-specific Reference Signal (CRS) inherited from the Release 8/9 specification of Evolved Universal Terrestrial Radio Access (E-UTRA). A Dedicated/Demodulation Reference Signal (DMRS) may be transmitted together with the PDSCH channel in Release 10 of E-UTRA. DMRS is used for channel estimation during PDSCH demodulation. In Release 10, the Channel State Information Reference Signal (CSI-RS) is introduced in addition to CRS and DMRS. CSI-RS is used for Release 10 UEs to measure the channel status, especially for multiple antennas cases. PMI/CQI/RI and other feedback information may be based on the measurement of CSI-RS for Release 10 and beyond UEs. PMI is the precoding matrix indicator, CQI is the channel quantity indicator, and RI is the rank indicator of the precoding matrix. CSI-RS in Release 10 may support up to 8 transmission antennas while CRS may support up to 4 transmission antennas in Release 8/9. The number of CSI-RS antenna ports may be 1, 2, 4, or 8. In addition, to support the same number of antenna ports, CSI-RS has a lower overhead due to its low density in time and frequency.

A heterogeneous network (HetNet) comprises high power macro points and various lower power points that generally may share the same communication resources. The lower power points may include, but are not limited to, picos, micros, remote radio heads (RRHs), femtos (or home eNBs (HeNBs)), access points (APs), distributed antennas (DAs), relays, and near field communication points.

A network also may comprise several component carriers operating in different frequency bands. High frequency bands generally have a high pathloss over distance so they are more suitable to serve a relatively smaller area, such as being used for high throughput purposes for nearby UEs. Low frequency bands generally have low pathloss over distance so they are more suitable to serve a relatively large area, such as being used for providing coverage.

SUMMARY

According to one aspect of this disclosure, a method, by a user equipment (UE) for wireless communications, includes performing a channel measurement associated with a channel state information (CSI) report on a first subset of a set of non-zero-power (NZP) CSI reference signal (CSI- RS) (NZP CSI-RS) resources. The method further includes performing an interference measurement associated with the CSI report on at least a second subset of the set of NZP CSI-RS resources. The second subset of the set of NZP CSI-RS resources includes one or more NZP CSI-RS ports. The interference measurement is performed according to assumptions comprising that: each NZP CSI-RS port in the second subset of the set of NZP CSI-RS resources corresponds to an interference transmission layer, the interference measurement being in accordance with a set of energy per resource element (EPRE) ratios each associated with one NZP CSI-RS resource in the second subset of the set of NZP CSI-RS resources; and other interference not associated with an interference transmission layer to which an NZP CSI-RS port in the second subset of the set of NZP CSI-RS resources corresponds is on the first subset of the set of NZP CSI-RS resources and the second subset of the set of NZP CSI-RS resources. The method further includes generating the CSI report based on the channel measurement and interference measurement and transmitting the CSI report to a network.

Optionally, in any of the preceding aspects, the CSI report includes at least a channel quality indicator (CQI) but not a precoding matrix indicator (PMI).

Optionally, in any of the preceding aspects, each EPRE ratio in the set of EPRE ratios that are each associated with one NZP CSI-RS resource in the second subset of the set of NZP CSI-RS resources specifies an assumed ratio of a physical downlink shared channel (PDSCH) EPRE to an EPRE of an NZP CSI-RS signal on the NZP CSI-RS resource.

Optionally, in any of the preceding aspects, the method further includes receiving a configuration of a set of resources for CSI interference measurement (CSI-IM) and the assumptions according to which the interference measurement is performed further include that other interference not associated with an interference transmission layer to which an NZP CSI-RS port in the second subset of the set of NZP CSI-RS resources corresponds is on the set of resources for CSI-IM.

Optionally, in any of the preceding aspects, the method further includes receiving a configuration of measurement restriction associated with channel measurement.

Optionally, in any of the preceding aspects, the method further includes receiving a configuration of measurement restriction associated with interference measurement.

Optionally, in any of the preceding aspects, the first subset of the NZP CSI-RS resources and the second subset of the NZP CSI-RS resources overlap.

Optionally, in any of the preceding aspects, the method further includes receiving, by the UE from a network node, an indication of the set of NZP CSI-RS resources for the channel measurement and the interference measurement. The indication indicates the first subset of the NZP CSI-RS resources and the second subset of the NZP CSI-RS resources.

Optionally, in any of the preceding aspects, the network node includes a NodeB, an evolved NodeB (eNB), or a next generation NodeB (gNB).

Optionally, in any of the preceding aspects, the UE receives from the network node the indication of the first subset of the NZP CSI-RS resources and the second subset of the NZP CSI-RS resources via downlink control information (DCI).

Optionally, in any of the preceding aspects, the UE receives from the network node the indication of the first subset of the NZP CSI-RS resources and the second subset of the NZP CSI-RS resources via a combination of downlink control information (DCI) and media access control (MAC) signaling.

Optionally, in any of the preceding aspects, the DCI provides a dynamic triggering of one or more CSI reporting settings.

According to another aspect of this disclosure, a device (e.g., a user equipment (UE)), includes one or more processors and a non-transitory computer-readable storage medium storing programming for execution by the one or more processors, the programming includes instructions to perform the method in any of the preceding aspects.

According to another aspect of this disclosure, a non-transitory computer-readable storage medium stores programming for execution by one or more processors, the programming including instructions to perform the method in any of the preceding aspects.

According to another aspect of this disclosure, an apparatus (e.g., a user equipment (UE)) for wireless communication includes means for performing a channel measurement associated with a channel state information (CSI) report on a first subset of a set of non-zero-power (NZP) CSI reference signal (CSI-RS) (NZP CSI-RS) resources. The apparatus further includes means for performing an interference measurement associated with the CSI report on at least a second subset of the set of NZP CSI-RS resources. The second subset of the set of NZP CSI-RS resources includes one or more NZP CSI-RS ports. The interference measurement performed according to assumptions comprising that: each NZP CSI-RS port in the second subset of the set of NZP CSI-RS resources corresponds to an interference transmission layer, the interference measurement being in accordance with a set of energy per resource element (EPRE) ratios each associated with one NZP CSI-RS resource in the second subset of the set of NZP CSI-RS resources; and other interference not associated with an interference transmission layer to which an NZP CSI-RS port in the second subset of the set of NZP CSI-RS resources corresponds is on the first subset of the set of NZP CSI-RS resources and the second subset of the set of NZP CSI-RS resources. The apparatus further includes means for generating the CSI report based on the channel measurement and interference measurement and means for transmitting the CSI report to a network.

According to another aspect of this disclosure, a method, by a network node for wireless communications, includes indicating, by the network node to a user equipment (UE), a set of non-zero-power (NZP) channel state information (CSI) reference signal (CSI-RS) (NZP CSI-RS) resources for channel measurement and interference measurement. A first subset of the set of NZP CSI-RS resources are configured for channel measurement, and a second subset of the set of NZP CSI-RS resources are configured for interference measurement. The method further includes receiving, by the network node, a CSI report from the UE. The CSI report is based on the channel measurement and interference measurement, the channel measurement having been performed by the UE on the first subset of the set of NZP CSI-RS resources and the interference measurement having been performed by the UE on the second subset of the set of NZP CSI-RS resources and according to assumptions comprising that: each NZP CSI-RS port in the second subset of the set of NZP CSI-RS resources corresponds to an interference transmission layer, the interference measurement being in accordance with a set of energy per resource element (EPRE) ratios each associated with one NZP CSI-RS resource in the second subset of the set of NZP CSI-RS resources; and other interference not associated with an interference transmission layer to which an NZP CSI-RS port in the second subset of the set of NZP CSI-RS resources corresponds is on the first subset of the set of NZP CSI-RS resources and the second subset of the set of NZP CSI-RS resources.

Optionally, in any of the preceding aspects, the CSI report includes at least a channel quality indicator (CQI) but not a precoding matrix indicator (PMI).

Optionally, in any of the preceding aspects, each EPRE ratio in the set of EPRE ratios that are each associated with one NZP CSI-RS resource in the second subset of the set of NZP CSI-RS resources specifies an assumed ratio of a physical downlink shared channel (PDSCH) EPRE to an EPRE of an NZP CSI-RS signal on the NZP CSI-RS resource.

Optionally, in any of the preceding aspects, the method further includes indicating, by the network node to the UE, a configuration of a set of resources for CSI interference measurement (CSI-IM) and the assumptions according to which the interference measurement is performed further comprise that other interference not associated with an interference transmission layer to which an NZP CSI-RS port in the second subset of the set of NZP CSI-RS resources corresponds is on the set of resources for CSI-IM.

Optionally, in any of the preceding aspects, the method further includes indicating, by the network node to the UE, a configuration of measurement restriction associated with channel measurement.

Optionally, in any of the preceding aspects, the method further includes indicating, by the network node to the UE, a configuration of measurement restriction associated with interference measurement.

Optionally, in any of the preceding aspects, the network node comprises a NodeB, an evolved NodeB (eNB), or a next generation NodeB (gNB).

Optionally, in any of the preceding aspects, the first subset of the NZP CSI-RS resources and the second subset of the NZP CSI-RS resources overlap.

Optionally, in any of the preceding aspects, the network node indicates to the UE the first subset of the NZP CSI-RS resources and the second subset of the NZP CSI-RS resources via downlink control information (DCI).

Optionally, in any of the preceding aspects, the network node indicates to the UE the first subset of the NZP CSI-RS resources and the second subset of the NZP CSI-RS resources via a combination of downlink control information (DCI) and media access control (MAC) signaling.

Optionally, in any of the preceding aspects, the DCI provides a dynamic triggering of one or more CSI reporting settings.

According to another aspect of this disclosure, a device (e.g., a network node), includes one or more processors and a non-transitory computer-readable storage medium storing programming for execution by the one or more processors, the programming includes instructions to perform the method in any of the preceding aspects.

According to another aspect of this disclosure, a non-transitory computer-readable storage medium stores programming for execution by one or more processors, the programming including instructions to perform the method in any of the preceding aspects.

According to another aspect of this disclosure, an apparatus (e.g., a network node) for wireless communications, includes means for indicating, to a user equipment (UE), a set of non-zero-power (NZP) channel state information (CSI) reference signal (CSI-RS) (NZP CSI-RS) resources for channel measurement and interference measurement. A first subset of the set of NZP CSI-RS resources are configured for channel measurement, and a second subset of the set of NZP CSI-RS resources are configured for interference measurement. The apparatus further includes means for receiving a CSI report from the UE. The CSI report is based on the channel measurement and interference measurement, the channel measurement having been performed by the UE on the first subset of the set of NZP CSI-RS resources and the interference measurement having been performed by the UE on the second subset of the set of NZP CSI-RS resources and according to assumptions comprising that: each NZP CSI-RS port in the second subset of the set of NZP CSI-RS resources corresponds to an interference transmission layer, the interference measurement being in accordance with a set of energy per resource element (EPRE) ratios each associated with one NZP CSI-RS resource in the second subset of the set of NZP CSI-RS resources; and other interference not associated with an interference transmission layer to which an NZP CSI-RS port in the second subset of the set of NZP CSI-RS resources corresponds is on the first subset of the set of NZP CSI-RS resources and the second subset of the set of NZP CSI-RS resources.

Embodiments of this disclosure may provide one or more technical advantages. In certain embodiments, configuring NZP CSI-RS resources for interference measurement provides improved link adaptation performance. Certain embodiments facilitate use of a higher spectrum frequency. Certain embodiments provide improved performance that is suitable for use with multiple-input and multiple-output (MIMO) and massive MIMO systems. Link adaptation according to certain embodiments of this disclosure allows interference measurement resources at a time, n, to reflect multi-user interference at a time n+k, with a channel measurement resource of a first UE being an interference measurement resource of a second UE, which may be advantageous in a multi-user MIMO system. Certain embodiments may improve performance in an interference limited network, wherein the inter-cell interference is strong and/or with significant fluctuation, carrier aggregation/channel aggregation, and in coverage enhancement.

Certain embodiments of the present disclosure may provide some, all, or none of the above advantages. Certain embodiments may provide one or more other technical advantages, one or more of which may be readily apparent to those skilled in the art from the FIGS., descriptions, and claims included in this disclosure.

BRIEF DESCRIPTION OF THE DRAWINGS

For a more complete understanding of this disclosure, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are described in detail below. It should be appreciated, however, that this disclosure provides many applicable inventive concepts that may be embodied in a wide variety of specific contexts. The specific embodiments described are merely illustrative of specific ways to make and use the disclosure, and do not limit the scope of the disclosure.

Various embodiments are motivated by one or more issues emerging from wireless networks as described below. A network point in a wireless network may be turned on or off based on traffic demand, energy constraints, emission constraints, quality of service (QoS) constraints, interference management purposes, or other suitable factors. One embodiment solution for handling such an event is based on UL Transition Request Signals (TRS) sent by a group of UEs so that the network may determine whether it is beneficial to turn on a turned-off network point.

Figure 1:
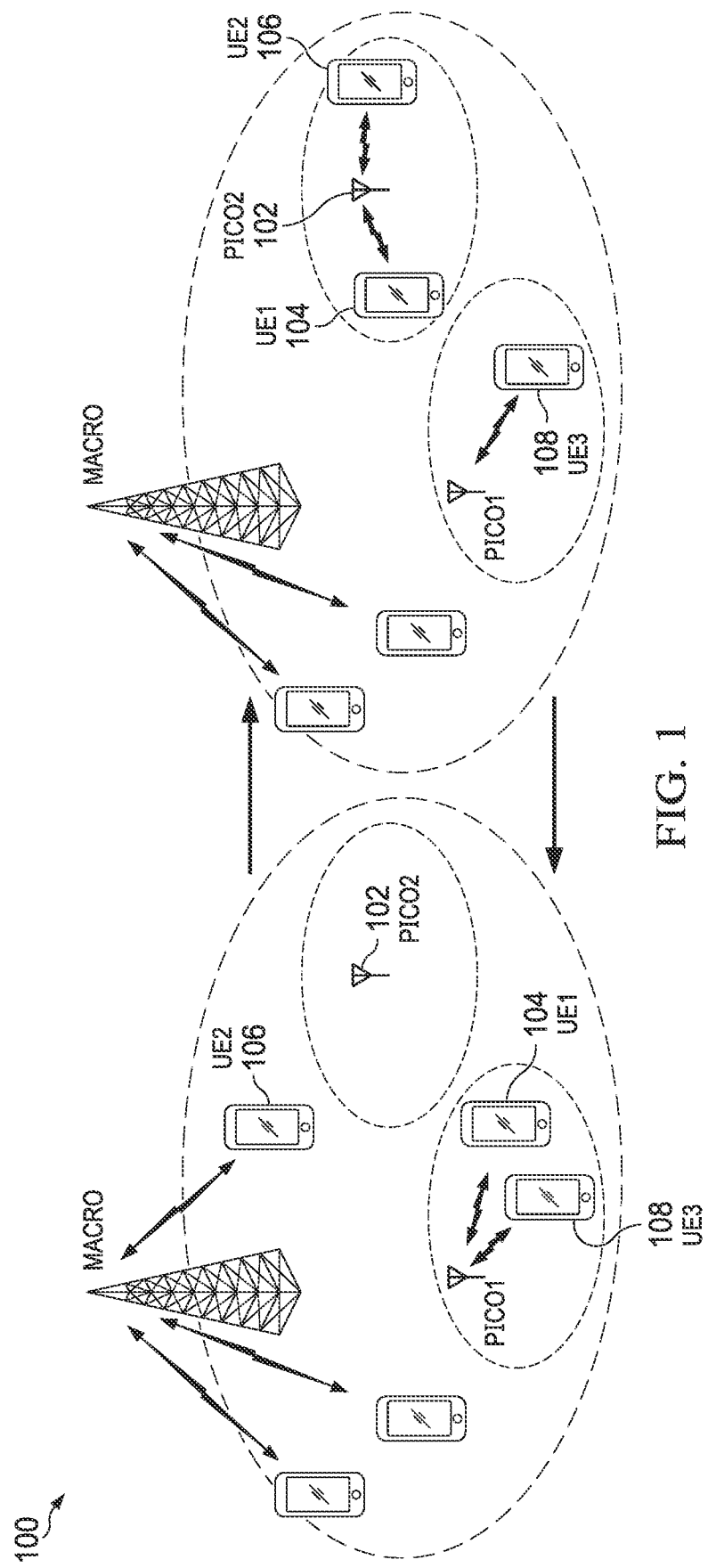
FIG. 1 illustrates an example system for turning on or off a network point, according to certain embodiments of this disclosure.

FIG. 1 illustrates an example system 100 for turning on or off a network point, according to certain embodiments of this disclosure. In the illustrated example, if it is decided that Picot 102 is to be turned on or off, UE1 104 and UE2 106, which are both in the Picot 102 coverage area, may be affected, as well as UE3 108, which is not in the Picot 102 coverage area but is not far from Picot 102. UE1 104 and UE2 106 may be configured to measure and report Pico2's RS and may hand over to Picot 102. In other words, it may be appropriate to reconfigure UE1 104 and UE2 106 based on Pico2's RS. UE3 108 may see increased PDSCH interference, which may be statistically or qualitatively different from the interference previously seen by UE 108. In one example, rather than being due to the normal fluctuations of interference, this increased interference seen by UE3 108 may signify, at least in part, a sudden change of UE3's interference condition, which may entail special handling. It may be appropriate to change or reconfigure UE3 108 channel state information (CSI) (e.g., CQI/PMI/RI) and radio resource management (RRM)/radio link monitoring (RLM) measurement processes and reports. The network may adjust or fine tune parameters before, during, and/or after the transition. The network may evaluate the impact of network reconfiguration. Further, the network may send reconfiguration signals to a UE and/or an eNB to facilitate UE reconfiguration. In general, when a configuration of a network point or carrier undergoes a transition, the transition may affect multiple other network points or carriers and multiple UEs such that it may be appropriate to reconfigure the network points, carriers, or UEs. A procedure to prepare for, support, and handle the transition and reconfiguration may be desirable.

Figure 2:
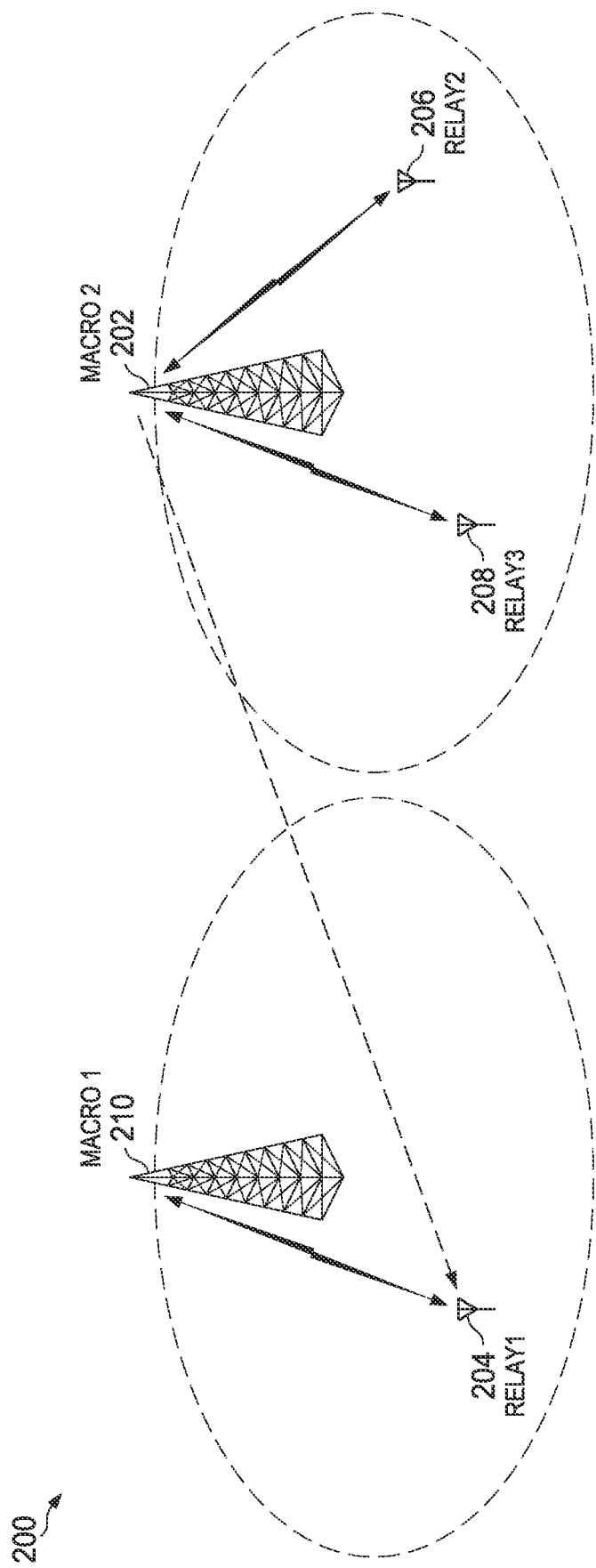
FIG. 2 illustrates an example system in interference from an eNB to a relay exists, according to certain embodiments of this disclosure.

FIG. 2 illustrates an example system 200 in interference from an eNB to a relay exists, according to certain embodiments of this disclosure. In the illustrated example, interference by Macro2 202 to reception by Relay1 204 may increase if Macro2 202 changes its backhaul transmission (Tx) activities. For example, interference may increase if the precoding by Macro2 202 drifts beyond a threshold after some time, if backhaul Tx turns on or off due to traffic pattern changes, or if Macro2 202 switches from Tx to Relay2 206 to Tx to Relay3 208 due to traffic pattern changes or other changes. These are examples of the network experiencing a transition, which may lead to a chain reaction to multiple network nodes (e.g., multiple network nodes seeing sudden interference condition changes) for a period of time. As a result of, or in anticipation of, the interference jump, Macro5 210 may adjust its transmission to Relay1 204. This adjustment may further cause changes of interference from Macro1 210 to other Macro transmissions. For example, it may be appropriate for Macro2 202 to further adjust (e.g., fine tune) its transmission to Relay2 206 and/or Relay3 208. This chain reaction of sudden interference jumps may lead the network to adjust its configurations for a period of time. The effect of the adjustments may be difficult to predict unless the adjustments are actually put into test in the network. Therefore, an efficient way to support the adjustments without significantly affecting normal data transmissions may be desirable.

As another example, algorithms and procedures proposed for network optimization may be based on iterations among multiple network nodes, and sometimes multiple UEs are also involved. One example involves the joint optimization of cell attachment and resource allocation, which may be difficult to carry out in general and is often performed suboptimally in an iterative fashion. A suboptimal solution may assume a fixed cell attachment, and then a presumed optimal resource allocation for the given cell attachment may be computed. The given resource allocation may be assumed, and the cell attachment may be further updated. These procedures may be iterated until optimization is achieved or for some maximum number of iterations. Such iterations, however, may lead to complexity and unwanted fluctuations that are not desirable for data (e.g., PDSCH) transmissions. For example, sometimes such an iterative algorithm may not generate the desired performance or behavior in a number of iterations. The network configuration obtained after several iterations may be discarded in such a case, and the network may revert back to the original network configuration. When this situation occurs, the normal data transmissions between multiple network nodes and multiple UEs may be significantly affected. Therefore, it may be desirable to separate the resources and processes for normal data transmission from the iterative probing, optimization, reconfiguration, and adjustment actions. When the iteration achieves convergence on the probing resources with the desired or acceptable performance or behavior, the attained configurations may then be applied to PDSCH transmissions.

The above and similar issues may be summarized as follows. A network component may often adapt its activity or go through transitions. For example, it may be appropriate for a network node, carrier, or antenna set to transition from an activity level (e.g., with reduced transmission power) or a state (e.g., a dormant state) to a different activity level (e.g., with full transmission power) or a different state (e.g., an active state) when traffic, interference, or other conditions change. As an example, a dormant network node may be turned on when a UE enters the coverage range of the network node. The reconfiguration of a first network node may affect a number of network nodes and UEs, potentially including the first network node itself, thus generating transient dynamics for a period of time. The impact of the transition or adaptation may be evaluated by multiple network nodes and/or UEs before, during, and/or after the transition or adaptation occurs. The procedure may iterate, where the network node(s) and UEs further adjust or fine tune their configurations. When a network node experiences or foresees a transition, the network node may signal its UEs and other network nodes regarding the transition so that the UEs and other network nodes may know when to further adapt. Several aspects of this general procedure are described below.

Interference Jump and Reconfiguration Signal to UE

In FIG. 1, when Picot 102 starts to transmit PDSCH at time t, UE3 108 may see increased PDSCH interference statistically or qualitatively different from before. This interference condition change may be different from normal interference fluctuations. Typically UE3 108 performs layer 1 filtering for its CQI, interference, Reference Signal Received Quality (RSRQ), etc. For example, It=f It−1+(1−f) it −1 may be used for interference filtering, where it−1 is the instantaneous measurement at time t−1, and It−1 is the filtered measurement at time t−1, and f is the filter constant, normally 0.7-0.99. It may take a while for the filter to converge to the new interference condition, particularly if the interference measurement is based on CSI interference measurement (CSI-IM) resources, which are sparse in time.

For example, if the filter constant f is 0.9, then the filter time constant is 9.5 samples. In a particular example, it takes approximately 2 to approximately 3 times the time constant for the filter to settle to approximately 85% to approximately 95% of new filtered values. In other words, in some scenarios, CRS-based interference measurements take about 19 milliseconds (ms) to about 28 ms to settle. Similar computations may show that CSI-IM resource-based measurements take about 95 ms to about 142 ms to settle if the CSI-IM resource has a period of 5 ms, (e.g., once in 5 ms). The CSI-IM resource-based measurements take about 190 ms to about 285 ms (or about 380 ms to about 570 ms, or about 760 ms to about 1140 ms, respectively) to settle if the CSI-IM resource has a period of 10 ms (or 20 ms, or 40 ms, respectively). These delays may cause the network to respond slowly to the interference jump, and the long transient period may see some degradation of user experience. In particular, CQI/PMI/RI feedback and/or RSRQ measurements may be affected, causing mismatches in CQI and RSRQ, and hence the transmission to the UE may become less efficient. A smaller filter constant f may be chosen to reduce the latency, but sensitivity to normal fluctuations may be too great if the smaller filter constant is used. Therefore, a reconfiguration signal sent by the network to a UE to notify the UE of a change of measurement conditions may facilitate UE reconfiguration and network operations. For example, the UE may reset its filter state upon receiving the signal (e.g., the UE may restart the CSI-IM resource-based measurement process), or the UE may adjust its filter constant to a smaller value. If the UE is signaled to adjust its filter constant to a smaller value, the UE may receive another signal later indicating the completion of the transition or reconfiguration, and the UE may adjust its filter to the original value. In other words, the network may use reconfiguration signals to configure the UE to adapt the filter according to environment changes.

A UE performs layer 3 filtering for Reference Signal Received Power (RSRP) and RSRQ (Received Signal Strength Indicator (RSSI)). In some scenarios, the accuracy of RSRP layer 3 filtering may be affected when an interference condition changes, although it may or may not be appropriate to reset the RSRP layer 3 filtering when an interference condition changes. For example, when the interference level is normal, RSRP accuracy may be at a first level. When the interference jumps to a much higher level, RSRP accuracy may degrade to a second level. It may be useful for the network and UE to know and incorporate the performance changes due to network condition changes, so that the UE may adapt its RSRP estimate and filtering according to interference condition changes. Additionally or alternatively, RSRQ layer 3 filtering may be reset when an interference condition changes. A typical input period to layer 3 filtering is about 40 ms, and a default time constant is about 1.5 input sample durations, so about 2 to about 3 times of the time constant is about 3 to about 4 input sample durations (about 120 ms to about 160 ms). Therefore, if the interference condition takes a sudden jump at a time close to the RSRQ/RSSI reporting time, then the reported RSRQ/RSSI may not reflect the actual interference condition. To facilitate the process, a signal to indicate the reset or reconfiguration may be used. If a reset is needed in layer 3 operations, a rule may be created wherein, upon receiving a reconfiguration signal, the UE resets its layer 3 filter or temporarily adjusts its filter coefficient.

The above-described layer 3 related values may be computed based on Third Generation Partnership Project (3GPP) Technical Specification (TS) 36.331, which is hereby incorporated herein by reference in its entirety. In TS 36.331, the information element (IE) FilterCoefficient specifies the measurement filtering coefficient. Value fc0 corresponds to k=0, fc1 corresponds to k=1, and so on.

RSRQ/RSSI estimation, filtering, and/or reporting. For example, the network may allow a node to be turned on or off at a fixed offset from the 200 ms-period RSRQ/RSSI reporting or during a specified time interval different from the RSRQ/RSSI reporting.

An eNB may send a network reconfiguration signal to a UE with a specific timing and associated with a CSI process configuration, CSI-RS resource configuration, and/or CSI-IM resource configuration. UEs very close to the network node that made the transition are likely to be configured to receive CSI-RS from that network node. UEs very far from the network node that made the transition are likely not to be affected by the transition. It may be appropriate to reconfigure UEs that are in between being very close to or very far from the network node. Upon reception of the reconfiguration signal, UE actions may include resetting filter states for interference estimation, CSI measurements, and RSRQ measurements, and adjusting estimation and/or filtering parameters to adapt to an interference condition change. UEs may also start a new signal or interference measurement process, stop a signal or interference measurement process, perform handover to another point or carrier, etc. For brevity, IM is for interference measurement, IMR is for IM resource, CM is for (intended) channel measurement, and CMR is for CM resource.

If an eNB does not send a network reconfiguration signal to a UE to initiate a reconfiguration, the UE may assume a reconfiguration is appropriate when its CSI-RS resources or CSI-IM resources or CSI processes (e.g., for a coordinated

```
FilterCoefficient information element    -- ASN1START
FilterCoefficient ::= ENUMERATED {fc0, fc1, fc2, fc3, fc4, fc5, fc6, fc7, fc8, fc9,
fc11, fc13, fc15, fc17, fc19, spare1, ...}
-- ASN1STOP
    QuantityConfigEUTRA ::=                           SEQUENCE {
        filterCoefficientRSRP     FilterCoefficient       DEFAULT fc4,
        filterCoefficientRSRQ     FilterCoefficient       DEFAULT fc4}.
```

The measured result is filtered, before being used for evaluation of reporting criteria or for measurement reporting, by the following formula:

$$F_n = (1-a) \cdot F_{n-1} + a \cdot M_n$$

where

Mn is the latest received measurement result from the physical layer;

Fn is the updated filtered measurement result that is used for evaluation of reporting criteria or for measurement reporting;

Fn−1 is the old filtered measurement result, where F0 is set to M1 when the first measurement result from the physical layer is received; and a=½(k/4), where k is the filterCoefficient for the corresponding measurement quantity received by the quantityConfig.

The filter may be adapted such that the time characteristics of the filter are preserved at different input rates, observing that the filterCoefficient k assumes a sample rate equal to 200 ms.

Thus, a UE may adapt estimation and/or filtering characteristics based on the received reconfiguration signals. Additionally or alternatively, since the network has information about the UE's RSRQ/RSSI estimation, filtering, and/or reporting configurations, the network may coordinate the network components so that a sudden interference change may occur at certain times depending on the timing of the multipoint (CoMP) set) are reconfigured, such as modified, removed, or added. Generally, assuming a goal of restarting the measurement process on the same resources, then reconfiguring a CSI process, CSI-RS resource, and CSI-IM resource to achieve that goal may lead to higher overhead than sending a reconfiguration signal, which may achieve the same goal. However, if there is a timing pattern for the restart of the measurement process, a timing window may be signaled or defined so that the UE may restart the measurement process at the end of each timing window.

In addition to the overhead concern described above, problems may arise if a UE attempts to interpret a signal as a measurement reset signal or a filter reconfiguration signal. In other words, there may be situations where an explicit measurement reset signal or filter reconfiguration signal is desirable. For example, for some UEs, using the CSI-RS resource configuration change signal, or CSI-IM resource configuration change signal, or CSI process configuration change signal, as a network reconfiguration signal may cause problems. If a UE moves, its CSI-RS resources may naturally update, and its interference condition may not have any abrupt change, so there may not be always a need to reset its measurement process or reconfigure the filtering parameters and so on, even if the UE's CSI-RS resource configuration is updated. A neighboring UE may, in some scenarios, not experience any CSI-RS resource change, but may still experience a significant interference condition change when a network transition occurs. Therefore, cases exist in which the configuration of CSI-RS resources, or CSI-IM resources, or CSI processes may be updated, but in which it may not be appropriate for the measurement process to be reset or the filter to be reconfigured. Cases in which the CSI-RS resources, and CSI-IM resources, and CSI processes are not updated, but in which there may be a need for the measurement process to be reset or the filter to be reconfigured, also may exist.

The reconfiguration signal may or may not be the same as the transition decision signal (see, e.g., the signal in Step 304 of FIG. 3, described in greater detail below). For example, in one scenario, the transition decision signal may turn on only CRS/CSI-RS transmissions. Whether PDSCH transmissions will occur (which may lead to more interference than RS transmissions alone) may depend on other factors such as CSI feedback and scheduling. An eNB may send the reconfiguration signal if the eNB changes its PDSCH activity levels significantly, such as turning on PDSCH based on UE CSI feedback. In other words, the transition decision and the sudden interference jump may occur at different times, despite there being some connection between the transition decision and the sudden interference jump. Separating the reconfiguration signal from the transition decision signal may also reduce or prevent system oscillation. For example, after an eNB's transition from a dormant state to an active state, the eNB may receive UE measurement feedback reports and may decide not to serve the UEs and may even turn off. In such a case, it may or may not be appropriate for neighboring eNBs to signal their UEs for reconfiguration and/or to reset their filters. The reconfiguration signal may be signaled by an upper layer or in the PDCCH or EPDCCH or in a common channel. Timing information may also be sent with the reconfiguration signal to indicate when the reconfiguration will be in effect.

Transition Adjustment Period

A network component may often adapt its activity or go through transitions. When a network node experiences or foresees a transition, the network node may signal its UEs and other network nodes regarding the transition so that the UEs and other network nodes may know when and how to adapt. This signaling may trigger transient dynamics for a period of time called the Transition Adjustment Period, some procedures of which are described in detail below.

An eNB may send a network reconfiguration signal to neighboring eNBs. Upon reception of the reconfiguration signal, the neighboring eNBs' actions may include reconfiguring their UEs for CSI-RS resources, CSI-IM resources, and/or CSI processes, receiving their UE CSI/RRM/RLM reports, and changing their transmissions/receptions and/or their UE associations/configurations. The effect of an eNB having made the transition is evaluated by the network. In some scenarios, the eNBs further adjust their transmissions/receptions and their UE associations/configurations until convergence occurs or according to one or more exit rules.

A transition at an eNB may cause multiple eNBs to further adjust their transmissions/receptions and their UE associations/configurations until convergence occurs. The above-described steps may form a procedure for the network to adjust or fine tune after a transition, and this procedure may be referred to as a Transition Adjustment Process. It may be appropriate to inform a set of eNBs and UEs about this process. The process may be performed on a specific subset of resources (e.g., probing resources, as described below) or on all relevant resources. Whether the process is performed on probing resources only (which may be a subset of time/frequency resources), or on a larger scale of resources, may be indicated in the reconfiguration signal.

Figure 3:
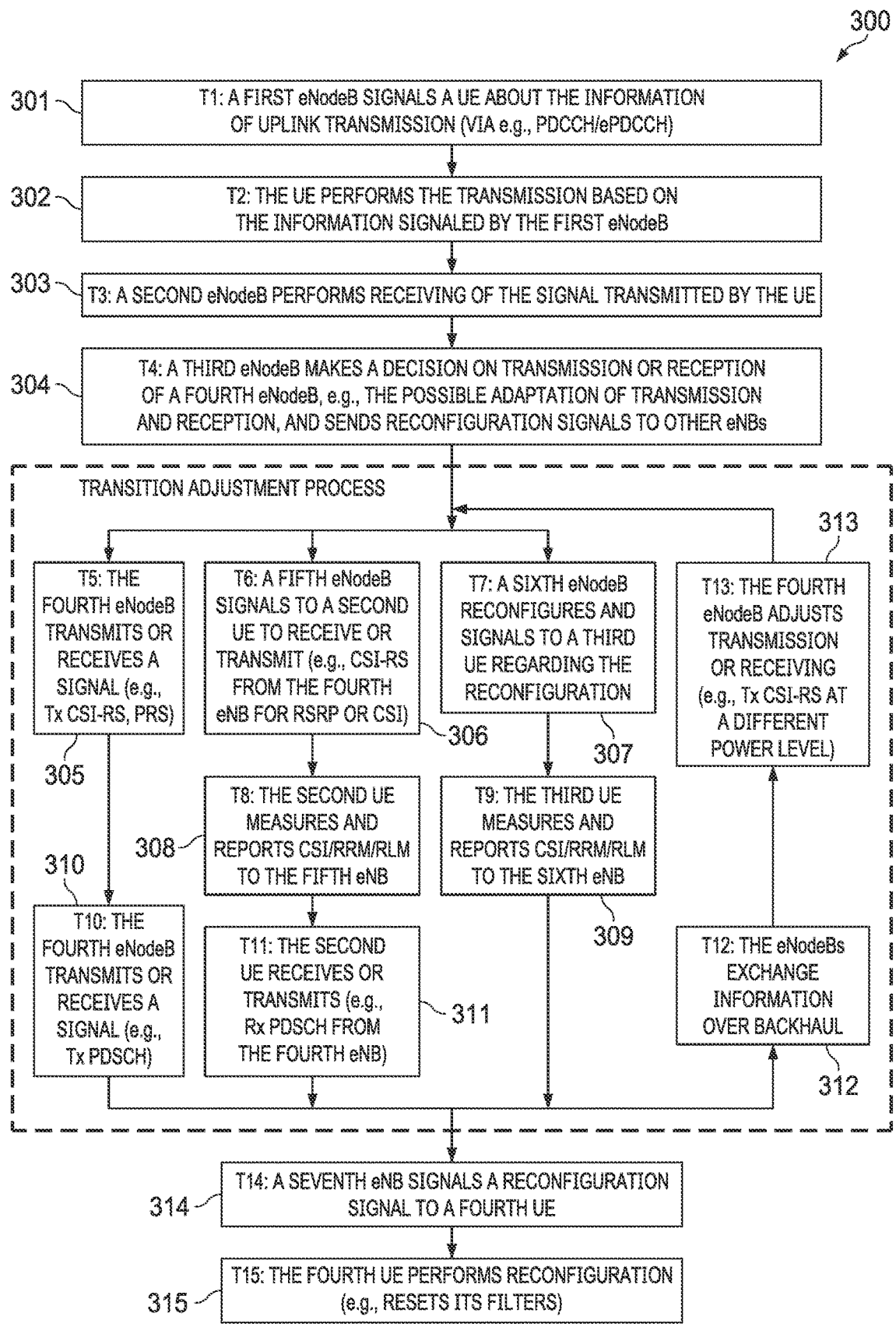
FIG. 3 illustrates method of Transition Adjustment Process, according to certain embodiments of this disclosure.

FIG. 3 illustrates method 300 of Transition Adjustment Process, according to certain embodiments of this disclosure. In step 301, a first eNB signals a UE about the information of an uplink transmission (via, e.g., PDCCH or EPDCCH). In step 302, the UE performs the transmission based on the information signaled by the first eNB. In step 303, a second eNB performs receiving of the signal transmitted by the UE. In step 304, a third eNB makes a decision on transmission or reception of a fourth eNB, e.g., the possible adaptation of transmission and reception, and sends reconfiguration signals to other eNBs.

As part of the Transition Adjustment Process, in step 305, the fourth eNB transmits or receives a signal (e.g., Tx CSI-RS, a positioning reference signal (PRS), or other reference signals). In other words, the fourth eNB may be a turned-off eNB that is starting to turn on, or more generally, the fourth eNB may be a network entity going through a transition such as on/off, power adaptation, carrier adaptation, or carrier type adaptation. In step 310 (generally at the end of the Transition Adjustment Process), the fourth eNB transmits or receives a signal (e.g., Tx PDSCH or other data carrying signals). In other words, the fourth eNB may start to serve UEs and engage in data communications, and the transition involving the fourth eNB may be complete.

In step 306, which may be done in parallel to step 305, a fifth eNB signals to a second UE to receive or transmit (e.g., CSI-RS from the fourth eNB, which has been transmitted starting in step 305, for RRM (RSRP/RSRQ) or CSI measurements). In step 308, the second UE measures and reports CSI/RRM/RLM to the fifth eNB. At this moment, the second UE is not connected to the fourth eNB, so the communication (of either control information or data) may take place with the fifth eNB. In step 311, the second UE receives (Rx) or transmits (e.g., Rx PDSCH from the fourth eNB, if the measurement reports associated with the fourth eNB led to such a decision) as a result of the Transition Adjustment Process. In general, the fifth eNB and the second UE may be close to the fourth eNB, which is going through the transition, and the fifth eNB and the second UE may be affected by the transition. For example, the second UE may become connected to and served by the turning-on fourth eNB, and the fifth eNB may participate in the process of connecting the second UE with the fourth eNB.

In step 307, a sixth eNB reconfigures and signals to a third UE regarding the reconfiguration. In step 309, the third UE measures and reports CSI/RRM/RLM to the sixth eNB. In general, the sixth eNB and the third UE may not be close to the fourth eNB, which is going through the transition process, so the sixth eNB and the third UE may not be as greatly affected as the components described in steps 306/308/311, but the sixth eNB and the third UE may still be affected as the third UE experiences interference transition when the fourth eNB is turning on. To cope with the interference change or in anticipation of this change, reconfiguration of the sixth eNB and the third UE may be done as shown in steps 307/309.

From steps 310, 311 and 309, the eNBs may exchange information over the backhaul, as shown in step 312. In step 313, the fourth eNB adjusts transmission or reception (e.g., Tx CSI-RS at a different power level). For example, if the fourth eNB transmission power is deemed too high by the network based on various feedback and measurement reports, the fourth eNB may reduce its transmission power, and the Transition Adjustment Process may continue until convergence occurs or certain criteria are achieved.

After the Transition Adjustment Process is complete, in step 314, a seventh eNB signals a reconfiguration signal to a fourth UE, as a new interference condition (or more generally, a network configuration) is in place. In step 315, the fourth UE performs reconfiguration (e.g., resets its filters).

The terminologies, timing, and timing order with respect to FIG. 3 may not be strict, some steps may be skipped, reordered, or changed, and some terminologies may be generalized or specialized. For example, step 304 may be included in the Transition Adjustment Process. The Transition Adjustment Process (steps 305-313) may be intertwined with the decision making processes (steps 301-304), and may be performed on probing resources only (e.g., in parallel to other normal transmissions) or on all relevant resources. The CSI-RS resource configuration change signal (step 306) and the reconfiguration signal (step 314) may be different in general.

Probing Resources

A probing resource process may be provided, during the Transition Adjustment Process for example. During the Transition Adjustment Process, the eNB with the point that has just been turned on may test several different configurations. The testing may be performed by adjusting the power levels (including turning on or off a transmission point and/or a carrier), adjusting the number of ports, adjusting the bandwidth, changing carriers, etc. Such actions may occur in an iterative way. For example, the eNB may transmit at a power level and, based on a UE's feedback, the eNB may increase or decrease the power level. Each power level may lead to a different interference to other eNBs and/or UEs, and therefore the other eNBs and/or UEs may need to adjust their configurations, transmissions, and/or receptions. These adjustments may cause a chain reaction that affects the original eNB as well, and hence more adjustments may be needed. In this process, the UE's PDSCH transmission may be affected. For each adjustment, the eNB monitors the UE's feedback. The adjustments and feedback may cause network operation to fluctuate in an unwanted way, such as the UE may experience lower than normal PDSCH transmission rates, such as hundreds of milliseconds. In other words, it may take a long time for the network to achieve a configuration with suitable and desired performance, and during that process normal data transmissions may be impacted.

An alternative is to perform a similar procedure in a proactive or prepared way. For example, the system impact or performance may be predicted on a smaller scale of resources before the transition. Such a procedure may be done in parallel with the network's normal operations, and thus the normal operations may not be affected. These normal operations may include normal data transmissions, normal control or system information transmissions, normal RRM/RLM/CSI measurements and feedback, etc. Resources more suitable for the adjustment processes or probing periods may be defined and/or allocated. The eNBs may configure probing resources, and may signal the configured probing resources to selected UEs. A selected UE may be configured to measure on the probing resources (for signals and/or interferences) during the same time period, and may report CQI/RRM/RLM measurement reports. The network may iterate until it finds a suitable transition and a suitable configuration after the transition, based on varying the transmissions on the probing resources and the feedback reports. Finally, the network performs the transitions. The final transitions are expected to be less interruptive and shorter in time since the decided final configurations have been tested to have the desired performance and/or to correspond to a steady state. Such a procedure may significantly reduce the impact on the network and the time spent on adjustment or probing processes.

Thus, during the Transition Adjustment Process, it may be useful to utilize probing resources, such as to perform the transition adjustment on probing resources only. The network may predict the system impact and/or performance before the transition based on measurements on a smaller scale of resources. The measurements related to the prediction may be made in parallel with the network's normal operations without affecting the network's normal operations. A selected UE may be configured to measure the probing resources (for signals and/or interferences) during the same period, and may report CQIs, RRM measurements, RLM measurements, etc. The network may iterate until it finds a suitable transition and a suitable configuration after the transition by continuing to adjust the transmissions based on the probing resources and the feedback reports. Multiple configurations may be probed in a parallel fashion or sequentially. Finally, the network performs the transitions. Such a procedure may significantly reduce the impact on the network and the time spent on adjustment or probing processes. The concepts and procedures of using probing resources may be adopted and utilized in general network reconfigurations, iterated network optimizations, etc.

Probing resources may include probing reference signals (P-RS) and probing interference measurement resources (P-IMR). In LTE and LTE-A, P-RS may be considered a special CSI-RS, which may be called P-CSI-RS. A UE may not need to distinguish P-CSI-RS from other CSI-RS. P-IMR may be considered a special CSI-IM resource, which may be called P-CSI-IMR. A UE may not need to distinguish P-CSI-IMR from other CSI-IM resources. Any generalization or specialization or variation of the reference signals or interference measurement resources in LTE or LTE-A may also be used for probing. An RRM/RLM or CSI report may be configured based on the P-RS and P-IMR. Therefore, probing resources may be UE transparent at times. The filter state may be reset once the eNBs start or finish testing a configuration. The reset may include both the signal measurements and interference measurements. The interference measurement restart may be triggered by a reconfiguration signal to a UE. However, the signal measurement restart may be triggered by another reconfiguration signal. Alternatively, this reset may be done automatically according to a specific timing window associated with the P-RS or P-IMR or the corresponding CSI. The timing configuration may be configured by signaling or specifications. Alternatively, triggering signaling may be sent to a UE to inform the UE about the start, the intervals, and the end of the probing process. In existing standard specifications, multiple CSI processes (CSI reporting configurations, each of which is generally associated with one signal-interference condition) may be supported, but only one RRM measurement process is supported. Introducing P-RS and P-IMR based RRM measurements may introduce multiple RRM measurement processes into the system.

In general, however, the probing resources may or may not be based on P-CSI-RS or P-CSI-IMR. The resources may be based on general P-RS and P-IMR, which may be any time/frequency RS resources and CSI-IM resources assigned for probing purposes. Moreover, the resources may not be based on separate P-RS or P-IMR. Instead, the resources may be any general time/frequency resources usable for probing purposes. For example, CRS-like reference signals may be used for probing, and the UE may need to first detect the signals, then remove the signals to estimate the interference on the same time/frequency resource, and finally generate CQI reports. For example, the eNBs may assign some time/frequency resources on which some eNBs may transmit data and/or DMRS. The UE may decode the data and/or DMRS and may measure and report CSI (e.g., CQI, PMI, RI, modulation and coding scheme (MCS) level, RSRP, RSRQ, signal-to-interference-plus-noise ratio (SINR), channel covariance matrix, interference level, interference covariance matrix, delta CQI, delta RSRP, delta RSRQ, and/or delta interference), or the UE may measure and report the general condition of the transmission (e.g., acknowledgement/negative acknowledgement (ACK/NACK) or the probability of a decoding error). The eNBs may probe for one or more configurations concurrently (e.g., to use the frequency dimension to help reduce probing duration) on multiple probing resources, and the UEs may measure and report one or more CSI. The probing resources may or may not be dedicated for probing purposes only. The eNBs may instead reuse a subset of CSI-RS and CSI-IM resources to perform probing and may reuse a subset of CSI report configurations to report the channel status. The eNBs may also schedule some physical resource blocks (PRBs) to transmit dummy data, using some configurations to be probed to check the UE feedback. The eNBs may also allocate specific resources for probing and configure certain parameters for probing (such as measurement timings and/or reporting timings) and may signal the resources and/or parameters to the UEs. The UEs may follow defined probing procedures with the signaled parameters on the specified resources, in which case the probing is not UE-transparent. The probing resources being set aside by the eNB may lie on UL time/frequency resources, in which case the probing may be done in the uplink.

Probing resources may be used mainly for adjustment, probing, and/or prediction purposes and are not limited to the transition of a point turning on or off. Such resources may be applied in general network resource adaptations and transitions or in a transmission scheme change (e.g., a CoMP scheme change) in an iterative way. Such resources may be used for adjustment or fine tuning of cell association, power levels, carrier selection, carrier/point on/off decision, load balancing/aggregation/shifting, number of antenna ports, antenna configurations, bandwidth, antenna tilts, codebook structures and parameters, rank adaptation, or precoding. Such resources may be used to provide the eNB the ability to dynamically use a different transmission scheme based on the feedback using the probing resources. Probing resources may be configured differently for subbands to experiment at the same time. Feedback based on probing resources may be more lightly weighted than other feedback, e.g., lower accuracy, lower overhead, and/or with PMI/RI, etc. Measurements and feedback reports based on probing resources may include CQI, PMI, RI, MCS level, RSRP, RSRQ, channel covariance matrix, interference level, interference covariance matrix, delta CQI, delta RSRP, delta RSRQ, and delta interference. Such reports may also be used for UL adjustment or probing or performance prediction. Moreover, in order for the network to be able to determine suitable transmission schemes by probing, the network may need to support most or all of the transmission modes on probing resources. For example, the normal data transmission may be in transmission mode 8 (TM8), while in the meantime the probing transmission is set to be consistent with TM10. To determine data SINR for, e.g., TM10, by probing, the network may configure a UE to first report CQI/PMI/RI/MCS based on reference signal resources and interference measurement resources of the probing resources. Following the first reporting the UE reports SINR based on data (or dummy data) received on probing resources.

In E-UTRA, RSRQ is the ratio NxRSRP/(E-UTRA carrier RSSI), where N is the number of RBs of the E-UTRA carrier RSSI measurement bandwidth. The measurements in the numerator and denominator are made over the same set of RBs. E-UTRA Carrier RSSI comprises the linear average of the total received power (in [W]) observed only in OFDM symbols containing reference symbols for antenna port 0, in the measurement bandwidth, over N number of RBs by the UE from all sources, including co-channel serving and non-serving cells, adjacent channel interference, thermal noise etc. If higher-layer signaling indicates certain subframes for performing RSRQ measurements, then RSSI is measured over all OFDM symbols in the indicated subframes. In future releases, RSSI may be measured on certain REs specified by the eNB. In general, total received power includes all radio frequency (RF) signals received by a UE, such as the signals from serving cells, interference, and noise, over the time/frequency resources specified in the specifications or indicated by a network controller.

Figure 4:
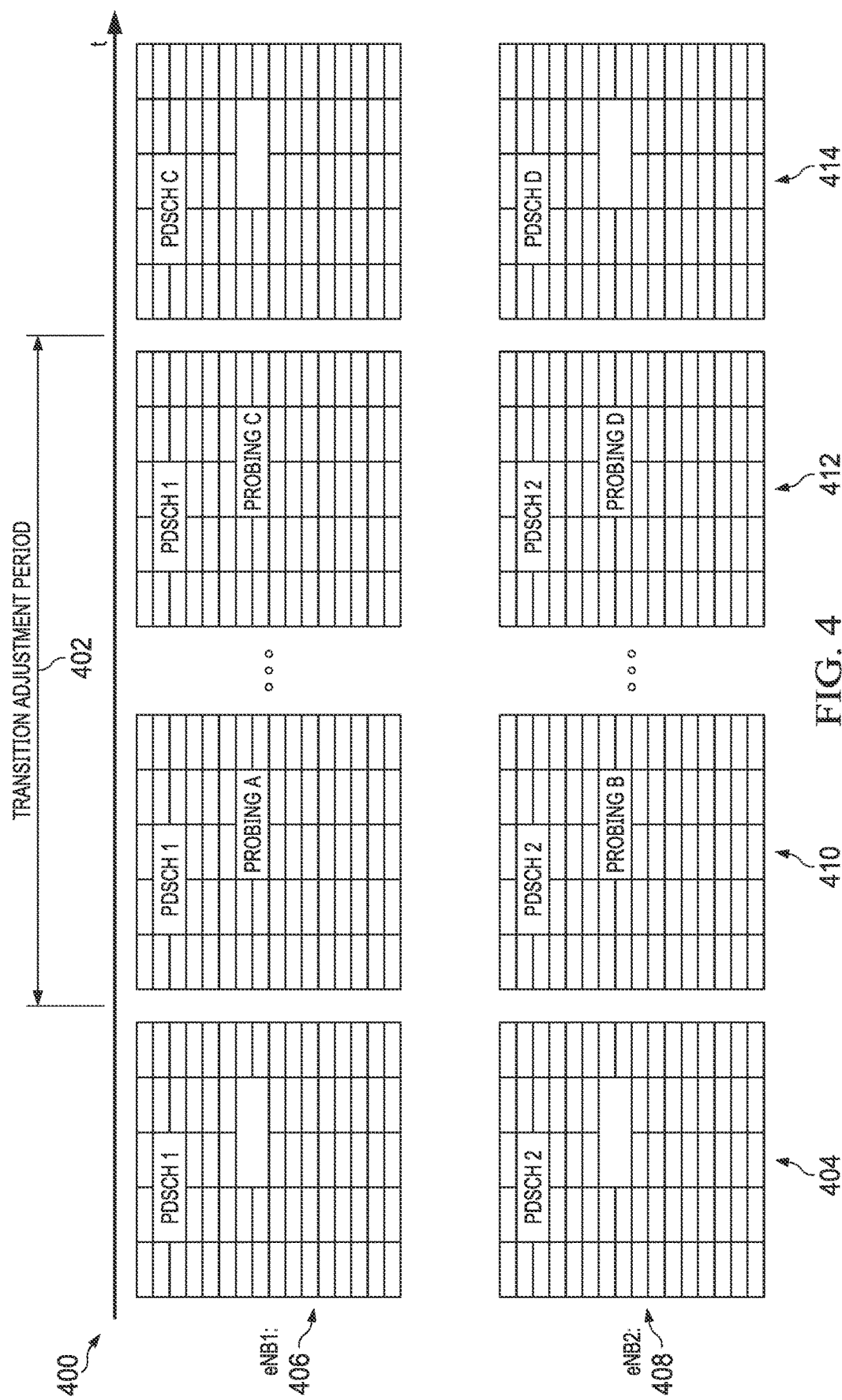
FIG. 4 illustrates a transition adjustment period timeline, according to certain embodiments of this disclosure.

FIG. 4 illustrates a timeline of operations 400 for a transition adjustment period 402 based on probing resources, according to certain embodiments of this disclosure. In the first column 404, eNBs, e.g., eNB1 406 and eNB2 408, set aside probing resources, and coordinate probing transmissions and timings. In the second column 410, eNBs test probing transmissions and adjust. In the third column 412, convergence is achieved on probing resources. In the fourth column 414, the network operates per the selected reconfiguration. Further details of various embodiments are described below.

Figure 5:
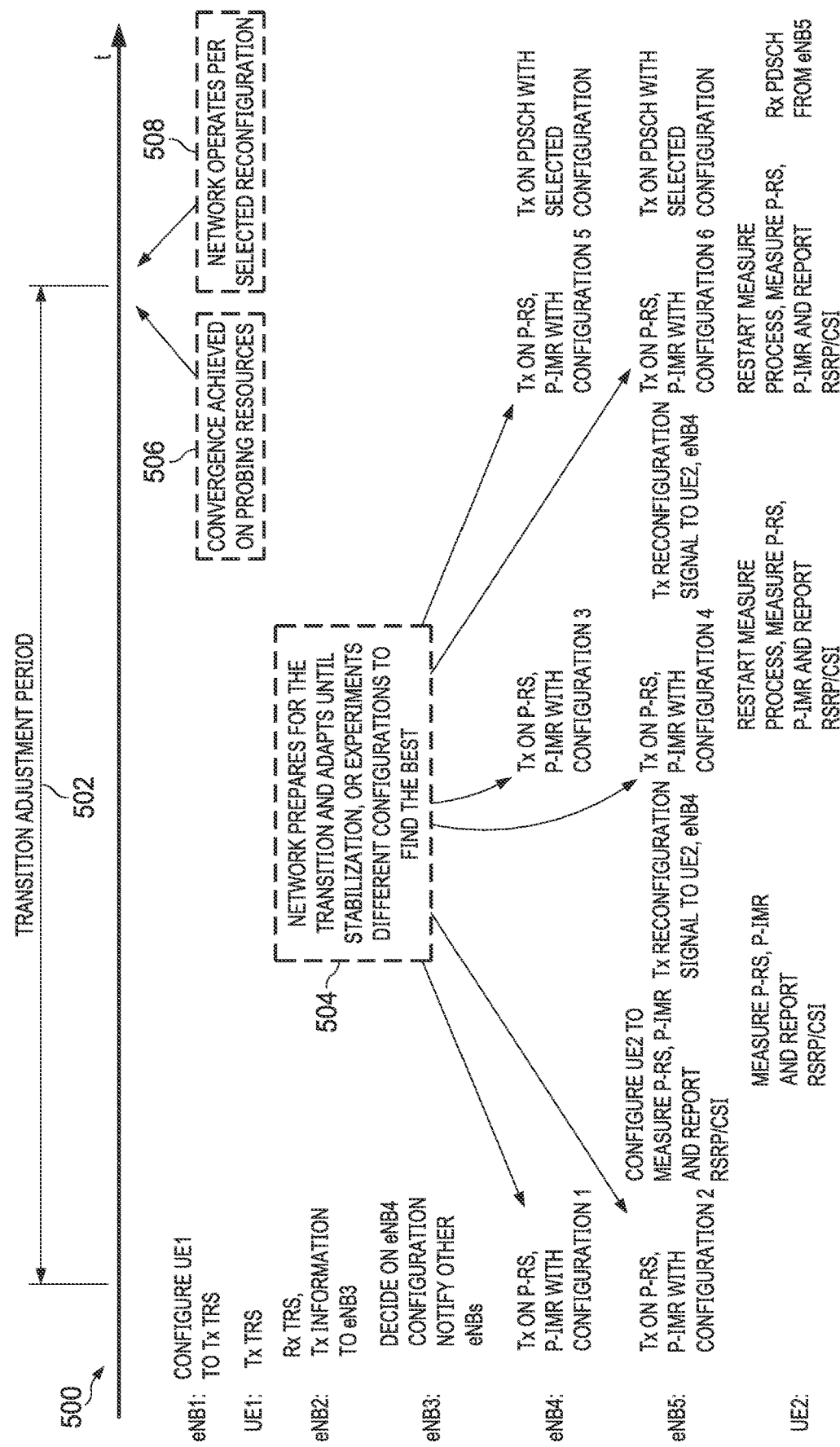
FIG. 5 illustrates a transition adjustment period timeline, according to certain embodiments of this disclosure.

FIG. 5 illustrates an example timeline of operations 500 for a transition decision and a transition adjustment process 502 based on probing resources, according to certain embodiments of this disclosure. The network prepares for the transition and adapts to the transition until stabilization, or experiments with different configurations to find a desired or optimum configuration at 504. Convergence and/or the desired behavior is achieved on the probing resources at 506, and the network selects a reconfiguration and operates per the selected reconfiguration at 508.

In various embodiments, an eNB experiencing a transition or foreseeing a transition may take the following steps. The eNB may send a reconfiguration signal, together with timing information, over the backhaul to other eNBs. The eNB may send a reconfiguration signal, together with timing information, to its UEs. The eNB may configure probing resources, including a P-RS and a P-IMR to its UEs, and may configure a transmission scheme with coordination with other eNBs on the probing resources. The effects of the transition and reconfigurations are iteratively evaluated and/or predicted by the network on the probing resources only. The final configuration obtained at the end of the evaluation period is then applied on all relevant resources. The relevant resources may or may not be in the same type of carrier as that on which the probing was done. For example, the final configurations may be applied on a new carrier type (NCT) whereas the probing may have been done on a Release 8 compatible carrier.

Various embodiments provide transmission, reception, and signaling methods and systems for reconfiguration in wireless networks. Embodiments provide signals and processes supporting the reconfiguration, either after the transition or jointly with the transition. Such signals and processes may include backhaul signaling to coordinate the reconfiguration among multiple nodes, reference resources, such as probing resources including P-RS and P-IMR, to measure the effect of transition and reconfiguration by UEs, and reconfiguration signaling to UEs to indicate the occurrence of transition and reconfiguration to the UEs. For example, UEs may restart their measurement processes for the updated configurations.

In an embodiment, the impact of the transition and adaptation may be evaluated by multiple nodes and/or UEs before, during, and/or after the transition and adaptation take place. Probing resources based on CSI-RS and interference measurements may be used to evaluate the impact of the transition, adaptation, and/or reconfiguration before the transition, adaptation, and/or reconfiguration is applied to the PDSCH. In an embodiment, the network and UEs may adjust their configurations. Signaling from an eNB to a UE or another eNB may indicate that a transition and/or reconfiguration will occur such that the UE and other eNBs may operate accordingly. Embodiments provide reconfiguration signals and processes when the network adapts its topology and/or transmissions. Embodiments may be implemented in handsets and networks used in wireless communication systems.

Probing process may or may not always involve UEs. For example, as described with regard to FIG. 2, probing process may be used to reconfigure the transmissions between macros and relays over the air. Probing may or may not always involve eNB reconfigurations. For example, in a device-to-device (D2D) or direct mobile communication (DMC) network, probing may be used to reconfigure transmissions between UEs. In these cases, the general approaches having been described in various embodiments may still be applied with appropriate modifications.

As an example, a network may experience decreased traffic load and may try to turn off some picos to save energy or reduce emission. The network may determine some candidate picos to be turned off. However, these candidate picos may be serving UEs, and if some of the picos are actually turned off, the UEs being served by the picos may need to be offloaded to other active picos. Such offloading may significantly change various aspects of the network operations, such as interference conditions, pico/UE associations, and pico loadings. For example, if a UE is offloaded from its current serving pico to a second pico, the second pico may experience an increase of its loading. If the increase of loading exceeds a threshold, QoS of the UE may suffer significantly, and hence the network may decide not to offload to the second pico or may decide not to turn off the first pico. It may be seen from this particular example that the network may need to predict operation condition before making a transition decision; otherwise, severe problems may be caused. Such a prediction, though very useful, is very difficult without being actually tested in the network. In this situation, probing may be beneficial. For example, on some probing resources, a first pico "emulates" the status that it is turned off (and hence interference to neighboring points' UEs is reduced) and its UE is offloaded to a second pico. The UE reports the CQI associated with this probing setting, which may help the network to determine if the decision to turn off the first pico is eventually beneficial or problematic to the network. A second pico may perform an actual transmission and/or scheduling of a UE on the probing resources, thus the network may obtain much information regarding impact of turning off a pico and offloading a UE's service.

Optionally, for DL or backhaul signaling, an eNB may send a reconfiguration signal or together with a timing to UEs and other eNBs. The UE may assume that a new measurement condition, e.g. for signal measurements and/or interference measurements, will be in effect for an indicated CSI-RS resource configuration, CSI-IM resource configuration, and/or CSI process configuration. The eNBs may be assumed to reconfigure according to their UEs' feedback based on the indicated resources configuration.

Optionally, for DL or backhaul signaling, an eNB may send a signal to indicate a start and/or a finish of a transition adjustment period. Within the period, probing resources may be used to experiment with several configurations. A UE may apply a measurement timing window during the period. After each measurement timing window, the UE may restart its measurement process on the probing resources.

Regarding UE reconfiguration signal design, if the reconfiguration signal is in the PDCCH or EPDCCH, the latency may be small, but downlink control information (DCI) formats may need to be modified to include the reconfiguration indications. The reconfiguration may not be logically related to DL/UL grants since it may happen that when an eNB needs to transmit a reconfiguration signal to a UE, the eNB has no DL/UL grants for the UE. Then a reconfiguration signal may be a field of a DCI format, or may be a special, light-weight DCI for the reconfiguration. If the reconfiguration signal is in upper layer signaling, the latency may be large, but there may be no need to modify DCI formats. If the reconfiguration signal is in common channels, not all UEs may need to reconfigure.

Regarding UE behavior, in general, UE layer 1 filtering design and operation is an implementation issue not specified in the specifications. However, the UE may be signaled if a network transition occurs, which may require specification support. Whether and/or how the UE reacts is generally left for implementation, which does not require specification support. UE layer 3 filtering for RSSI/RSRQ may need to be reset, and if so, that filtering may need to be standardized for the network.

Regarding a UE's behavior, if the probing resources are mainly used for generating the probed CSI, the UE may need to rate matching around the probing resources, regardless of whether the resource is used as P-RS or P-IMR, and regardless of whether the probing resources are CSI-RS/CSI-IM resources or not. However, if the probing resources carry actual data (e.g., the probing resources are used for data transmission instead of data for measurement), then the UE may not perform rate matching on all probing resources. Instead, the UE may perform rate matching on a subset of probing resources that are for measurement purposes. Appropriate rate matching signaling may be used to support such operations, such as the signaling of zero-power CSI-RS configurations to a UE.

The probing resources may be associated with a trigger or a timing window to automatically restart the measurement process. RRM/CSI feedback report configurations based on the probing resources may be different from other feedback reports. Therefore, multiple timing configurations may be used for multiple measurement processes or configurations.

In an embodiment method for adaptation in a wireless network, eNBs coordinate and set aside a set of time/frequency resources for probing purposes, eNBs coordinate a set of operations (probing transmissions) and timings to be used to synchronize actions of eNBs and UEs, eNBs signal the resources and timings to UEs, eNBs perform the coordinated operations on the resources according to the timings, and eNBs receive feedback reports from UEs based on UE measurements on the signaled resources according to the signaled timings (eNBs collecting probing impact). eNBs further coordinate the operations for further probing or applying probing transmissions on broader time/frequency resources.

An embodiment method for adaptation in a wireless network includes the following steps. eNB1 sends UE1 a configuration of a measurement process, a configuration of measurement resources associated with the measurement process, a time interval associated with the measurement process, and a reporting configuration associated with the measurement process. These items as a whole may be referred to as probing-related configurations. One or more of these configurations may be combined as one configuration or included in another configuration. For example, the configuration of measurement resources may be included in the configuration of a measurement process. The measurement process may be a CSI process as defined in 3GPP Release 11, which may contain configurations of channel and/or interference measurement resources (e.g., CSI-RS resources and CSI-IM resources). The reporting configuration may indicate periodic reporting (in which case the periodicity and subframe offsets of the reporting subframes may be signaled) or aperiodic reporting (in which case the reporting trigger information may be signaled). The time interval specifies that the measurement may be performed within the time interval.

Moreover, eNB1 may send signaling to UE2 to indicate probing-related configurations pertinent to UE2. The time interval sent to UE2 may be generally the same as that sent to UE1. The other configurations sent to UE2 may or may not be the same as those sent to UE1. Not all UEs served by eNB1 may receive such configurations.

Upon reception of the configurations, UE1 may perform a measurement in accordance with the measurement process configuration based on the configured measurement resource within the configured time interval. For example, UE1 may perform SINR measurement based on the CSI-RS resource and CSI-IM resource, starting from the beginning of the time interval and ending at the end of the time interval. Then the UE may generate a report in accordance with the measurement process configuration and the reporting configuration based on the measurement.

An eNB1 may send the time interval information and/or measurement resource configuration information to eNB2. In general, the measurement resource configuration information may be associated with UE1 and/or UE2, or with part or all of the UEs receiving probing-related configurations from eNB1, but the measurement resource configuration information may or may not be identical to the measurement resource configuration received by any UE from eNB1. In other words, eNB1 may aggregate and/or select the measurement resource configurations sent to its UEs, and send the aggregated and/or selected measurement resource configurations to eNB2. eNB1 may also send the time interval information and/or measurement resource configuration information to eNB3. Though in general the time interval information is the same, the measurement resource configuration information sent to eNB3 may or may not be the same as that sent to eNB2. eNB2 may send probing-related configurations to its UEs, wherein, in general, the time interval information is the same across all UEs and all eNBs (though the network has the flexibility to configure the time intervals differently for different eNBs and/or UEs if there is some propagation isolation, for example).

The time interval may be configured as a starting time, a time duration, and/or an ending time. The starting time may be indicated as a time offset (such as a certain number of subframes later than the reception subframe), or as a time in the future (such as a subframe within a radio frame with a certain system frame number), or by a starting time trigger. The ending time may be indicated similarly. Alternatively, the ending time may be indicated indirectly from the starting and a time duration. There may be multiple time intervals, which may be contiguous in time. The time intervals may be indicated by a starting time using the above-described methods as well as a periodicity. Alternatively, the periodicity signaling may be sent at the starting time of the first time interval so that the UE may obtain both the periodicity and starting time from one signaling.

Another way of specifying multiple time intervals to a UE is based on starting time triggers. When the UE receives a first starting time trigger, the UE starts the measurement. When the UE receives a second starting time trigger, the UE understands that the first time interval is ending and the second time interval is starting, and the UE resets the measurement process accordingly. With either one or multiple time intervals, the UE generates one or more measurement reports according to the measurement process configuration and reporting configuration. Each report is based on measurement over the configured measurement resources within one time interval of the one or multiple time intervals. The timing configuration may also include one or more timing gaps during which the UE does not perform measurements. The configuration of a timing gap may be combined with the above-described embodiments. A UE may receive a set of time intervals for one type of measurement and another set of time intervals for another type of measurement, such as different time intervals for RRM and CSI measurements, or different time intervals for signal and interference measurements.

A point may take a backhaul connection only state, a limited monitoring state, a probing state, or an active state. In the backhaul connection only state, the point has completely turned off its over-the-air Tx/Rx and may only Tx/Rx signaling over its limited backhaul. In the limited monitoring state, the point may perform limited Rx over the air and no Tx over the air, and Tx/Rx may signal over its limited backhaul. In the probing state, the point may perform over-the-air Rx, over-the-air Tx of reference signals, and Tx/Rx over its limited backhaul. The point may adjust its transmission parameters (e.g., RS power) during this state. In the active state, the point may perform over-the-air Tx/Rx of data and Tx/Rx over the possibly high-speed backhaul.

Figure 6:
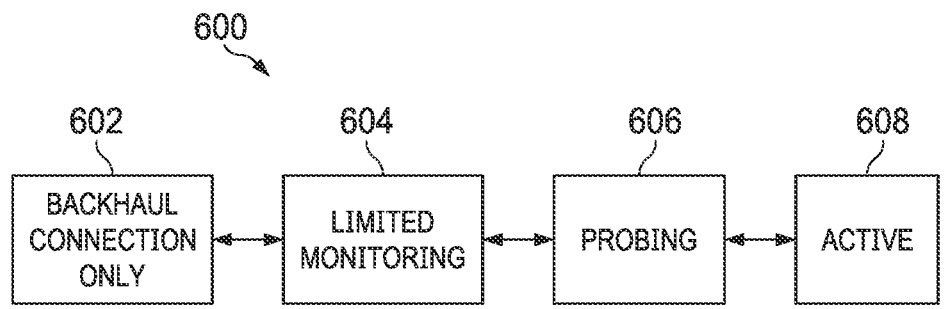
FIG. 6 illustrates state transitions for a point, according to certain embodiments of this disclosure.

FIG. 6 illustrates state transitions 600 for a point of a network, according to certain embodiments of this disclosure. The point may transit between a backhaul connection only state 602, a limited monitoring state 604, a probing state 606, and an active state 608. A point going through a state transition may need to signal to its UEs and neighboring points over the air or over the X2 interface, which may trigger a transition adjustment process across multiple eNBs and UEs. A point here may be a cell, antenna set, frequency band/carrier, macro/pico/femto/relay, etc. In addition, a point may be transitioned to or from a completely powered-off state, and the reconfiguration and transition adjustment process may be applied as well.

Figure 7:
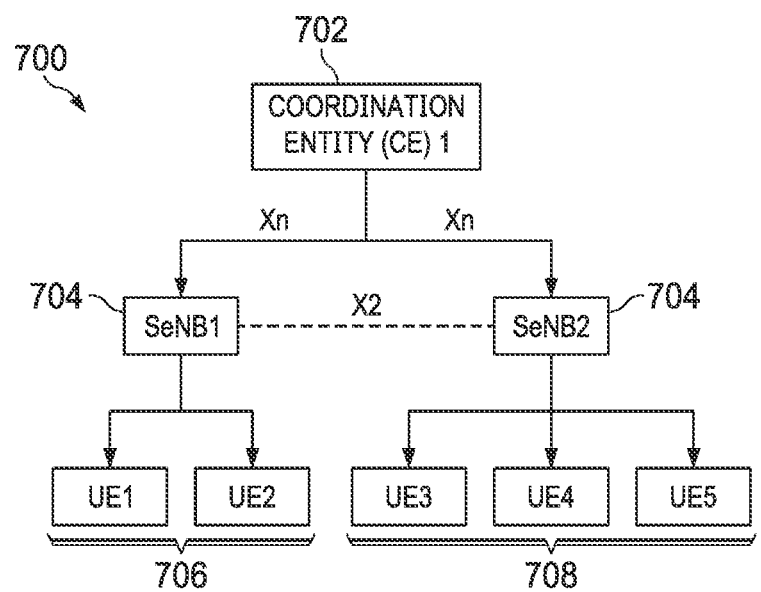
FIG. 7 illustrates an example system diagram, according to certain embodiments of this disclosure.

FIG. 7 is a diagram of a system 700 with a coordination entity (CE) 702 coordinating multiple eNBs 704, according to certain embodiments of this disclosure. The CE 702 may be a macro eNB or other network entity. The SeNB 704 stands for secondary (or small cell) eNB, which may be coordinated by the CE 702 via the Xn interface, usually over a non-ideal backhaul. The SeNBs 704 may be connected via the X2 interface, usually over a non-ideal backhaul. The CE 702 may coordinate the on/off, carrier selection, load balancing/shifting/aggregation, and other general interference management and coordination operations of the SeNBs 704. UEs 706 and 708 are coupled to the SeNBs 704.

Figure 8:
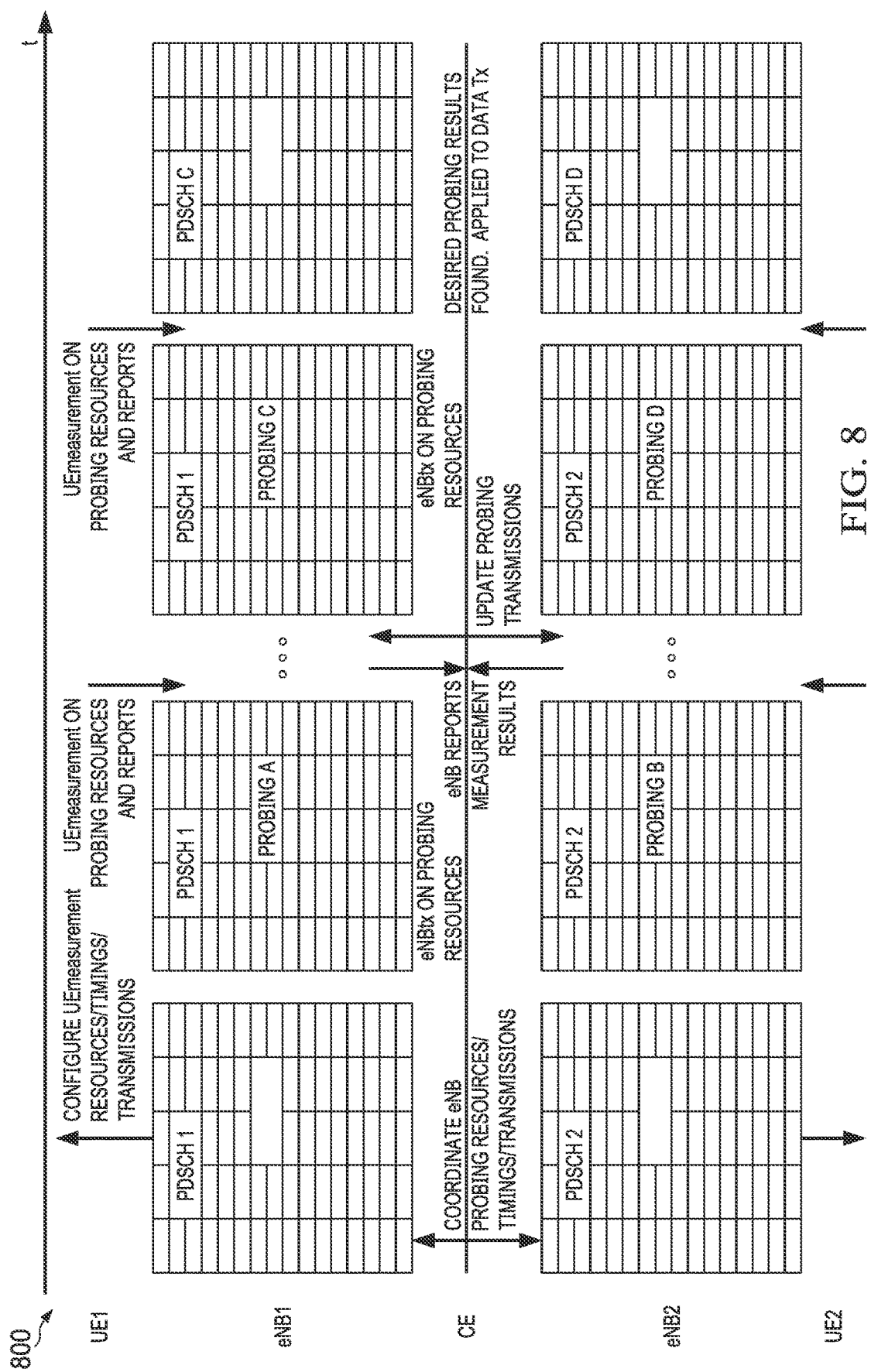
FIG. 8 illustrates an example of probing operation, according to certain embodiments of this disclosure.
Figure 9:
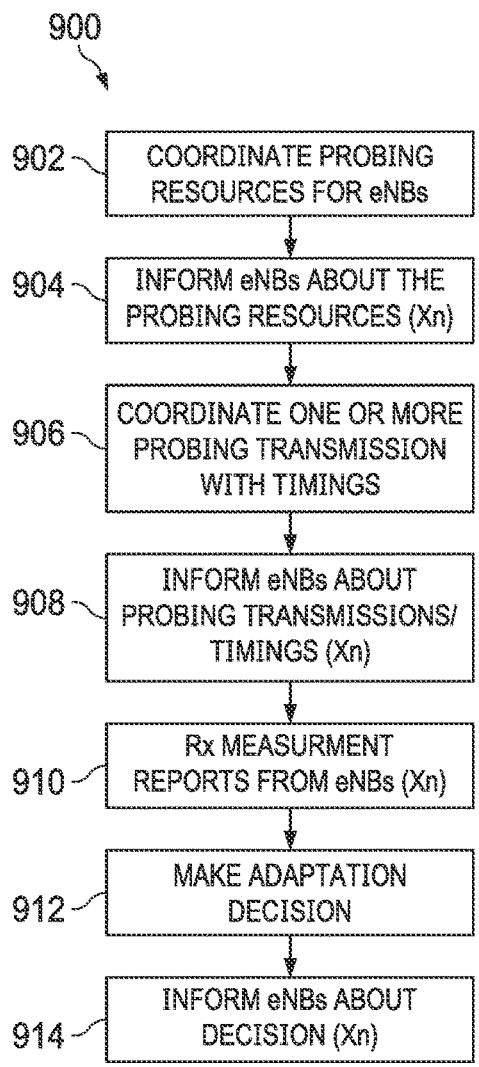
FIG. 9 illustrates a flow diagram of CE operation, according to certain embodiments of this disclosure.
Figure 10:
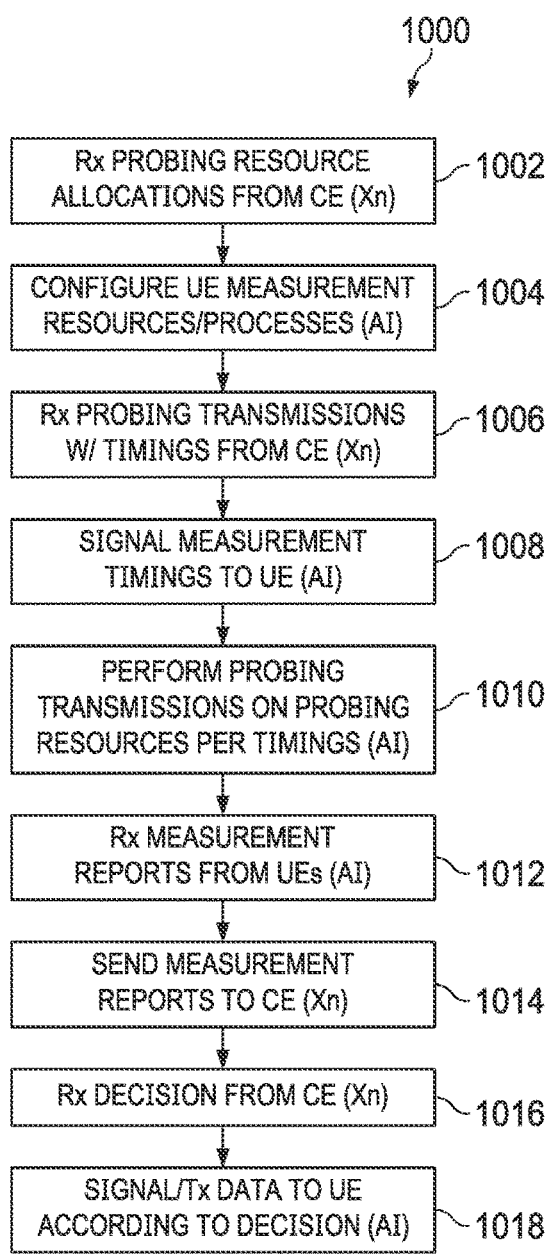
FIG. 10 illustrates a flow diagram of eNB operation, according to certain embodiments of this disclosure.
Figure 11:
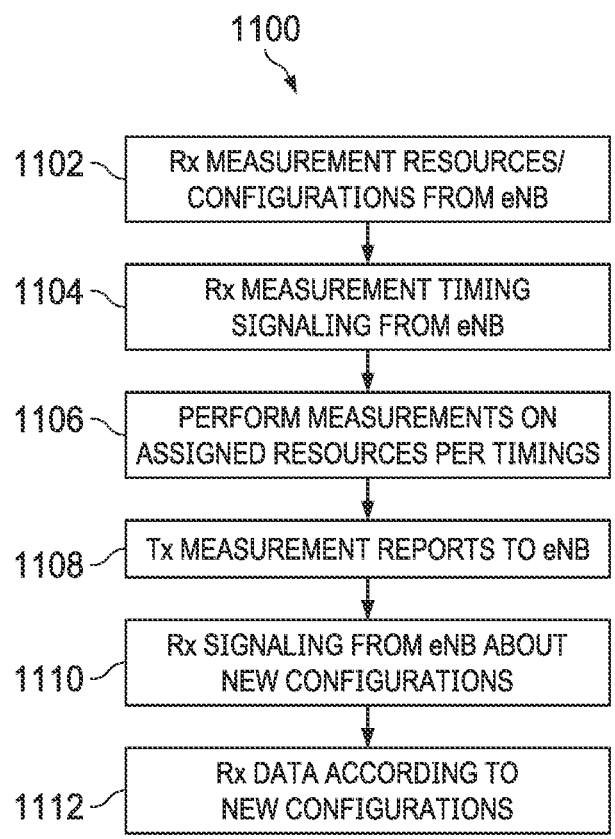
FIG. 11 illustrates a flow diagram of UE operation, according to certain embodiments of this disclosure.

FIG. 8 shows an example of the probing operation 800 over this system architecture, according to certain embodiments of this disclosure, and flowcharts are shown in FIGS. 9-11, according to certain embodiments of this disclosure.

In FIGS. 9-11, the annotations inside the parentheses indicate over which interface the signaling is sent. Xn indicates signaling sent over the Xn interface, while AI indicates signaling or data sent over-the-air interface. A flowchart for CE operation 900 is shown in FIG. 9. In step 902, the CE coordinates probing resources for a plurality of eNBs. In step 904, the CE informs the eNBs about the probing resources. In step 906, the CE coordinates one or more probing transmissions with timings. In step 908, the CE informs the eNBs about probing transmissions and timings. In step 910, the CE receives measurement reports from one or more eNBs. In step 912, the CE makes the adaptation decision, and in step 914, the CE informs the eNBs about the decision.

FIG. 10 shows a flowchart for eNB operation 1000, according to certain embodiments of this disclosure. In step 1002, the eNB receives probing resource allocations from the CE. In step 1004, the eNB configures UE measurement resources and/or processes. In step 1006, the eNB receives probing transmissions with timings from the CE. In step 1008, the eNB signals measurement timings to one or more UEs. In step 1010, the eNB performs probing transmissions on probing resources per the timings. In step 1012, the eNB receives measurement reports from the UEs. In step 1014, the eNB sends measurement reports to the CE. In step 1016, the eNB receives the decision from the CE. In step 1018, the eNB signals data to the UE according to the decision.

FIG. 11 shows a flowchart for UE operation 1100. In step 1102, the UE receives measurement resources and/or configurations from the eNB, according to certain embodiments of this disclosure. In step 1104, the UE receives measurement timing signaling from the eNB. In step 1106, the UE performs measurements on assigned resources per timings. In step 1108, the UE transmits measurement reports to the eNB. In step 1110, the UE receives signaling from the eNB about new configurations. In step 1112, the UE receives data according to the new configurations.

The preceding description has been directed toward probing-based network adaptation, which deals with network-wide configurations such as the transmission scheme used in the network, transmission power levels used in the network, the network nodes that are turned on or off, whether CoMP or similar advanced transmission techniques are used, and similar topics. The description will now turn to probing-based link adaptation, which may be considered a special case of probing-based network adaptation.

In a wireless network, probing may be used to determine the appropriate link adaptation, including the MCS levels, rank, and UE pairing (for multi-user multiple-input, multiple-output (MU-MIMO), for example). In an embodiment, in such probing-based link adaptation, a serving eNB and one or more potentially interfering eNBs transmit probing signals to a UE before transmitting actual data signals. The eNBs transmit the probing signals at the same time and on the same time/frequency resources. Thus, the interference the UE experiences in a probing transmission is similar to the interference the UE will experience in an actual data transmission. The REs on which a probing signal is sent are a subset of the REs that will be used for an actual data transmission. In other words, the number of REs occupied by a probing signal is less than the number of REs in a subframe. The UE measures the CQI or some other channel quality parameter of the probing signals and, based on the measurement, determines an MCS level appropriate for the current channel conditions. The UE then informs the eNBs of that MCS level. The eNBs then use that MCS when transmitting actual data to the UE. In this way, eNBs may transmit with an MCS level that is appropriate for the current channel conditions.

In particular, in an embodiment, multiple eNBs transmit on the same time/frequency resources of the P-RS using a tentative MCS. These transmissions may be called pre-transmissions, probing transmissions, or P-TX. UEs receiving the P-TX perform measurements on the P-RS and calculate an updated MCS, for example. Alternatively, a CQI or other channel quality parameter may be derived based on the MCS. If multiple layers are used, multiple MCSs may need to be calculated. The updated MCS is reported to the eNBs. Alternatively, the MCS may be indicated by the difference between the MCS and a reference MCS known to at least one of the eNBs and the UE. The eNBs then perform the actual data transmissions associated with the P-TX using the updated MCS. The actual data transmissions may be called actual transmissions, post-probing transmissions, or A-TX. Since the transmission scheme and other parameters associated with the A-TX are the same as those associated with the P-TX except for the MCS, and since changes of the MCS have little impact on the UEs' SINR, it may be seen that the UEs experience almost the same SINR in the A-TX as in the P-TX. Hence, the MCS determined during the P-TX will match the SINR in the A-TX reasonably well. In other words, probing may be used to significantly reduce the mismatches in link adaptation. The much improved accuracy in link adaptation may then translate to throughput performance gains.

Figure 12:
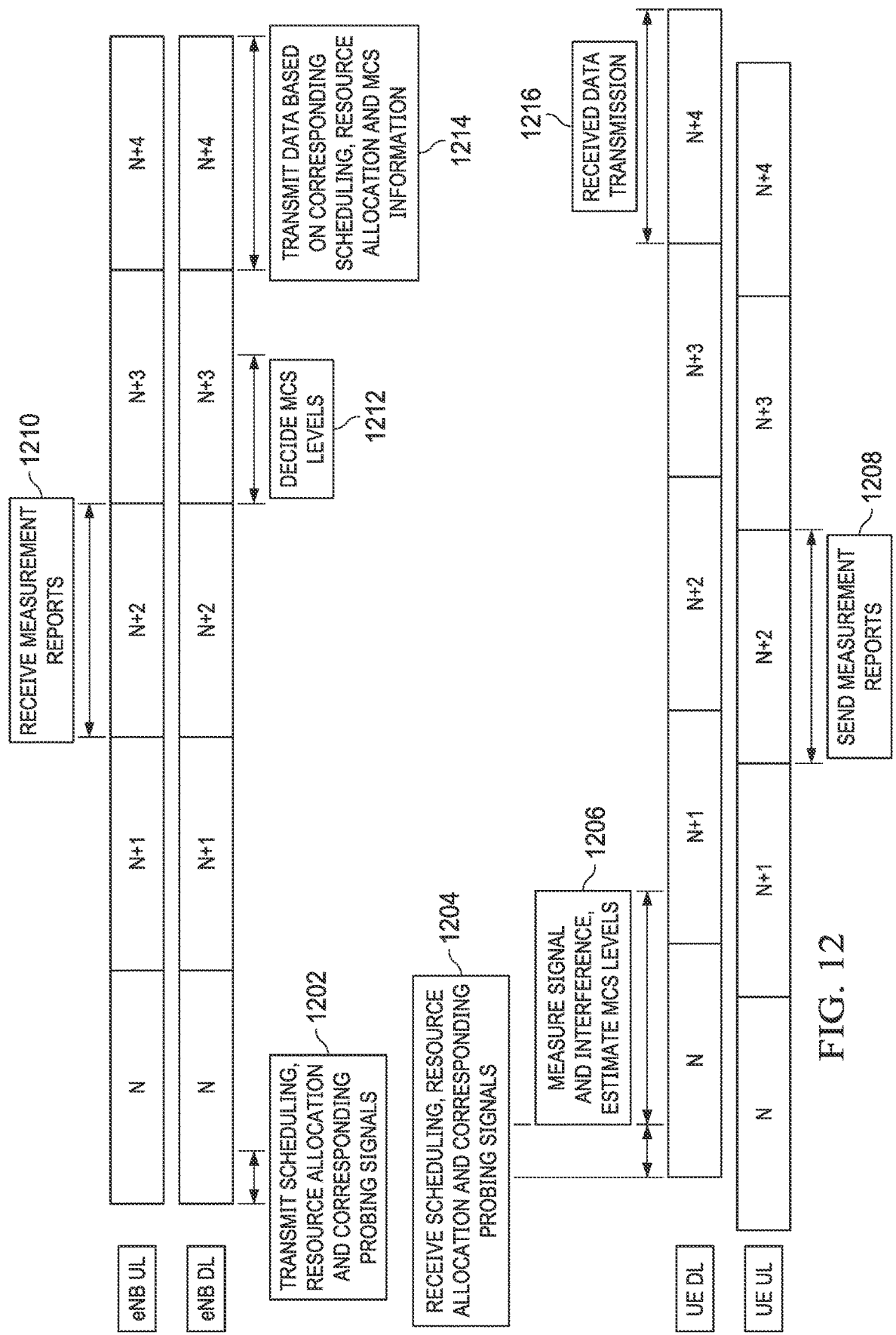
FIG. 12 illustrates an example of a probing-based link adaptation procedure, according to certain embodiments of this disclosure.

FIG. 12 illustrates an embodiment of the probing-based link adaptation procedure, according to certain embodiments of this disclosure. At 1202, an eNB transmits scheduling, resource allocation and corresponding probing signals. At 1204, a UE receives the scheduling, resource allocation and corresponding probing signals. At 1206, the UE measures the signal and interference and estimates an MCS level. At 1208, the UE sends a measurement report containing the estimated MCS level. At 1210, the eNB receives the measurements report. At 1212, the eNB decides on an MCS level. At 1214, the eNB transmits data based on the corresponding scheduling, resource allocation and MCS information. At 1216, the UE receives the data transmission. Alternatively, at 1208, the UE sends an MCS level determined based on the measured signal and interference, and at 1210, the eNB receives the MCS. At 1212, the eNB decides to use the received MCS level, and at 1214 the eNB transmits using the received MCS level.

It may be noted that one probing result based on a P-TX may be applied to more than one A-TX. In the case of multiple A-TX for a P-TX, the eNBs may perform the scheduling and precoding in all the A-TX subframes consistent with the P-TX. In general, the timing between resource allocation information transmission, probing resource, probing feedback, MCS information transmission, and data transmission may take at most 4 transmission time intervals (TTIs) as shown in FIG. 12, but 3 or even 2 TTIs may be sufficient if the UE may receive the P-RS early enough (e.g., using CSI-RS on 5th and 6th OFDM symbols) and process the measurements fast enough (e.g., send report on N+1) and if the eNB may prepare the A-TX (transmission block (TB) sizes, etc.) fast enough. In time division duplex (IDD) systems, probing may be used similarly, but the timing and/or latency may be different from frequency division duplex (FDD).

Figure 13:
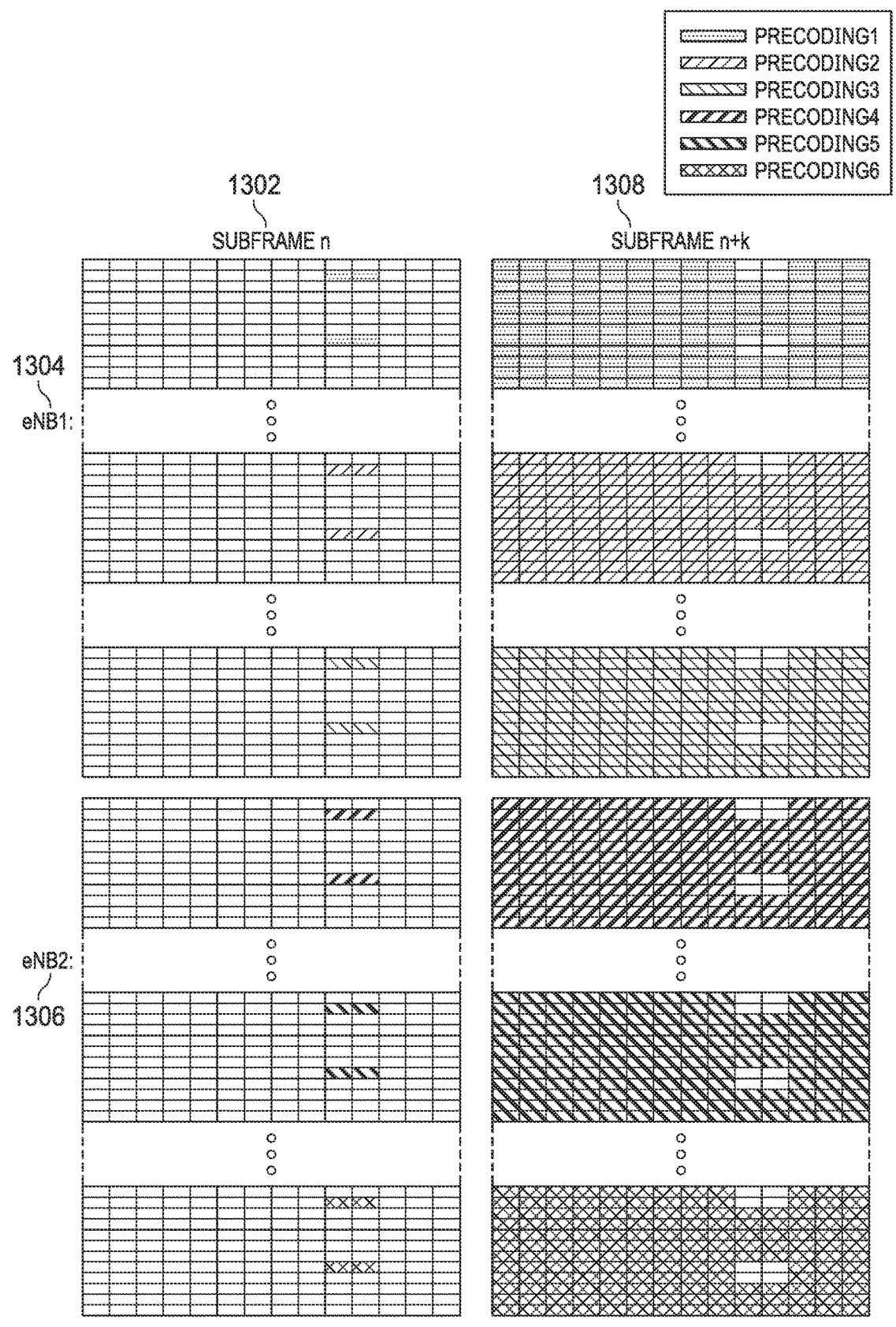
FIG. 13 illustrates an example of probing for link adaptation, according to certain embodiments of this disclosure.

FIG. 13 shows an embodiment of probing for link adaptation, according to certain embodiments of this disclosure. In FIG. 13, at subframe n 1302, eNB1 1304 performs P-TX on the P-RSs (as an example, the P-RSs are CSI-RS and in particular may be non-zero-power (NZP) CSI-RS). In other words, eNB1 1304 transmits probing signals at the time/frequency resources labeled precoding1, precoding2, and precoding3, which are a subset of all the time/frequency resources available in subframe n 1302. At the same time, eNB2 1306 transmits probing signals at the time/frequency resources labeled precoding4, precoding5, and precoding6, which correspond in time and frequency to the time/frequency resources labeled precoding1, precoding2, and precoding3. The P-RSs transmitted by eNB1 1304 and eNB2 1306 may be precoded with RB-specific precoding. In other words, each RB may be allowed to have a different precoding and rank, but some RBs may share the same precoding and rank (see below for details).

A modulation level for these P-RSs may be fixed to be quadrature phase shift keying (QPSK) for simplicity of UE measurements, but higher order modulations are also allowed for higher accuracy of link adaptation. The coding rate may be chosen to be the lowest coding rate for the associated modulation level, or may be a fixed at a predetermined coding rate known to the UEs, or may vary dynamically. In other words, the MCS level used for the probing transmissions may or may not be optimal for the channel conditions experienced by the UE, but the probing transmissions may be used to determine an MCS level appropriate for those conditions.

It is possible that more than one CSI-RS configuration may be used as the P-RS, which may help increase the processing gains for probing. Multiple probing within one RB may also be allowed for different precoding vectors or matrices. P-RS may not need to span the entire bandwidth. In other words, CSI-RS on some RBs may not be used for probing for link adaptation. The UE may treat such RBs as regular CSI-RS for measurements.

Some UEs served by eNB1 1304 may receive signaling from eNB1 1304 about the probing. Such signaling may indicate to a UE the time/frequency resources on which the UE-specific probing is performed. For example, UE1 may be signaled that the resources associated with precoding 1 and 2 are for UE1's probing. In this case, in general, precoding 1 and 2 are the same. UE2 may be signaled that the resources associated with precoding 3 are for UE2's probing. Likewise, some UEs served by eNB2 1306 may receive signaling from eNB2 1306 about the probing. UE3 may be signaled that the resources associated with precoding 4 are for UE3's probing. UE4 may be signaled that the resources associated with precoding 5 and 6 are for UE4's probing. In this case, in general, precoding 5 and 6 are the same. In other words, which RBs are used for which UEs may be partitioned differently for different eNBs.

Then the UE may follow the eNB's instructions for measurements for probing. The signal measurement for the UE may be obtained from all probing resources assigned for that UE (with proper filtering). The interference measurements for the UE may be obtained from all probing resources for that UE, removing the effects of the signals. Then the UE may obtain a composite SINR for all probing resources assigned for that UE (with proper processing) and/or a composite CQI and/or MCS for all probing resources assigned for that UE (with proper processing). The obtained measurement result is then fed back to the eNB. If multiple measurement processes (e.g., CSI processes) are configured for probing, then the UE may not be allowed to mix the signal measurements for different processes, and may not be allowed to mix the interference measurements for different processes. However, within the same processes, the signal measurements may be combined, and the interference measurements may be combined according to eNB indication.

The modulation level for P-RS may be simply QPSK, which matches the general RS design, and has the advantage of simple demodulation. Moreover, the modulation level of the P-RS generally does not affect the SINR of probing, from either the signal statistics or interference statistics points of views. However, if a more complicated receiver algorithm is to be used, such as maximum likelihood (ML) receivers with interference cancellation, then QPSK may not be appropriate for all probing, and the P-TX and A-TX may use the same modulation level in order to have accurate link adaptation.

At a later time, such as at subframe n+k 1308, the eNBs perform the A-TX. In other words, eNB1 1304 and eNB2 1306 transmit data in subframe n+k 1308 in the time/frequency resources that were not used for probing transmissions in subframe n 1302. The resource allocation for each UE is generally the same as that for the P-TX. In an embodiment, the time interval between subframe n 1302 and subframe n+k 1308 is configured as common for eNB1 1304 and eNB2 1306. The (new) MCS level in the A-TX for each UE is in accordance with the UE probing feedback. For example, precoding 1 is used by eNB1 1304 for UE1 on all the RBs for UE1, and the associated new MCS is used. Likewise, precoding 3 is used by eNB1 1304 for UE2 on all the RBs for UE2, and the associated new MCS is used. Precoding 4 is used by eNB2 1306 for UE3 on all the RBs for UE3, and the associated new MCS is used. Precoding 5 is used by eNB2 1306 for UE4 on all the RBs for UE4, and the associated new MCS is used. If, in P-TX, eNB1's precoding is transmitted together with eNB2's precoding on a RB, then it may be desirable (at least for simplicity) that in A-TX, eNB1's precoding is transmitted together with eNB2's precoding on the data transmission of the RB.

Some changes in the actual scheduling from the pre-scheduling may be allowed, but it may be desirable for the changes to be made in such a manner that each UE continues to experience the same amount of interference. For example, the changes may be a reshuffling of the positions of the RBs by all eNBs simultaneously, or a scaling of the numbers of RBs for a subset of UEs by all eNBs simultaneously. Overall, as the interference at subframe n+k 1308 becomes "predictable", accurate link adaptation is achieved, and the transmissions to the UEs may be successful in one shot. A more aggressive transmission may lead to decoding failures. Rate matching and/or puncturing may be specific so that a UE may remove the non-PDSCH REs. The rate matched REs or punctured REs may be more than P-RS REs used by the UE. In general, if CSI-RS is used for probing, rate matching may be based on zero power (ZP)-CSI-RS, and hence no additional rate matching signaling may be needed. But if non-CSI-RS is used for probing, then rate matching may need to be specified.

P-TX signaling may be designed as follows. First, the signaling may be a DCI (e.g., physical (PHY) layer signaling carried in a PDCCH or EPDCCH in the same subframe as the P-TX). The signaling may be UE-specific or UE-group-specific. The signaling may be independent of the signaling for actual scheduling (if any) in the subframe. The signaling may indicate to a UE that one or more of the CSI-RS configurations are used for probing (e.g., used as P-RS, which may be restricted on certain RBs, subbands, and/or resource block groups (RBGs)). The P-TX signaling may not need to include a CSI-IMR. The number of layers and/or antenna ports may be indicated. The signaling may indicate to a UE the RBs, subbands, RBGs, and/or virtual component carriers (CCs) on which the UE is to perform probing measurements based on the P-RS. The signaling may indicate to a UE that averaging is not to be performed on the probing resources. The signaling may indicate to a UE the RBs, subbands, RBGs, and/or virtual CCs on which the UE is not to perform measurements based on the P-RS. For those CSI-RS REs, regular CSI-RS based measurements may be performed as indicated, or the UE may ignore those CSI-RS for measurements as indicated.

If, according to certain embodiments, the UE is required to report measurements for all the RBs, subbands, RBGs, and/or virtual CCs but the UE was not informed by the pre-scheduling signaling to perform measurement on some of the RBs, subbands, RBGs, and/or virtual CCs, the UE may assume regular CSI-RS-based measurements on those resources and report on those measurements, or the UE may report INVALID. Multiple probing processes may be indicated. The manner in which the measurement report is to be generated may also be indicated. The P-TX signaling may also include information related to the uplink, such as whether the UE should report its measurements on the PUCCH or the PUSCH and the subframes and/or RBs on which the UE should report its measurements. The P-TX signaling may or may not be in the same subframe and/or same carrier as the P-RS, In other words, a cross-subframe and/or cross-carrier pre-scheduling may be allowed. P-TX signaling that includes such information may be referred to as a trigger, since such signaling triggers the UE to perform measurements on the probing signals. Likewise, a DCI that includes such information may be referred to as a trigger.

The UE may generate one probing measurement report based on all probing resources indicated by the signaling. In other words, a common MCS and/or SINR for all probing resources indicated by the signaling may be generated and reported. Alternatively, multiple probing measurements for the RBs, subbands, and/or RBGs as indicated by the signaling (or for all RBs, subbands, RBGs, and/or virtual CCs in the carrier) may be generated. In other words, a separate MCS and/or SINR for each frequency unit of the probing resources indicated by the signaling (or for the entire bandwidth of the carrier) may be generated and reported. The probing measurement report may contain less information than traditional CQI reporting. In particular, the probing measurement report may contain only the MCS level selected by the UE based on the probing signal.

The A-TX scheduling signaling may be related to the P-TX pre-scheduling signaling. For example, the UE may assume the resource allocations in the two subframes are identical, unless the eNB modifies the allocations. In general, the rank, layer, port, and/or PMI (if needed to be signaled to the UE, such as in a non-DMRS-based TM) may be the same as the P-TX, so the signaling may not need to carry those fields. However, information such as the updated MCS or the new data indicator may need to be signaled. Alternatively, A-TX scheduling signaling may be independent of the P-TX pre-scheduling signaling, and the eNBs may have more flexibility in modifying the A-TX resource allocation.

In probing-based link adaptation, multiple eNBs may transmit probing signals at the same time and on the same frequency resources. Thus, the UE may experience interference that swamps the signal. In an embodiment, frequency unit bundling may be used to address this issue. A frequency unit may be RBs, subbands, RBGs, or virtual CCs. The following embodiment is illustrated on RB bundling but may apply to similar frequency unit. In RB bundling, a few RBs (e.g., 2, 3, 5, 6, 10, 12, or more) may be bundled as one pre-scheduling unit or scheduling unit. As a consequence, an eNB may assign the bundled RBs to one UE, with the same precoding. For example, for eNB1, the P-RS on RBs 0, 1, 2 may be assigned for UE1 and one common precoding may be used on these P-RS, and the P-RS on RBs 3, 4, 5 may be assigned for UE2 and one common precoding may be used on these P-RS, and so on. More than one bundle of RBs may be assigned to one UE. For eNB2, the P-RS on RBs 0, 1, 2 may be assigned for UE3 and one common precoding may be used on these P-RS, and the P-RS on RBs 3, 4, 5 may be assigned for UE4 and one common precoding may be used on these P-RS, and so on. The bundling for the eNBs may be aligned. The bundling may be known to both the eNBs and their UEs in probing. The UE may assume the interference on each bundle be the same. For example, for each of the dominant interferers performing probing, the precodings on the P-RS in the bundle are the same. Hence, the UE may estimate the interference e.g., interference statistics and interference covariance matrices, more accurately on the P-RS on each bundle for better estimation of SINR, CQI, and/or MCS. Across the bundles for the UE, the UE may not be able to assume the interference be the same unless being notified by the eNB otherwise. The bundling may also help reduce signaling overhead for probing.

The above example is for pre-scheduling or P-TX. For A-TX, bundling may or may not be used, and if used, the same or different bundling may be used. In any case, the eNBs may need to ensure that the interference (or at least the interference from the dominant interferers) seen by each UE is the same as in the P-TX. For example, if in P-TX, eNB1's UE1 is assigned with RBs 0, 1, and 3 with precoding x, and eNB2's RBs 0, 1, and 3 have precoding A, A, and B, then in the A-TX, eNB1 may assign UE1 with RBs 0, 1, and 3 with precoding x, and eNB2 may assign precoding A, A, and B to RBs 0, 1, and 3. Alternatively, in the A-TX, eNB1 may assign a UE with RBs 0–5 with precoding x, and eNB2 may assign precoding A, A, A, A, B, and B to RBs 0~5 respectively. The latter may benefit from coordination between the eNBs. In other words, the eNBs may need to coordinate their resource allocation for the A-TX via the backhaul. If all eNBs keep their resource allocation from P-TX for A-TX, then no coordination may be needed. If A-TX RB bundling is used, the eNB may notify the UEs so that the interference estimation and channel estimation may be more accurate.

In an embodiment, the eNBs may coordinate with one another so that the eNBs transmit the probing signals in the same resources at the same time and so that the eNBs transmit the actual data at the same time after transmitting the probing signals. In particular, the eNBs may need to coordinate on the resources for probing (e.g., setting aside P-RS resources common to all eNBs). Such resources may include the P-RS periodicity, subframe offset, P-RS locations within the subframe, and/or number of maximum layers for the P-RS. Also, if RB bundling is to be used, all eNBs may need to set the same bundling. In addition, if A-TX resource allocation differs from P-TX resource allocation, then resource allocation may need to be coordinated among the eNBs. In some cases, the eNBs may act as peers and exchange coordination information among themselves in a distributed manner. In other cases, one of the eNBs may be elected to act as a coordinator. In yet other cases, some other entity in communication with the eNBs may act as a coordinator.

The use of probing may increase overhead comparing to cases without probing. To help reduce the overhead for probing, some overhead may be minimized. For example, the overhead due to CRS may be minimized since P-RS is now used for link adaptation. The eNB may signal the legacy UEs that a subframe is a multicast-broadcast single frequency network (MBSFN) so that CRS needs to appear on the first OFDM symbol and nowhere else. The eNB may configure UEs with dedicated reference signal (DRS)-based measurements and not CRS-based measurements and then CRS may not be transmitted. The eNB may deactivate a carrier for legacy UEs and transmit DRS for new UEs. The eNB may apply fast carrier on/off, and CRS may be transmitted only if the carrier is turned on for data transmission. EPDCCH may be used to replace PDCCH, so that the UE does not need to rely on CRS. However, if EPDCCH is used, there may be a discrepancy between the EPDCCH precoding in the A-TX and the probing precoding in the P-TX. To resolve this issue, EPDCCH precoding may be used in the P-RS as well, or the eNB may ensure that EPDCCH for a UE is transmitted in the RB bundle for the UE. Reducing the CRS may also help improve probing accuracy, as CRS is not precoded and, in certain embodiments, may not be probed.

Upon receiving the P-TX from its allocated resources, a UE may calculate the received channel quality, e.g. SINR, using the same type of receiver as for later data transmission. If there is difficulty in deriving the received channel quality with specific receivers, e.g. an ML receiver, due to the low density of the P-TX signal, the UE may apply parameters associated with a minimum mean squared error-interference rejection combining (MMSE-IRC) receiver in the calculation. The channel quality results may be used for reporting probing recommendations in different manners. In one manner, the UE may map the channel quality results onto certain CQI values by also taking into account the performance difference between a data demodulation receiver and a probing MMSE-IRC receiver. The network may then adjust the MCS in the A-TX transmission accordingly. In another manner, the network does initial data transmission scheduling. After the UE obtains the channel quality estimation from P-TX transmission, the results are compared with the scheduled transmission conditions. The UE may report to the network the UE's recommended MCS adjustment, e.g., +1 or −1 from the initial scheduled value.

To configure the P-TX transmission, if there are UEs supporting different numbers of layers in the network, the network may need to make sure that the configuration may accommodate the maximum possible layers in A-TX transmission. As an example, two UEs served by two eNBs, supporting 2 and 4 layers of data transmission, are active in the system and are pre-scheduled on the same RBs of the two eNBs of the same subframe. The network may configure 4-port CSI-RS resources for transmitting P-TX to the UE targeting 4-layer data transmission and configure two 2-port CSI-RS resources for transmitting P-TX to the UE targeting 2-layer data transmission. The 2-port CSI-RS resources may completely overlap with the 4-port CSI-RS resources. P-TX signal transmitted in these two 2-port CSI-RS resources may be different but may still have the same precoding or may simply be repeated. In the former case, the UE may or may not need to know the second 2-port CSI-RS resources for probing, but the UE may need to know the second 2-port CSI-RS resources for rate matching. In the latter case, the UE with the two 2-port CSI-RS resources may assume identical signals and precoding are used across the two 2-port CSI-RS resources (if signaled or specified). However, the P-RS on the same subframe of an eNB may have different maximum possible layers in different RBs (or RB bundles, etc.), as long as the P-RS on the same RB across neighboring eNBs have completely overlapping P-RS resources.

Besides a UE reporting recommended CQI or MCS adjustment values, the UE may also be configured to report a recommended transmission rank. Typically, rank is scheduled before the transmission of P-TX and remains the same during P-TX and A-TX. After the processing of P-TX, the UE may find favorable or unfavorable channel conditions for an upcoming A-TX if the same rank is maintained, but the UE may also report to the network its favorite rank. The reported rank may be higher or lower than the original scheduled rank. The rank reporting format may be an absolute rank with an index or an offset from a scheduled rank. For example, a UE may be scheduled for rank 2 transmission and upon deriving the channel quality from P-TX, the UE may report to the network suggesting that the UE prefers rank 1 transmission in the second layer. The network may or may not follow the UE's suggested rank for the transmission of A-TX. If the network does follow the UE's suggestion and changes the rank, some coordination may be needed between the transmitting eNBs.

With the probing signal, the UE has a much better estimation on the actual interference experienced in the data transmission. Therefore, the UE may target a smaller block error rate than normal CSI reporting, which may target average channel and interference conditions, e.g., 2% vs. 10%. In the testing of UE reporting accuracy, a legacy testing methodology and metric may be reused.

Probing-based link adaptation may be applied to a number of scenarios. For example, such adaptation may be used for current LTE systems, with pre-coordination of the probing resources and bundling, with P-TX signaling, and with additional operations to ensure that the A-TX and P-TX are consistent. To help overcome the issue of fewer resources for P-RS interference estimation, RB bundling of a sufficient number of RBs may be used, which implies that probing may be especially effective in a wideband system (e.g., hundreds of RBs within one carrier, which may be the case for C-band, mmWave bands, etc.). The large RB bundle also implies that fewer UEs may be multiplexed in a subframe, but this limitation may not be a problem for a wideband system, especially for mmWave systems, which may have only a few UEs multiplexed. A system with shorter TTI is also more suitable for probing as the delay caused by probing may be reduced. Probing may also be used effectively for wireless backhaul transmissions for similar reasons. Furthermore, probing may significantly help MU-MIMO transmissions, as the paired UEs may estimate their CQI, SINR, and/or MCS more accurately after the pairing. To this aim, the eNB may pair UEs on the common P-RS resources on the P-TX, with precodings to the UEs and with tentative MCS levels for the UEs. Then the UEs may be signaled with their associated sequences, layers, and/or ports and paired layer information (in the case of non-transparent MU-MIMO) and may obtain their probing results. Then the eNB may transmit in the A-TX to the paired UEs with MCS levels updated based on probing. In MU-MIMO probing, the paired UEs in P-TX and A-TX may be consistent. Similarly, probing may be useful for CoMP, and the P-RS signals and their precoding may be from different (virtual) cells.

Probing configuration and configuration signaling from the eNB to the UE may include a number of items. Measurement process configuration may include, for example, a number of regular and/or probing processes and their IDs, antenna ports for the regular and/or probing processes, and/or layers for the regular and/or probing processes. Probing resource configuration may include, for example, P-RS periodicity (which may not be present for aperiodic probing), P-RS subframe offset (which may not be present for aperiodic probing), P-RS RE locations, CSI-RS configurations, antenna ports for the probing processes, and/or layers for the probing processes. Probing signal configuration may include, for example, sequences for serving cells, sequences for interfering cells, layers and/or ports of the serving cell signals and interfering cell signals, and/or MCS levels for the layers and/or ports of the serving cell signals and interfering cell signals. Probing triggering configuration may be based on, for example, pre-scheduling signaling, the associated DCI information, radio network temporary identifier (RNTI), resource allocation types, and/or resource allocation granularity. Probing measurement configuration may include, for example, signal measurement and interference measurement restrictions in time, frequency, antenna ports, and/or layers, including bundling if any. Reporting configuration may include, for example, periodic reporting via PUCCH, aperiodic reporting via PUSCH with associated time/frequency resources, and/or reporting of one or more of MCS, CQI, SINR, recommended RI, bit error rate (BER), block error rate (BLER), frame error rate (FER), log-likelihood ratio (LLR), ACK/NACK, delta MCS, delta CQI, delta SINR, delta rank, etc., for each frequency unit and/or for all specified resources, for each layer. Configuration of possible association of the P-TX and A-TX may include, for example, subframe offset between the P-TX and A-TX, P-TX and A-TX on the same CC or on different CCs (for carrier switching), resource allocation relation between the P-TX and A-TX, and/or quasi-co-location relation between the antenna ports of the P-TX and A-TX.

Embodiments of the probing process may help significantly simplify retransmission and hybrid automatic repeat request (HARQ) functions, since the first transmission will often occur successfully. For example, the DCI may be changed such that the New Data Indicator is by default "new data" or is even removed, and the New Data Indicator may be indicated only in rare event that retransmission is needed. The HARQ process ID may be treated similarly. UE soft buffer management may also be simplified to deal with essentially no retransmission. Complicated HARQ timing may not need to be maintained, especially for TDD systems.

3GPP recently completed a study involving elevated beamforming/full-dimensional MIMO (EBF/FD-MIMO). The study proposed to utilize the elevation dimension to improve the quality of service for cellular users in urban and/or dense deployment scenarios. One of the features suggested in the study is a beamformed CSI-RS. Benefits of using beamformed reference signals include better support of EBF/FD-MIMO with more antenna ports and improved signal estimation quality owing to beamforming gains.

Figure 14:
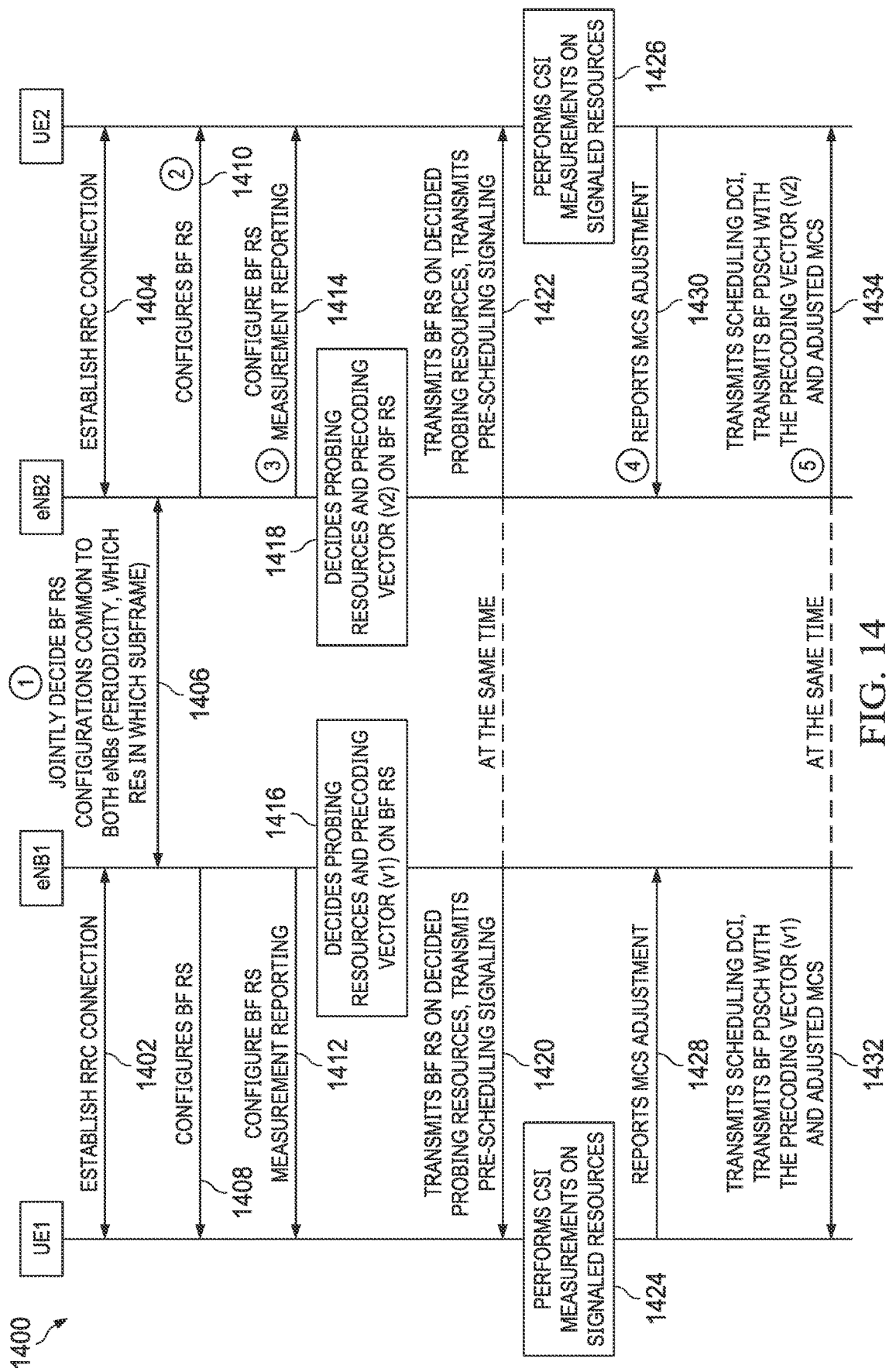
FIG. 14 illustrates an embodiment procedure for probing for link adaptation, according to certain embodiments of this disclosure.

FIG. 14 illustrates an embodiment procedure 1400 for beamforming of reference signals, according to certain embodiments of this disclosure. At event 1402, UE1 and eNB1 establish a radio resource control (RRC) connection, and at event 1404, UE2 and eNB2 establish an RRC connection. At event 1406, eNB1 and eNB2 jointly decide beamforming reference signal configurations common to both eNBs, such as periodicity and which REs are present in which subframes. The circled numerals in FIG. 14 indicate steps for which more details will be provided in FIG. 15. At event 1408, eNB1 configures beamforming reference signals for UE1, and at event 1410, eNB2 configures beamforming reference signals for UE2. At event 1412, eNB1 configures beamforming reference signal measurement reporting for UE1, and at event 1414, eNB2 configures beamforming reference signal measurement reporting for UE2. At event 1416, eNB1 decides on probing resources and a precoding vector (v1) on the beamforming reference signal, and at event 1418, eNB2 decides on probing resources and a precoding vector (v2) on the beamforming reference signal. At event 1420, eNB1 transmits the beamforming reference signal on the decided probing resources and transmits pre-scheduling signaling to UE1, and at event 1422, eNB2 transmits the beamforming reference signal on the decided probing resources and transmits pre-scheduling signaling to UE2. Events 1420 and 1422 may occur at the same time. At event 1424, UE1 performs CSI measurements on the signaled resources, and at event 1426, UE2 performs CSI measurements on the signaled resources. At event 1428, UE1 reports an MCS adjustment to eNB1, and at event 1430, UE2 reports an MCS adjustment to eNB2. At event 1432, eNB1 transmits scheduling DCI and a beamforming PDSCH with the precoding vector v1 and the adjusted MCS to UE1, and at event 1434, eNB2 transmits scheduling DCI and a beamforming PDSCH with the precoding vector v2 and the adjusted MCS to UE2. Events 1432 and 1434 may occur at the same time.

Figure 15:
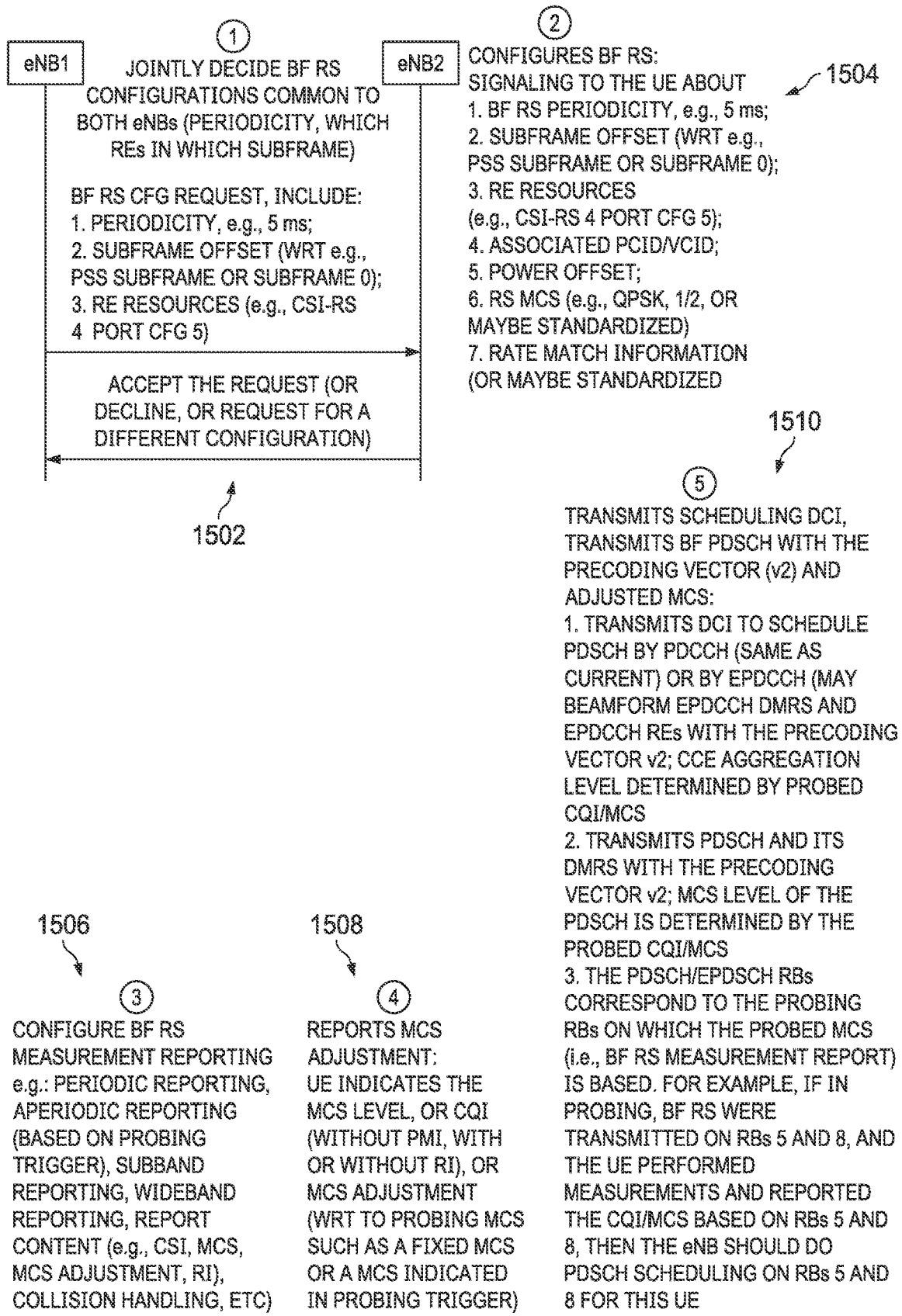
FIG. 15 illustrates details of an embodiment procedure for probing for link adaptation, according to certain embodiments of this disclosure.

FIG. 15 provides an embodiment of more details regarding the embodiment procedure 1400 for beamforming of reference signals that was illustrated in FIG. 14, according to certain embodiments of this disclosure. Block 1502 provides details regarding event 1406 in FIG. 14, where eNB1 and eNB2 jointly decide beamforming reference signal configurations common to both eNBs. At that event, eNB1 sends eNB2 a beamforming reference signal configuration request that may include a periodicity, such as 5 ms, a subframe offset with respect to, for example, a PSS subframe or subframe 0, and RE resources. eNB2 then accepts the request, declines the request, or requests a different configuration. Block 1504 provides details regarding event 1410 in FIG. 14, where eNB2 configures beamforming reference signals for UE2. The configuration may include the periodicity, the subframe offset, the RE resources, an associated physical cell ID/virtual cell ID (PCID/VCID), a power offset, a reference signal MCS, and rate matching information. Block 1506 provides details regarding event 1414 in FIG. 14, where eNB2 configures beamforming reference signal measurement reporting. The reporting may be periodic reporting, aperiodic reporting based on a probing trigger, subband reporting, and/or wide-band reporting. The configuration may specify report content, such as CSI, MCS, MCS adjustment, and/or RI. The configuration may also specify collision handling procedures. Block 1508 provides details regarding event 1430 in FIG. 14, where UE2 reports an MCS adjustment to eNB2. At that event, UE2 may indicate the MCS level or the CQI (without PMI and with or without RI) or an MCS adjustment with respect to a probing MCS, such as a fixed MCS or an MCS indicated in a probing trigger. Block 1510 provides details regarding event 1434 in FIG. 14, where eNB2 transmits scheduling DCI and a beamforming PDSCH with the precoding vector v2 and the adjusted MCS to UE2. At that event, eNB2 transmits DCI to schedule a PDSCH by a PDCCH or by an EPDCCH. eNB2 may beamform the EPDCCH DMRS and EPDCCH REs with the precoding vector v2. The CCE aggregation level may be determined by a probed CQI/MCS. eNB2 then transmits the PDSCH and its DMRS with the precoding vector v2. The MCS level of the PDSCH is determined by the probed CQI/MCS. The PDSCH/EPDSCH RBs correspond to the probing RBs on which the probed MCS (e.g., the beamforming reference signal measurement report) is based. For example, if in probing, beamforming reference signals were transmitted on RBs 5 and 8, and UE2 performed measurements and reported the CQI/MCS based on RBs 5 and 8, then eNB2 may do PDSCH scheduling on RBs 5 and 8 for UE2.

A CSI process may be configured with class A CSI reporting, class B CSI reporting, or both. In Class A, a UE reports CSI according to W=W1W2 codebook based on {[8],12,16} CSI-RS ports; this is basically the legacy behavior. In Class B, a UE may report L-port CSI, based on, e.g., an indicator for beam selection and L-port CQI/PMI/RI for the selected beam, where the total configured number of ports across all CSI-RS resources in the CSI process is larger than L. Alternatively, the UE may report L-port precoder from a codebook reflecting both beam selection and co-phasing across two polarizations jointly, where the total configured number of ports in the CSI process is L. Alternatively, the UE may report a codebook reflecting beam selection and L-port CSI for the selected beam, where the total configured number of ports across all CSI-RS resources in the CSI process is larger than L. Alternatively, the UE may report L-port CQI/PMI/RI, where the total configured number of ports in the CSI process is L.

Beam selection by a UE constitutes either a selection of a subset of antenna ports within a single CSI-RS resource or a selection of a CSI-RS resource from a set of resources. When a beam is selected and the index associated with the beam is sent by the UE, this may be referred to as beam index (BI) reporting. However, as the beam actually corresponds to a particular CSI-RS resource (or resource configuration), what is seen and selected by the UE is just the CSI-RS resource (or resource configuration) associated with the beam. For this reason, BI may also be referred to as CSI resource indicator (CRI) or the like.

Measurement restrictions for signal/channel measurements and interference measurements (IM) and methods for performing interference measurements in FD-MIMO will now be described.

Using interference measurement as an example, different CSI-IM REs (in time and/or frequency, or REs used for interference measurements) may experience different precoding weights. This is especially so as the precoding weights may be UE-specific and vary in time/frequency. An interference measurement based on time-domain and/or frequency-domain interpolation and/or averaging corresponding to different precoding weights may not have any clear physical meaning. A similar issue exists in signal/channel measurement. The eNB may change its beamforming in the time/frequency domains, for different UEs, for UE mobility support, for adaptation of vertical sectors (which may be a special form of virtual sectors, formed by different ways of eNB 2D antenna array analog/digital/hybrid beamforming/steering), etc. Therefore, measurement restriction (MR) may need to be applied in the time and/or frequency domains (independently or dependently), and for signal/channel measurements and interference measurements (independently or dependently).

For a given CSI process, if MR on channel measurement is ON, then the channel used for CSI computation may be estimated from X NZP CSI-RS subframes up to and including a CSI reference resource. Channel measurement is derived from NZP CSI-RS. MR may be based on Li triggering and/or higher-layer signaling for a dynamic CSI request. For a given CSI process with CSI-IM, if MR on interference measurement is ON, then the interference used for CSI computation may be estimated from Y CSI-IM subframes up to and including a CSI reference resource. Interference measurement is derived from CSI-IM. MR may be based on Li triggering and/or higher-layer signaling for a dynamic CSI request. If a CSI process may be configured without CSI-IM, for a given CSI process without CSI-IM, if MR on interference measurement is ON, then interference used for CSI computation may be estimated from V subframes up to and including a CSI reference resource.

In a first alternative (Alt1), fixed MR is turned ON or OFF via higher-layer configuration, and X and Y are each fixed to a single value.

In a second alternative (Alt2), configurable MR is turned ON or OFF via higher-layer configuration, and X={OFF, 1, . . . , NX} are higher-layer configurable and Y={OFF, 1, . . . , NY} are higher-layer configurable.

In a third alternative (Alt3), CSI measurement is periodically reset, where a reset period and a subframe offset are higher-layer configured. X is selected by the UE between 1 and ZX where ZX is the number of CSI-RS subframes between the latest measurement reset and the CSI reference resource. Y is selected by the UE between 1 and ZY where ZY is the number of CSI-IM subframes between the latest measurement reset and the CSI reference resource.

In the above descriptions, X is the number of CSI-RS subframes used for a UE to perform signal/channel measurement averaging/filtering, and Y is the number of subframes used for a UE to perform interference measurement averaging/filtering. If CSI-RS REs are used for IM, the subframes are CSI-RS subframes. If CSI-IM resources are used for IM, the subframes are CSI-IM resource subframes. If CRS REs are used for IM, the subframes are CRS-bearing subframes.

A CSI process is associated with K CSI-RS resources/configurations e.g. per definition in 3GPP TS 36.211, with Nk ports for the kth CSI-RS resource (K could be >=1). For class A and class B and all values of K, MR is independently configurable for each subframe set, when legacy measurement restrictions with two subframe sets are also configured in a CSI process. One RRC parameter for channel measurement (for class B) and one RRC parameter for interference measurement (for classes A and B) are provided to enable or disable MR. MR may apply to both periodic and aperiodic CSI reporting or only to aperiodic reporting (e.g., with MR never enabled for periodic reporting). For class A and class B with K=1, Alt1 (with X=Y=1) is supported. For class B with K>1, Alt1 (with X=Y=1) or Alt3 may be implemented, with the understanding that existing RRC parameters (e.g., the reset period is equal to the BI period and the offset is fixed) may be reused for Alt3, and consideration of aperiodic reset is also not precluded.

Alt3, where CSI measurement is periodically or aperiodically reset, is now described in more detail.

Figure 16:
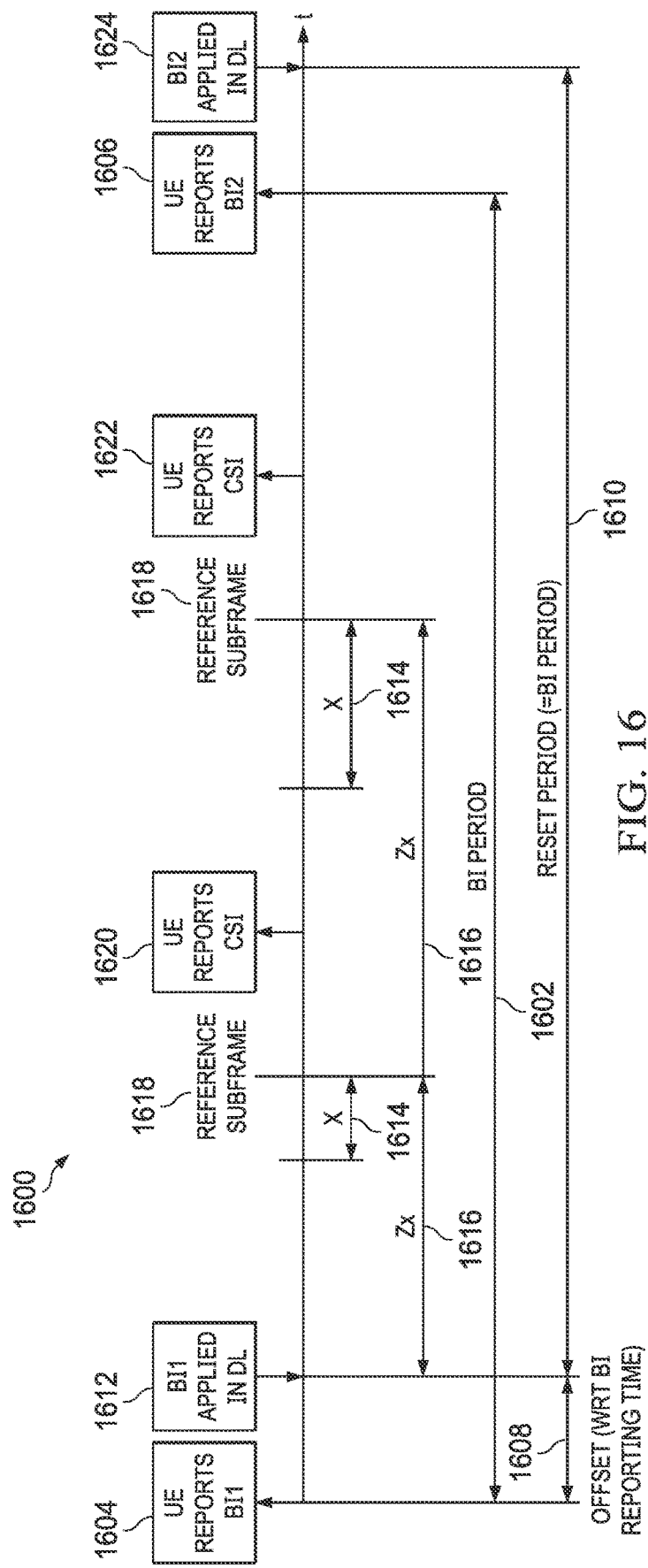
FIG. 16 illustrates an example of Alt3 from a UE point of view, according to certain embodiments of this disclosure.

FIG. 16 illustrates an example 1600 of Alt3 from the point of view of a UE, according to certain embodiments of this disclosure. Signal measurement is shown in the figure, but interference measurement may be done similarly. For simplicity, most of the descriptions assume the measurement reset is performed periodically and according to the BI period and reporting. However, the procedures may be easily generalized to cases with aperiodic reset and/or according to some triggering signaling (which may be independent for signal/channel measurement and interference measurement).

A BI period 1602 starts on the subframe 1604 where the UE reports BI1 and ends on the subframe 1606 where the UE reports BI2. The UE may receive the BI periodicity (or duration, together with subframe offset) information indicated at the subframes 1604 and 1606 where the UE reports BIs. The UE assumes the CSI measurement reset period is equal to the BI period 1602, with potentially an offset 1608 with respect to the BI reporting subframe 1604. The offset 1608 may be specified. A reset period 1610 may be equal to the BI period 1602. The new BI (e.g., BI1) starts to be applied in DL transmission/reception on a subframe 1612 later than the BI1 reporting, and the UE resets its CSI measurement process on this subframe 1612. The UE selects a value X 1614 between 1 and Zx 1616, where Zx 1616 is the number of CSI-RS subframes between the measurement reset subframe 1612 and the reference resource 1618. Two CSI reporting instances 1620 and 1622 are shown. For the first instance 1620, Zx 1616 is smaller, whereas Zx 1616 is larger for the second instance 1622. The same X value 1614 or different X values 1614 may be selected by the UE. BI2 may be applied in DL transmission/reception on a subframe 1624 later than the BI2 reporting.

The benefits of Alt3 include better measurement accuracy, as more averaging is applied to the measurement process of the same characteristic. For example, in a network with time-invariant beamforming (as opposed to time-varying beamforming) within each BI period, the UE may perform averaging across the subframes within each BI period, and this may lead to higher measurement accuracy.

The value of X may not need to be specified. From the UE's perspective, the UE may only need to know when the reset will be performed and where the reference resources are located. Based on these values, the UE knows Zx, and the UE may flexibly select X accordingly and autonomously. The X value may be same or different for respective Zx, and may be same or different for respective reset period, etc. In addition, the UE filtering behavior may resemble the legacy filtering behavior (which has no measurement restriction) except for an occasional measurement reset. Therefore, the manner in which filtering is done is a UE implementation issue. In other words, no mention of X is needed and it may be sufficient that the UE may reset its measurement process according to the reset timings. This also helps minimize impact.

A UE may support at least three types of behavior.

An example of a first behavior involves Alt1 (with X=Y=1), wherein the measurement is restricted based on only one subframe. This alternative is suitable for cases with dynamic beamforming or cases where the UE may not have sufficient knowledge about how or when the serving or interfering eNB beamforming is changing. This alternative provides the highest flexibility for the network to adapt the beamforming while not considerably increasing the signaling overhead.

An example of a second behavior involves Alt3 (measurement reset), wherein the measurement process is reset according to a network indication or triggering, for example by BI reporting. This alternative is suitable for cases with semi-static beamforming or cases where the UE has sufficient knowledge about the subframes on which the beamforming remains constant or cases where longer-term measurement is useful (e.g., in interference measurement for some BI reporting). This alternative may offer higher measurement accuracy than Alt1.

An example of a third behavior, there is no measurement restriction (e.g., the legacy measurement behavior). This is already supported and used for legacy measurements, such as CSI based on non-precoded CSI-RS.

It may be preferable for Alt1 (e.g., one subframe measurement restriction (i.e., with X=Y=1)) to be supported. Alt3 may also be considered in order to provide more options to the network/UE operations, which may strike different tradeoffs between flexibility to changing beamforming and measurement accuracy.

To conclude, a UE may support Alt1 (with X=Y=1) and Alt3 (measurement reset) for Class B with K>1. For Alt3 (measurement reset), only the reset event and instant may need to be specified, e.g., BI reporting, and other parameters may be left for UE implementation.

The reset may be tied with the BI reporting, with potentially an offset. The BI reporting may be periodic or aperiodic. In the aperiodic case, the BI reporting may be triggered by signaling in the PHY layer. Signaling may be used for BI reporting triggering only, or BI+RI (as both are long-term measurements), or BI+RI+CQI (there may not be a PMI associated with the CSI process), or BI+RI+CQI+PMI. The trigger may specify which measurement quantities are reported and which measurement quantities correspond to which BI (old BI or new BI) and/or RI. Alternatively, the trigger may merely specify which CSI processes should be reported, and the associated reporting quantities may be configured via RRC. Alternatively, the triggering signaling may not be a new signaling, and the existing aperiodic trigger for RI may be reused instead if reporting class B is configured. Alternatively, the reset may be tied to RI reporting, BI and RI reporting, a new triggering signaling not related to BI reporting but used for signal/interference reset purposes, or a combination of these options. The network may configure and support these operations.

The resets for signal measurement and interference measurement may be triggered by the same event or signaling, such as BI reporting. In this case, the eNBs may coordinate their adaptation of the beamforming on the CSI-RS and/or data (or other adaptation such as on/off) so that the eNBs adapt at the same time. If such triggering is regarded as restrictive, separate reset triggers may be used for signal measurement and IM. For example, a UE may be in a sector with an interfering sector changing its precoding every 80 subframes, and the UE's serving sector may be changing its precoding every 240 subframes. In such a case, the signal measurement may reset every 240 ms, but the IM may need to reset every 80 ms. In other words, it is possible that whenever a dominant interferer adapts its transmissions and causes a different interference condition, signaling may be sent from the serving sector to the UE for IM reset.

Between BI reporting and BI application (e.g., the UE measurement reset instant), there may be an offset measured as a number of subframes. This offset is likely to be four subframes, as the eNB may take about four subframes to process and prepare to switch and also considering the timing difference between UL and DL. Alternatively, the offset may be signaled to the UE, such as in RRC signaling for MR configuration, or in the Li trigger.

If CSI or part of the CSI is triggered to be reported with BI, especially in the K>1 cases, there may not be sufficient time for the UE to generate the CSI measurement results associated with the new BI. One technique that may be adopted to address this issue is to allow a longer latency for BI reporting after the triggering. In other words, the UE may wait until after the reset (e.g., BI reporting time+reset offset) and then report CSI associated with the new BI. Another technique that may be adopted to address this issue is for the UE to report CSI associated with the old BI instead of the new one. In other words, before the reset, the UE may still base its CSI calculation and reporting on the old BI. For periodic reporting of BI, this issue may be less important, so the UE may be capable of reporting CSI associated with the new BI. However, in order to decrease UE complexity, it may be still desirable to report CSI associated with the old BI until the reset.

Interference measurement will now be considered. Interference measurement approaches include interference measurements with CSI-IM resources (also known as IMR) and interference measurements without CSI-IM resources.

For interference measurements with CSI-IM configured, there may be one or more CSI processes (e.g., CoMP) for a UE, and each CSI process may be configured with CSI-RS and CSI-IM. The associated transmission mode may be TM10 or its further evolution. A CSI process may be associated with one or more CSI-RSs and one or more CSI-IMs. For simplicity, the description may be mainly directed toward one CSI-RS/CSI-IM per CSI process, and it may apply similarly to cases with multiple CSI-RS/CSI-IM per CSI process. There are two cases when CSI-IM is configured, including the CSI-IM is covered and is not covered by ZP CSI-RS resources of adjacent eNBs and/or virtual sectors.

Figure 17:
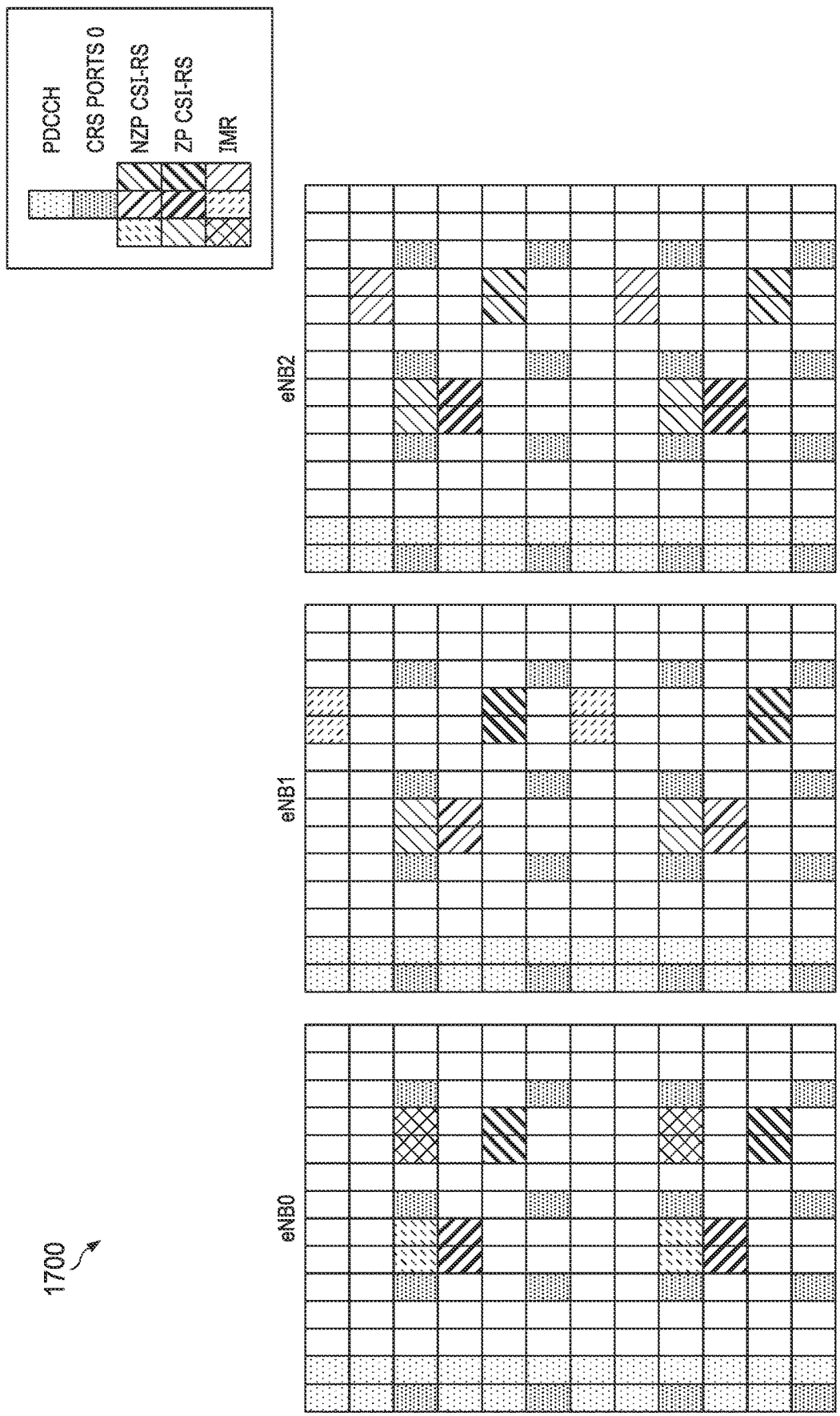
FIG. 17 illustrates an example of resources for CSI measurements with CSI-IM not covered by adjacent eNBs' ZP CSI-RS resources, according to certain embodiments of this disclosure.

FIG. 17 illustrates an example of resources 1700 for CSI measurements in a case where CSI-IM is not covered by ZP CSI-RS resources of adjacent eNBs, according to certain embodiments of this disclosure. For such a case, adjacent eNBs do not configure ZP CSI-RS on the time/frequency resources corresponding to the UE's CSI-IM, and no eNB coordination on CSI-IM REs may be appropriate.

The interference perceived on CSI-IM REs by the UE may be generally the same as the interference being perceived on non-CSI-IM REs. Such interference reflects the current interference being experienced by the UE and might not reflect prospective interference the UE may be experiencing; especially if the interfering cells or virtual sectors are changing their beamforming and when the interference measurement is used for link adaptation in later subframes.

In FIG. 17, there are 16 CSI-RS REs per eNB, in other words, 4 REs for signal, 8 REs for muting of adjacent eNB signals, and 4 REs for CSI-IM. In the case of virtual sectors (e.g., each 'eNB' is actually a virtual sector, and the virtual sectors are actually controlled by the same eNB), a UE may need to be configured with all the CSI-RS/CSI-IM and may perform rate matching around them, which amounts to 24 REs in total.

Figure 18:
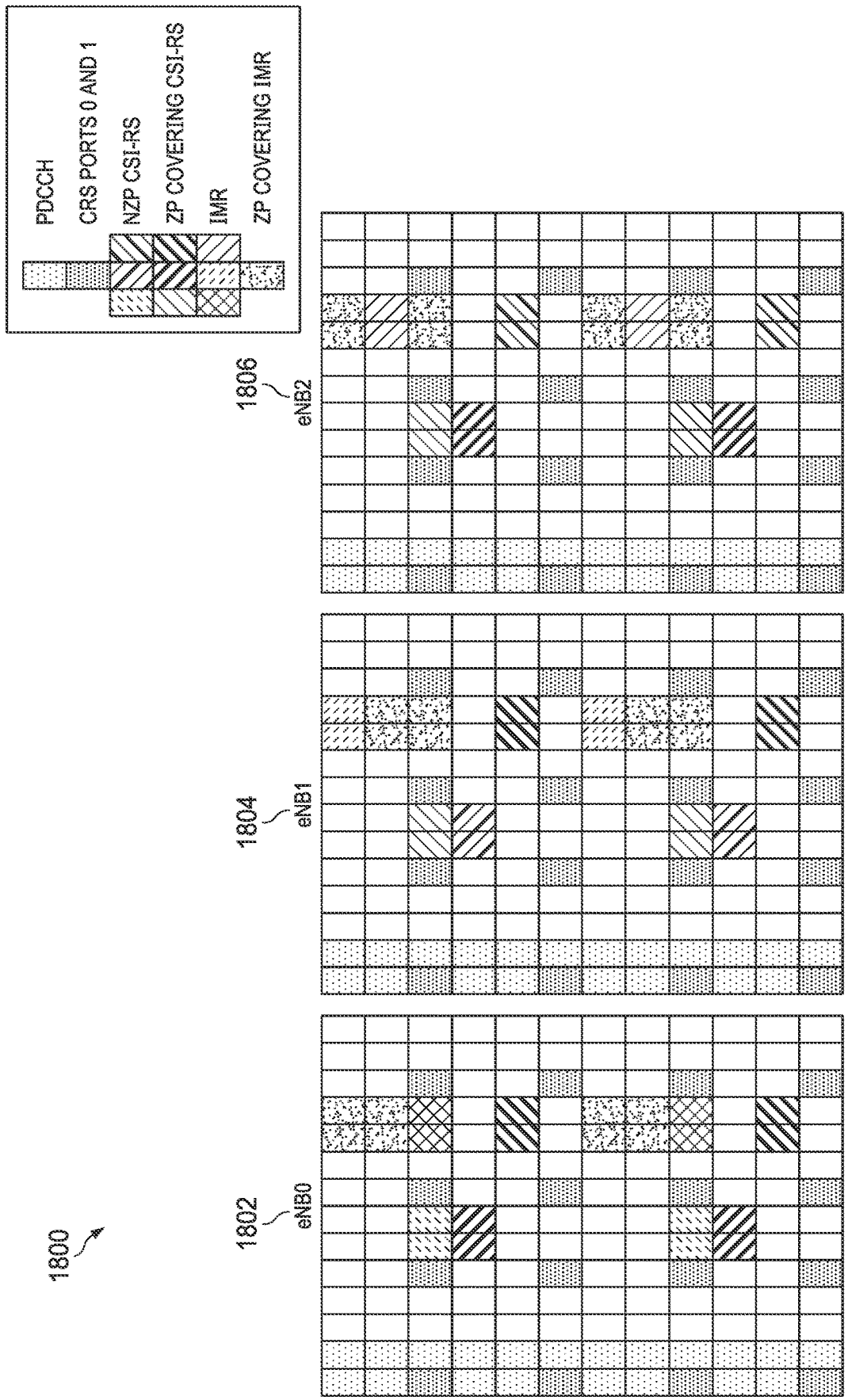
FIG. 18 illustrates an example of resources for CSI measurements with CSI-IM covered by adjacent eNBs' ZP CSI-RS resources, according to certain embodiments of this disclosure.

FIG. 18 illustrates an example of resources 1800 for CSI measurements in a case where CSI-IM is covered by ZP CSI-RS resources of adjacent eNBs, according to certain embodiments of this disclosure. In particular, the CSI-IM of eNB0 1802 overlaps with the ZP CSI-RS of eNB1 1804 and eNB2 1806. The interference measured by eNB0's UE on the CSI-IM is what eNB1 1804 and eNB2 1806 transmit on those ZP CSI-RS, which may not be the same as the PDSCH transmissions from eNB1 1804 and eNB2 1806 and which may generally need to be rate matched by UEs associated with eNB1 1804 and eNB2 1806.

For the case illustrated in FIG. 18, adjacent eNBs may need to configure zero-power CSI-RS on the time/frequency resources corresponding to a UE's CSI-IM, and their transmissions on those resources may need to be consistent with the coordinated transmission hypotheses. As a result, those ZP CSI-RS resources may not be used for data transmissions by the adjacent eNBs (e.g., rate matching may be needed).

It may be noted that ZP CSI-RS does not may or may not be muting. If it is assumed that the CSI-IM of eNB1 1804 is covered by the ZP CSI-RS of eNB0 1802 and further assumed that eNB0 1802 serves UE0 and eNB1 1804 serves UE1, then from UE0's perspective, UE0 just performs rate matching around the ZP CSI-RS REs. Then eNB0 1802 may mute or transmit signals according to a coordinated hypothesis on the ZP CSI-RS REs, and in the latter case, the signals transmitted by eNB0 1802 are seen by UE1 as interference on the CSI-IM. Therefore, ZP CSI-RS here is a mechanism for providing the eNBs the flexible capability of measuring interference according to a certain transmission hypothesis.

The interference perceived on CSI-IM by the UE may not be directly related to the interference perceived on non-CSI-IM REs (e.g., data REs). Depending on how the eNB coordination is done, such interference may reflect the prospective interference the UE will experience. In other words, on an adjacent eNB's ZP CSI-RS, the transmissions may occur according to a transmission hypothesis determined by the network, and the hypothesis may be applied to actual transmissions several subframes later.

In FIG. 18, there are 24 CSI-RS REs, per eNB, in other words, 4 REs for signal, 8 REs for muting of adjacent eNB signals, 8 REs for transmissions for an adjacent cell UE's interference measurements, and 4 REs for CSI-IM. A UE may need to perform rate matching around at least these 24 REs.

Evolution of TM10 (or potentially a new transmission mode) and/or CSI-IM-based interference measurements may be needed in Release 13 to efficiently support FD-MIMO. In addition, the following enhancement, namely, measurement restriction, may be considered.

If CSI-IM is to be used for a UE operating in EBF/FD-MIMO and the CSI-IM is covered by an adjacent eNB's ZP CSI-RS, different CSI-IM REs (in time and/or frequency) may experience different precoding weights. This is especially so as the precoding weights may be UE-specific and may vary in time/frequency. The interference measurement based on time-domain and/or frequency-domain interpolation and/or averaging corresponding to different precoding weights may not have any clear physical meaning. Therefore, measurement restriction may need to be applied in the time and/or frequency domains. However, if the CSI-IM is not covered by an adjacent eNB's ZP CSI-RS, which is generally associated with no eNB coordination, measurement restriction may not be applicable. Therefore, measurement restriction for interference measurements may be more relevant if the CSI-IM is covered by an adjacent eNB's ZP CSI-RS than if not.

In another approach, interference measurements may not have CSI-IM configured. This approach is applicable to any non-CoMP scenarios, which may be the typical scenarios for FD-MIMO. For this approach, the CSI process is configured with no CSI-IM, and the associated transmission mode may be any other than TM10, such as TM9 or its extension. (3GPP TS 36.213 V12.7.0 R12 (2015-9), which is hereby incorporated herein by reference as if reproduced in full, states in Clause 70.2.1 that, "For a given serving cell, if the UE is configured in transmission modes 1-9, the "CSI process" in Table 70.2.1-1B and Table 7.2.1-1C refers to the aperiodic CSI configured for the UE on the given serving cell." Therefore, TMs 1-9 may be viewed to also have the concept "CSI processes" defined.) The interference measurements may be performed on CSI-RS REs or CRS REs. Performing the interference measurements on CSI-RS REs may be preferred. The following description assumes the interference measurements are done on CSI-RS REs.

Figure 19:
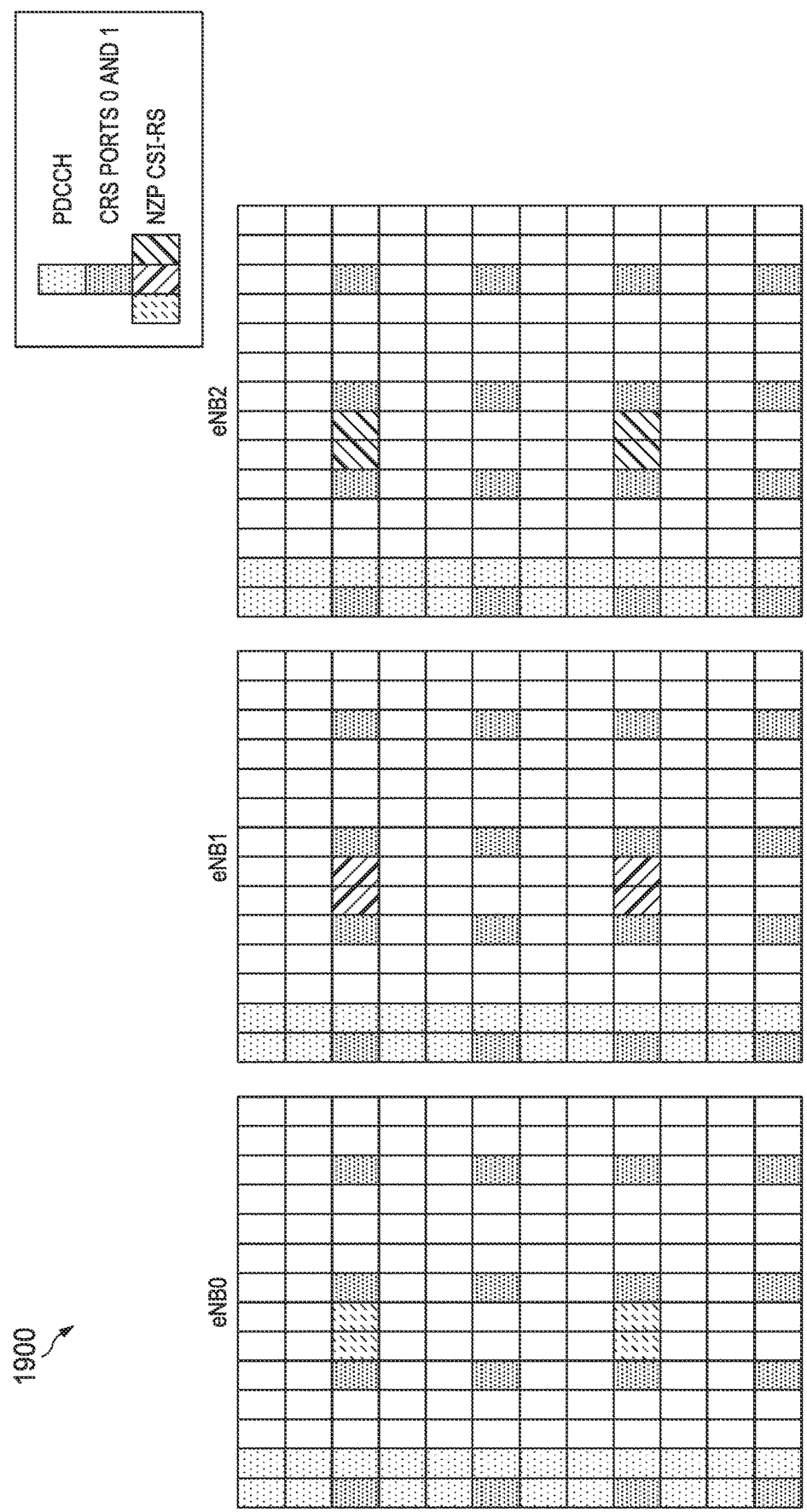
FIG. 19 illustrates CSI measurements without CSI-IM and with overlapping CSI-RS, according to certain embodiments of this disclosure.

FIG. 19 illustrates CSI measurements 1900 without CSI-IM and with overlapping CSI-RS, according to certain embodiments of this disclosure. A UE first detects the signal on the CSI-RS REs then subtracts that signal from the total received signal to obtain an interference estimate. More steps for interference measurements are involved in this case than with CSI-IM; however, such a capability may already be supported by the UE for CRS-based interference measurements. For this example case, the overhead is four REs (for CSI-RS) per eNB, and the UE performs rate matching around these four REs.

In other words, in an embodiment, a plurality of eNBs transmit reference signals on overlapping REs. In particular, a plurality of eNBs transmit the probing reference signal or P-RS described herein on REs specified for use for NZP CSI-RS. Since the reference signals overlap, a UE may perform measurements of both signal and interference on the same resources. Such a scheme may use less overhead than if separate REs are used for signal and interference and may also improve measurement accuracy. Overlapping transmissions from the eNBs may be distinguished from one another by having different scrambling IDs or scrambling sequences.

It is also possible to allow the CSI-RSs to be non-overlapped for the eNBs, but such an approach might not bring any benefit and might capture only the current interference instead of potential future interference (as the precoding weights on the CSI-RSs of an adjacent eNB may be used in later transmissions by the adjacent eNB; hence the precoding weights may be able to reflect potential future interference).

This approach may also allow the CSI process to have multiple CSI-RSs. The interference measurement resources for each CSI-RS are the CSI-RS REs.

It may be thought that the accuracy of interference measurement without CSI-IM may be reduced, mainly due to the need to first estimate and subtract CSI-RS signals (without RE muting) before obtaining the interference estimate. However, analysis may reveal that the measurement accuracy is not an issue.

First, RE muting, when introduced, was primarily applied to measurements of weak signals in CoMP. RE muting is generally not necessary for non-CoMP as the signals are typically sufficiently strong. Second, taking the above example, the number of REs used in interference measurement may be compared to the number of REs when demodulation using DMRS is performed. In the DMRS case, there are 12 REs per RB. In the above example, there are 4 REs per RB. However, with proper interpolation/averaging and measurement restriction (e.g., 3 or 6 RBs per feedback granularity), generally the CSI-RS REs from multiple RBs may be used. In this way, the accuracy of CSI-RS measurements may at least match the accuracy appropriate for demodulation, although sufficient measurement accuracy may be achieved at the cost of more operations in interference measurements. Additionally, the accuracy might be increased further due to beamforming gain since CSI-RS are precoded in EBF/FD-MIMO. Therefore, the measurement accuracy without CSI-IM may not be a concern.

Similar to CSI-IM-based interference measurements, it may also be important to introduce proper measurement restriction in the time/frequency domain for non-CSI-IM-based interference measurements. Therefore, CSI-RS REs may be used for interference measurements with sufficient measurement accuracy, and the interference measurements performed on CSI-RS REs may be enhanced by measurement restriction.

Table 1 compares the three interference measurement mechanisms described above.

TABLE 1

| | IM resource | Measured interference | Overhead | Require coordination | Require MR |
|---|---|---|---|---|---|
| A: CSI-IM not covered by adjacent eNB's ZP CSI-RS | CSI-IM REs | Present interference | Medium/high | No | Not applicable |
| B: CSI-IM covered by adjacent eNB's ZP CSI-RS | CSI-IM REs | Prospective interference | High | Yes | Yes |
| C: No CSI-IM | CSI-RS REs | Prospective interference | Low | No | Yes |

It may be seen that, in certain scenarios, mechanism C may be a suitable choice for FD-MIMO, although this disclosure contemplates using other mechanisms if appropriate.

It may be noted that mechanism B may cover mechanism C if the CSI-IM is allowed to overlap with the CSI-RS, with proper UE behavior clarified. More specifically, the following potentially unifying solution may be adopted.

First, the UE is configured with a NZP CSI-RS. The UE may be further configured with a CSI-IM that overlaps with the CSI-RS (for, e.g., TM10 or its evolution), or with no CSI-IM (for, e.g., TM9 or its evolution). Second, the UE performs signal/channel measurements based on the NZP CSI-RS. Third, the UE cancels NZP CSI-RS on the NZP CSI-RS REs, such that only interference is left on those REs. Fourth, the UE performs interference measurements on those REs.

Therefore, by allowing interference measurement on the NZP CSI-RS REs and adopting the above UE behavior, the benefits associated with mechanism C may also be achieved by mechanism B. In such a case, the UE behavior in mechanisms B and C becomes the same, which may simplify the standardization effort. If multiple NZP CSI-RS are configured on overlapped REs (for example, for multiple virtual sectors), then the UE may need to perform the second and third steps above for each NZP CSI-RS. For example, if the UE is configured with three NZP CSI-RS associated with three different virtual sectors on the same REs, the UE may detect each of the three NZP CSI-RS for signal/channel measurements and obtain three transmissions, S1, S2, and S3 (pre- or post-receiver combining). Then the UE subtracts the first NZP CSI-RS signal from the received signal on the REs, obtaining the interference estimation I1 associated with S1 transmission. The ratio of S1 and I1 plus noise (with proper combining applied, if any, and in the power domain) is then the SINR associated with S1 transmission. Other SINRs may be obtained similarly. Also, other measurement quantities including, but not limited to, CQI, CSI, PMI, RI, BI, and RRM measurements may be obtained.

To conclude, NZP CSI-RS REs may be used for interference measurements. The UE behavior may need to be clarified in such a case. These concepts may apply to two cases: TM10 or its evolution, with a CSI-IM that overlaps with the CSI-RS, and TM9 or its evolution, with no CSI-IM configured.

An embodiment method for downlink signaling in a wireless network includes signaling to a UE an index of a CSI-IM resource, CSI-RS resource, or CQI report/CSI process, together with a timing and/or a time period, wherein the UE measures and feeds back based on the resources associated with the indexes and timing, the UE assumes a new measurement condition for the indicated CSI-IM resource, CSI-RS resource, or CQI report/CSI process will be in effect since the indicated timing and/or according to the indicated time period, and the eNB adapts its transmissions (e.g., precoding, muting or non-muting) based on the indicated CSI-IM resource and/or CSI-RS resource according to the indicated timing and/or timing period.

An embodiment of a method for backhaul signaling in a wireless network is disclosed that includes signaling to a second eNB of a CSI-IM resource and/or CSI-RS resource, together with the timing and/or a time period, wherein the second eNB sends a DL signaling to a UE. In another embodiment of a method for backhaul signaling in a wireless network is disclosed that includes signaling to a second eNB of a CSI-IM resource and/or CSI-RS resource, together with the same timing and/or a time period, wherein the second eNB sends a DL signaling to a UE.

An embodiment method for backhaul signaling in a wireless network includes signaling to an eNB of an CSI-IM resource and/or CSI-RS resource, together with a timing, wherein a plurality of eNBs adapt their PDSCH transmissions (e.g., precoding, muting or non-muting) according to the transmissions on the indicated CSI-IM resource and/or CSI-RS resource at the indicated timing, and the eNBs signal UEs to stop the measurements and feedback according to the timing. In any case, if the timings are signaled, the timings may be signaled once at the beginning of the probing process (e.g., a sequence of timings of t0, t1, . . . , tk with a predetermined k), or signaled over time when needed.

In an embodiment method, the timing exchanged by eNBs and/or the timing exchanged between the eNBs and UEs are not present. This embodiment has the benefit of less signaling overhead. However, the probing may become lengthier in time and more likely to fluctuate. On the other hand, the timing may be either predefined or partially predefined so that either no signaling about timing or a simplified signaling about timing may be used. Thus the signaling overhead may be reduced.

Various embodiments of this disclosure provide systems and methods for channel measurement in a wireless network. In particular, a method and system for interference measurement of a channel in the wireless network are provided.

Performance in a wireless network may refer to measures of QoS and may be indicated by different ways of measuring the QoS. For example, the QoS, and thereby performance, of the wireless network may be indicated by measuring the bandwidth, throughput, latency, jitter, error rate, and other suitable metrics of the network. As a particular example, an error rate may be counted based on a number of received bits of a data transmission over a communication channel that may have been altered due to noise, interference, distortion or synchronization during transmission. Among the factors that may cause alteration of a data transmission, interference may be a fundamental issue. Interference may refer to anything which may disrupt or otherwise modify a signal as it travels along a channel between a transmitter and a receiver in a process of communication. For example, interference may include, but is not limited t0, noise, distortion, or other factors. In certain embodiments, interference refers to an addition of unwanted signals to a useful signal. Interference measurement (IM) may be important for resource management, including for reducing and controlling channel interference.

A method for adaptation in a wireless network may include a first base station signaling information of a first resource set to a first UE and/or a second base station, and the second base station signaling information of a second resource set to a second UE and receiving feedback from the first and second UEs for the resource sets. The method includes the first base station signaling a first timing to the first UE and/or the second base station, and the second base station signaling the first timing to the second UE and receiving feedback from the first and second UEs about the resource sets according to the first timing. The method further includes the first base station transmitting a first signal on a first subset of the first resource set according to the first timing, and the second base station transmitting a second signal on a second subset of the second resource set according to the first timing and receiving feedback from the first UE about the transmitted first signal, the first resource set, and the first timing. The method further includes the first base station transmitting a third signal on a third subset of the first resource set according to the first timing, the second base station transmitting a fourth signal on a fourth subset of the second resource set according to the first timing, the first base station signaling a second timing to the first UE or the second base station, and the second base station signaling the second timing to the second UE and receiving feedback from the UEs according to the second timing after the UEs stop measurements.

The resource set may be a resource block that includes a set of REs. In certain embodiments, an RE may be defined by a time and frequency resource within a subcarrier and an OFDM symbol. For example, twelve subcarriers in a slot may form a resource block.

A method for downlink signaling in a wireless network may include a UE receiving from a base station signaling of an index of a CSI-RS resource, CSI-IM resource, a CQI report, or a CSI process, together with a timing. The method further includes measuring and sending feedback to the base station in accordance with the indexed resource and the timing, assuming a new measurement condition for the indexed resource will be in effect according to the timing, and receiving adapted transmissions from the base station on the indexed CSI-IM resource and/or CSI-RS resource according to the timing.

Capacity power may function at zero-power (ZP) or non-zero-power (NZP) for a channel in a network. A node may cost power to remain ON to listen to transmissions from other nodes in a network.

Often interference measurement is taken when capacity power of a channel functions at ZP. A channel may transmit data when capacity power of the channel functions at NZP. In certain embodiments, it may be beneficial for interference measurement to be performed in association with data transmission (e.g., when capacity power of a channel functions at NZP). By doing so, more information may be gathered for resource management for reducing and controlling channel interference.

For example, interference measurement may be performed on more than two REs, and IM values of the more than two REs may be obtained. An average value of the obtained IM values may be calculated, which may provide a reference for the interference estimation. Additionally or alternatively, all IM values may be gathered and added together to have a complete reference number of the transmission quality. Additionally or alternatively, a portion of the IM values may be gathered and added to generate a reference number of the transmission quality. Additionally or alternatively, both average value and a relative addition of a plurality of IM values may be generated for similar purpose. Such solutions may be performed from the perspective of a UE or a network.

Several embodiments of CM and IM are described below.

A general guideline for configuration for channel measurement (CM) and IM may be as follows. A set of non-zero-power (NZP) CSI-RS resource(s) is configured to a UE for channel and interference measurements, and a set of ZP CSI-RS resource(s) is configured to the UE for IM. A subset of the set of NZP CSI-RS resource(s) are configured for channel measurement. Another subset of the set of NZP CSI-RS resource(s) and a subset of the set of ZP CSI-RS resource(s) are configured for interference measurement. The wireless network indicates, via DCI or a combination of MAC and DCI, the subset of NZP CSI-RS resource(s) for channel measurement, and the subset of NZP CSI-RS resource(s) and the subset of ZP CSI-RS resource(s) for interference measurement. In some embodiments, the DCI indication may be a dynamic triggering of one or more CSI reporting settings. In some embodiments, some CSI-RS resources from two NZP CSI-RS resource subsets may overlap.

In certain embodiments, UE may assume each port of a channel measurement NZP CSI-RS resource corresponds to a desired interference transmission layer if no PMI and RI feedback is configured or indicated. In some embodiments, a UE may assume each port of interference measurement on an NZP CSI-RS resource corresponds to a certain interference transmission layer if the NZP CSI-RS resource for IM is not overlapped with the NZP CSI-RS resource for CM. There may be multiple ways to specify UE behavior and/or UE assumptions. As a first example, the operations that the UE performs may be directly specified. As a particular example of directly specifying the operations to be performed by the UE, the directly-specified operations may be the following: the UE extracts interfering signals on each NZP CSI-RS resource for IM as a first step, and the UE sums the interfering signals applying weights as a second step, and so on. In this way, in certain embodiments, the UE may not need to make UE assumptions, or UE assumptions do not need to be standardized, but a UE's behavior may be standardized. On the other hand, a UE's assumptions may be provided based on which UE may have sufficient information to operate. A UE's assumptions may infer the UE's behavior, and vice versa.

The above-referenced interference transmission layer also may be referred to as an interference layer, layered interference, a transmission layer from an interferer, a precoded/beamformed interference, a stream from an interferer, an interference stream, an interference transmission stream, and so on. In certain embodiments, the interference transmission layer is similar to a transmission layer (e.g., stream) from a serving network point, but in the case of an interference transmission layer, the transmission (e.g., stream) is intended for another recipient and hence this layer becomes interference to an interfered UE. In other words, when a network point transmits a stream (e.g., via MIMO precoding or beamforming) to a served UE, this stream becomes an interference transmission layer to another UE not intended to receive the message of the stream. If ZP IMR or legacy CRS based IM is used for IM, the interference transmission layer might be mixed with other interference and might not be seen by the UE (e.g., UE has no information about this layer but can see aggregated interference). With NZP IMR, the UE may have sufficient information and capability to see the interference transmission layer. In certain embodiments, each interference transmission layer is associated with an interference transmission signal and an interfering channel.

As examples, each layer in $H_k W_i S_i$ of $Y_k = H_k W_k S_k \Sigma_{i \neq k} H_k W_i S_i + I_k + n_k$ (see below) is an interference transmission layer, and each layer in H1 S1 and H2 S2 in Y=HSS+H1 S1+H2 S2+I0 (see below) is an interference transmission layer. Each port in the NZP IMR may correspond to an interference transmission layer On an NZP CSI-RS resource that is for channel measurement, the UE may assume its desired signal(s) is transmitted. In other words, the NZP CSI-RS resource to be used by the UE for CM is transmitted according to network configuration/indication, including, for example, scrambling ID, layers/ports, CDM, Pc ('powerControlOffset', or EIRP ratio between an NZP layer energy on an RE and PDSCH energy on an RE), etc. In certain embodiments, no further assumption may need to be made by the UE. Consequently, the UE may extract each of the NZP signal layers on the associated port using the scrambling ID and CDM port mapping information, and assumes the signal is boosted by Pc as being signaled. In certain embodiments, the power boosting is removed when forming a channel matrix Hs so that Hs corresponds to actual PDSCH transmission power. For NZP CSI-RS, the following RE patterns may be considered. The RE pattern for an X-port CSI-RS resource includes one or multiple component CSI-RS RE patterns. The component CSI-RS RE pattern (Y, Z) may be defined within a single PRB as Y adjacent REs in the frequency and Z adjacent REs in the time. In NR, CDM of 1, 2, 4, 8 are supported for NZP ports of 1, 2, 4, 8, 12, 16, 24, 32. Frequency-domain CDM, time-domain CDM, and F/T-domain CDM may be supported.

| Density [RE/RB/port] | N | (Y, Z) | CDM |
|---|---|---|---|
| >1, 1, ½ | 1 | N.A. | No CDM |
| 1, ½ | 1 | (2, 1) | FD-CDM2 |
| 1 | 1 | (4, 1) | FD-CDM2 |
| 1 | 1 | (2, 1) | FD-CDM2 |
| 1 | 2 | (2, 2) | FD-CDM2, CDM4 (FD2, TD2) |
| 2 | 1 | 1 | (2, 1) | FD-CDM2 |
| 2 | 1 | 2 | (2, 2) | CDM4 (FD2, TD2) |
| 6 | 1, ½ | 2 | (2, 2) | FD-CDM2, CDM4 (FD2, TD2) |
| 4 | 1, ½ | 4 | (2, 2) | FD-CDM2, CDM4 (FD2, TD2), CDM8 (FD2, TD4) |
| 2 | 1, ½ | 4 | (2, 2) | FD-CDM2, CDM4 (FD2, TD2), CDM8 (FD2, TD4) |

The following provides two examples of how NZP may be used for IM:

In an embodiment, a first type of how NZP may be used for IM is illustrated when an NZP CSI-RS signal is based on IM. In this case, information about the interfering NZP CSI-RS signal, such as the scrambling ID, ports/layers, power boosting value, etc., is signaled to an interfered UE, and the interfered UE performs IM based on the signaled information and received NZP CSI-RS signal.

In an embodiment, a second type of how NZP may be used for IM is illustrated when an NZP CSI-RS resource is based on IM. In this case, the interfering NZP CSI-RS signal information may or may not be signaled to the interfered UE, but at least the NZP resource information is signaled to the interfered UE, so that the interfered UE knows on which resources (e.g., REs) to perform IM. The UE may utilize part of the NZP CSI-RS signal information (if signaled) in IM.

In certain embodiments, the first type of NZP-based IM (e.g., when a NZP CSI-RS signal is based on IM) may have an advantage of more accurate estimation of dominant interference, such as by estimating the interfering channel matrix H from the closest interferer (e.g., the closest interfering UE) and, possibly, performing advanced receiver related operations. In some scenarios, however, there remain issues for improvement for the first type of process. First, when the UE extracts the NZP CSI-RS signal for IM, the UE behavior may involve advanced receiver related operations. For example, CSI may be derived with the extracted interfering channel matrix, non-dominant interference-plus-noise may be estimated (such as obtained on a ZP for IM, or on this NZP CSI-RS resource with NZP CSI-RS signal discounted). Second, when the UE does not extract the NZP CSI-RS signal for IM, the UE may obtain interference energy/power on the NZP CSI-RS resource. In this scenario, the process of the second type may, in some situations, perform better than the process of the first type. In this case the UE's assumption and behavior may be different from those scenarios when the signal may be extracted.

There may be multiple reasons for the UE to be unable to extract the interfering NZP CSI-RS signal. Such reasons may include limited UE capability, insufficient strength of interference (but not negligible, either), or other suitable reasons. Interference power may be low, such as due to interference coordination and avoidance, orthogonal pilots/RS, or other reasons. In multi-user (MU) operation, users often are spatially separated (e.g., the users are associated with different spatial precoding), and the beamforming for UE1 may be largely separated, or even nearly orthogonal from the beamforming for UE2. Due to beamforming in a network, the interference that a UE experiences may seem weaker than those CSI-RS targeted at the UE itself. In some scenarios, a poor channel estimation of performance may make such operation infeasible.

The second type of how NZP may be used for IM (e.g., when a NZP CSI-RS resource is based on IM) may have an advantage in which information such as interfering signal scrambling ID, ports/layers, power boosting value, and other suitable information may not need to be transmitted to or utilized by the UE. Two example cases are described below.

Example case 1: IM is obtained after extracting a serving signal. In this case, the serving signal overlaps, at least in part, with the interference measurement resource (IMR). After the serving signal is extracted, the remaining energy/power on the NZP resource REs is utilized to obtain IM.

Example case 2: IM is obtained on the IMR without extracting a serving signal. In this case, the IMR REs contain only interference, and the UE may estimate the energy/power on the IMR REs to obtain IM. The UE assumption and behavior on this resource may be more advanced than ZP-based IM, which will be described later.

Embodiments for IM based on ZP CSI-RS are provided. There are a few example cases. In a first example, IM is based on one ZP CSI-RS. At the network side, the ZP-based IM for a cell may be overlapped with one or more neighboring cells' data transmission. The ZP-based IM in this example may reflect a current interference condition but potentially does not reflect a future or a prospective interference condition. The UE may perform IM on the ZP CSI-RS by measuring the energy/power on the ZP CSI-RS REs.

Figure 20:
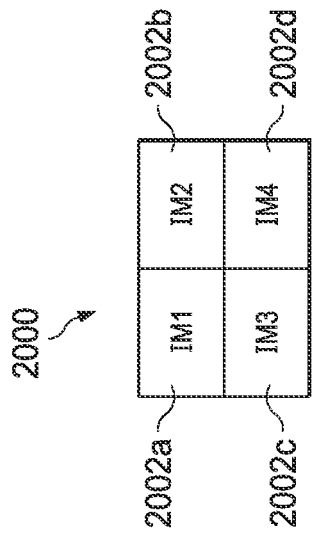
FIG. 20 shows an example case 2000 for IM based on ZP CSI-RS, according to certain embodiments of this disclosure.

FIG. 20 shows an example case 2000 for IM based on ZP CSI-RS, according to certain embodiments of this disclosure. Four REs 2002 (RE 2002a, RE 2002b, RE 2002C, and RE 2002d) of the ZP CSI-RS are shown which may obtain four IM values (IM1-IM4). In certain embodiments, the UE assumes that the interference conditions on the four REs 2002 are the same, and determines an interference value (I) by performing an averaging operation based at least on the four IM values. For example, the UE generates I=(IM1+IM2+IM3+IM4)/4. There may be multiple sets of 4 REs 2002 for the ZP CSI-RS, and the REs 2002 across the multiple sets may have the same IM measurement restriction condition. In certain embodiments, the UE assumes that the interference conditions on all the REs 2002 are the same, and determines an interference value (I) by performing an averaging operation over all such REs 2002.

Additionally or alternatively, at the network side, the ZP-based IM for a cell may be overlapped with RS transmission(s) of one or more neighboring cells. The RS transmission of a neighboring cell may include NZP CSI-RS, DMRS, or other suitable RS transmissions. The ZP-based IM reflects current or future interference conditions depending on whether the RS is used for current data transmission or future data transmission. In FIG. 20, NZP is transmitted by the neighbor cell, and each RE 2002 is associated with one layer (e.g., no CDM for NZP, and each RE 2002 is for a layer or a port). This solution may be extended to DMRS or CDMed NZP. In certain embodiments, the 4 layers may have different interference to the UE, since each layer may be beamformed differently from each other. This may apply to interference from a same cell or a different cell serving multiple UEs on the same time and frequency resources, or on the same frequency resources but separately in time domain (e.g., MU-MIMO).

Figure 21:
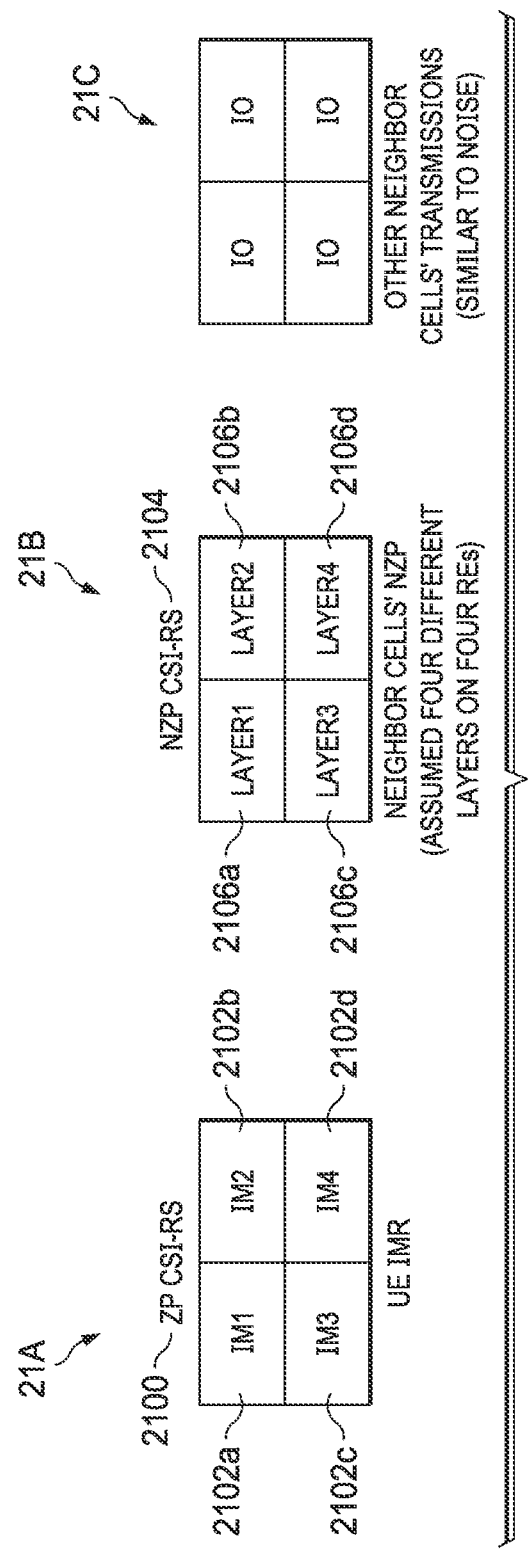
FIG. 21 illustrates example of a UE measures the energy/power on a ZP CSI-RS REs, according to certain embodiments of this disclosure.

FIG. 21 illustrates an example of a UE measuring the energy/power on ZP CSI-RS REs, see elements 21A, 21B, and 21C, according to certain embodiments of this disclosure. On the four REs 2102 (RE 2102a, 2102b, 2102C, and 2102d) of the ZP CSI-RS 2100 (see element 21A), the UE may obtain four IM values, IM1-IM4. In some scenarios, it may not be appropriate for the UE to sum the energy/power to obtain the actual interference (e.g., I=IM1+IM2+IM3+IM4), as the I0 energy/power would be counted for four times in the obtained I. Without further information about the interference condition, the UE may assume that the interference associated with data transmission corresponds to the average value of the energy/power obtained on the 4 REs 2102 (e.g., I=(IM1+IM2+IM3+IM4)/4).

However, to potentially improve the meaningfulness of the averaging operation, the network may attempt to ensure that the average corresponds to the data transmission with all four layers on the same RE. Therefore, each layer 2106 of the NZP CSI-RS 2104 may be power-boosted by four times or 6 dB (as an example) to match the power level of a PDSCH transmission. In some scenarios, other power boost values may not provide for accurate IM. In certain embodiments, the UE may not need to know the power boost value and may not need to know the presence of NZP/DMRS/PDSCH on overlapping REs 2102, but assumes that the interference conditions on the four REs 2102 may or may not be the same, and the average on the four REs 2102 corresponds to the interference condition of PDSCH associated with the IMR REs 2102. There may be multiple sets of four REs 2102 for the ZP CSI-RS and the REs 2102 may have the same IM measurement restriction condition. The UE may assume that the interference condition obtained by averaging on all the REs 2102 is the desired interference condition, and performs averaging operation over all such REs 2102.

For a DMRS-based PDSCH transmission mode (e.g., transmission modes 9 and 10 as specified in 3GPP LTE standards, if UE-specific RSs are present in the PRBs upon which the corresponding PDSCH is mapped, the UE may assume the ratio of PDSCH energy per resource element (EPRE) to UE-specific RS EPRE within each OFDM symbol containing UE-specific RS is 0 dB for a number of transmission layers less than or equal to two and −3 dB otherwise. A similar principle may be adopted here. In certain embodiments, the UE assumes interference is transmitted on the ZP REs 2102 without further knowledge on additional power boosting/covariance matrix/spatial correlation/etc. for the interference. The UE may assume a weighted sum (or average) of energy/power on the ZP REs 2102 corresponds to the desired interference hypothesis. The UE may perform weighted sum (or average) of energy/power on the ZP REs 2102 to obtain the desired interference hypothesis. This UE operation may be a consequence of UE assumption that interference is transmitted on the ZP REs 2102 without further knowledge of the interference. In certain embodiments, without further knowledge on additional power boosting, the UE may assume the interference has 0 dB power boosting for each RE 2102.

Embodiments of IM based on multiple ZP CSI-RSs are provided. In some embodiments, the UE behavior and the corresponding setting are similar to those with one ZP CSI-RS (e.g., the UE may assume that the interference condition obtained by averaging on all the REs is the desired interference condition) and performs an averaging operation over all such REs. Some of the ZP CSI-RSs may be overlapping with neighboring cells' PDSCH regions, which actually corresponds to the interference conditions that may be averaged. If some of the ZP CSI-RSs may be overlapping with neighboring cells' RS regions, different ZP CSI-RSs are actually associated with different interference conditions.

In some embodiments, however the UE may not need to know the difference, and simple averaging may still be meaningful (e.g., when the RSs are power boosted properly to account for the reuse factor over all such ZP CSI-RSs). For example, if a layer of the RS is only on n REs out of the M REs for ZP CSI-RSs, then it may be appropriate to boost the layer M/n times, which may be the UE assumption for performing the averaging across all ZP CSI-RSs but may not be desirable considering other UEs' ZP CSI-RS patterns. In this case, certain operations may be indicated by the network. For example, the UE may first perform averaging within each ZP CSI-RS, and then perform addition and/or subtraction to obtain an actual value of interference, such as ZP1+ZP2−ZP3, in which the addition to sum up the interference power/energy on two ZP CSI-RSs, and the subtraction may resolve the double-counting of noise and interference common to all ZP1~ZP3. For ZP1 and ZP2, there may be overlapping with interfering RS1 and interfering RS2 on orthogonal time/frequency resources, and each RS may be power boosted according to its own reuse factor, and ZP3 may not contain RS1 or RS2. The network may indicate the operations, averaging, addition, and/or subtraction, for each ZP CSI-RS, such as (+,+,−) in above example. If there is an additional ZP4 with the same hypothesis as ZP3, ZP3/ZP4 may be indicated to be averaged first before being subtracted (e.g., (ZP1+ZP2−(ZP3+ZP4)/2) or (+1, +1, −½, −½)). If ZP1-ZP3 are for RS1~RS3 orthogonalized in time/frequency domain, ZP4 is for other interference, then (ZP1+ZP2+ZP3−2ZP4), or (+1,+1,+1, −2), may be indicated. In a generalized way, when a ZP is added M times, then the ZP CSI-RS is to be subtracted M−1 times, so that no redundant addition is performed for the interference measurement. In this case, M is 3 for the addition part in the example "ZP1+ZP2+ZP3-2ZP4", while M−1 is 2 for the subtraction part of "ZP1+ZP2+ZP3−2ZP4".

If ZP1-ZP3 are for RS1-RS3 orthogonalized in time/frequency domain, ZP4/ZP5 are for other interference, then (ZP1+ZP2+ZP3−ZP4−ZP5), or (+1,+1,+1, −1,−1), may be indicated. Note that more overhead may be used to signal −2 or −½ or other fractions, which may be more suitable for RRC/MAC configuration signaling than for PHY DCI signaling. Additionally or alternatively, the network might signal the types of ZP CSI-RSs: type one for RS orthogonalized in time/frequency domain, type two for resources blanking for type one RS, and UE may sum up all type one ZP CSI-RSs, subtract one less times the mean of all type two ZP CSI-RSs. In certain embodiments, with the defined UE behavior, the network needs to signal + or − (1 or −1, or equivalent).

The UE assumes interference is transmitted on the REs of multiple ZP CSI-RSs for IM without further knowledge on additional power boosting/covariance matrix/spatial correlation/etc. for the interference. The UE may assume weighted sum (or average) of energy/power on the REs for all ZP CSI-RSs corresponds to the desired interference hypothesis. The UE may perform weighted sum (or simple average) of energy/power on the ZP CSI-RS REs to obtain the desired interference hypothesis. This UE operation may be a consequence of UE assumption that interference is transmitted on the ZP CSI-RS REs without further knowledge of the interference. Note that without further knowledge on additional power boosting, the UE may assume the interference has 0 dB power boosting for each RE of each ZP CSI-RS for IM. Additionally or alternatively, if the network provides the UE with information such as ZP1 is for a first part of interference and ZP2 is for a second part of interference, then UE may sum up the mean energy on the ZP CSI-RSs to obtain the interference associated with desired interference hypothesis. If the network provides the UE with information such as ZP1 is for a first part of interference, ZP2 is for a second part of interference, and ZP3 is for common interference for ZP1 and ZP2, then UE may sum up the average energy on ZP1/ZP2 and then subtract the average energy on ZP3 to obtain the interference associated with desired interference hypothesis.

Embodiments for IM based on NZP CSI-RS and in which the NZP CSI-RS is not overlapped with NZP CSI-RS for CM are provided. To signal a NZP CSI-RS for IM to a UE, in addition to NZP CSI-RS resource configurations (ports, time/frequency resources, etc.), the scrambling ID may be signaled so that the UE may extract the RS signal (e.g., this RS signal should not be confused with the intended signal for CM; here the RS signal serves as an interference signal). With the interference signal extracted, the UE may estimate the interference channel matrix (e.g., this interference channel matrix should not be confused with the intended channel for CM; here the interference channel matrix serves as an interference channel measurement).

Based on this estimated interference channel matrix, the UE may perform interference rejection. For example, a potentially more accurate interference covariance matrix may be obtained for interference cancellation. The NZP power boosting relative to PDSCH power level may be signaled. For example, on a 4-port NZP CSI-RS, layers 1/2 are CDMed on two REs, and layers 3/4 are CDMed on the other two REs. Each layer may be boosted by 3 dB, and the resulting per-RE power is the same as the associated PDSCH with all four layers on each RE. The power boosting may not be signaled if the default-defined UE assumption is to assume a power boosting to PDSCH level. Then with a total of N layers on N REs, with each RE carrying only n (<=N) layers, a power boosting of N/n times may be assumed. This is related to the CDM design (e.g., in this case the CDM is across every n layers). In LTE NZP CSI-RS, n=2, and for DMRS it is 1/2/4. In NR, CDM of 1, 2, 4, 8 are supported for NZP CSI-RS ports of 1, 2, 4, 8, 12, 16, 24, and 32. Frequency-domain only CDM, time-domain only CDM, and F/T-domain CDM are supported. In general, the CDM value and its type may be signaled to UE for a NZP CSI-RS. The CDM information and NZP CSI-RS port information may then be used by the UE to figure out the implicit power boost. For example, for 32 port NZP CSI-RS and CDM 8, each layer is boosted by 4. However, if the network needs more flexibility in power boosting, then the power boosting value needs to be explicitly signaled to UE. Furthermore, even if a NZP CSI-RS for IM is signaled to a UE, the UE may not be able to extract the NZP CSI-RS interference signal sufficiently reliably as the interference may not be strong enough (but still not negligible). Some UEs without advanced receiver capability or having NZP CSI-RS measurement capability limitations may not be able to extract the NZP CSI-RS either. Therefore, an NZP CSI-RS for IM may or may not be extractable by a UE, and for either case, embodiments are provided.

First, cases in which IM is based on one NZP CSI-RS and the NZP CSI-RS is not overlapped with NZP CSI-RS for CM are provided. If the UE cannot extract the NZP CSI-RS for IM, then the UE behavior and assumption for the NZP CSI-RS may be the same as those for a ZP CSI-RS. The UE may assume that interference signal(s) is transmitted on the NZP CSI-RS for IM, and each port of the NZP CSI-RS is for one interference layer. The UE may assume that each interference layer is power boosted according to the factor of #ports/CDM. In another embodiment, the UE may assume that each interference layer is power boosted by 0 dB and each RE contains all layers of interference. In either case, the UE may assume that the interference condition obtained by averaging on all the REs is a preferred result.

The UE may perform an averaging operation over all such REs. Correspondingly, the network may ensure the correct power boosting (e.g., boost to PDSCH level and according to #ports/CDM). This value may or may not be signaled to the UE, as the UE may derive from NZP CSI-RS configuration/indication. The UE may overwrite/ignore if a different value is received. Additionally or alternatively, the UE may perform averaging if the power boosting value is the same as #ports/CDM. If other values are used by the network, even though the values are signaled to the UE, the UE still may not obtain an unbiased estimate of interference, as on the NZP CSI-RS REs, interference boosted not to PDSCH level (the NZP CSI-RS signal) and other interference boosted to PDSCH level and noise are superposed and not separable. On the other hand, if the UE may extract the NZP CSI-RS for IM, then the UE may separate the NZP CSI-RS and leftover interference and noise I0. For example, the UE may estimate the interference channel HI, and formulate $$Y=HSS+HI\ SI+I0,$$

where Y is the received signal, HSS is the intended channel matrix (obtained from CM resources) times intended signal, HI SI is the interference channel matrix (obtained from IMR of NZP CSI-RS) times interference signal, and I0 is the noise plus other interference (e.g., all interference plus noise except for the interference associated with NZP signal HI SI). HI may be obtained by averaging over multiple NZP CSI-RS REs satisfying the signaled measurement restriction, layer by layer (e.g., UE assumes each port of NZP CSI-RS is associated with an interference condition) but not cross layers. For I0 it may be averaged over all IMR REs assuming the same interference condition as on ZP CSI-RS. Based on the above equation the UE may perform interference rejection in the CSI measurement and CQI/RI/PMI computations. The performance is expected to be better than ZP-based IM and NZP-based IM in which the signal is not extractable. As the UE may extract the NZP CSI-RS, any power boost value may be used and signaled to the UE. With potentially higher power boosting, the estimation of HI may be more accurate, but the extra boosting may be discounted in HI so that the UE would not assume higher interference. In some scenarios, however, this method is not robust enough to cover certain other cases, so in certain embodiments it may be desirable to boost NZP CSI-RS to PDSCH level.

Figure 22:
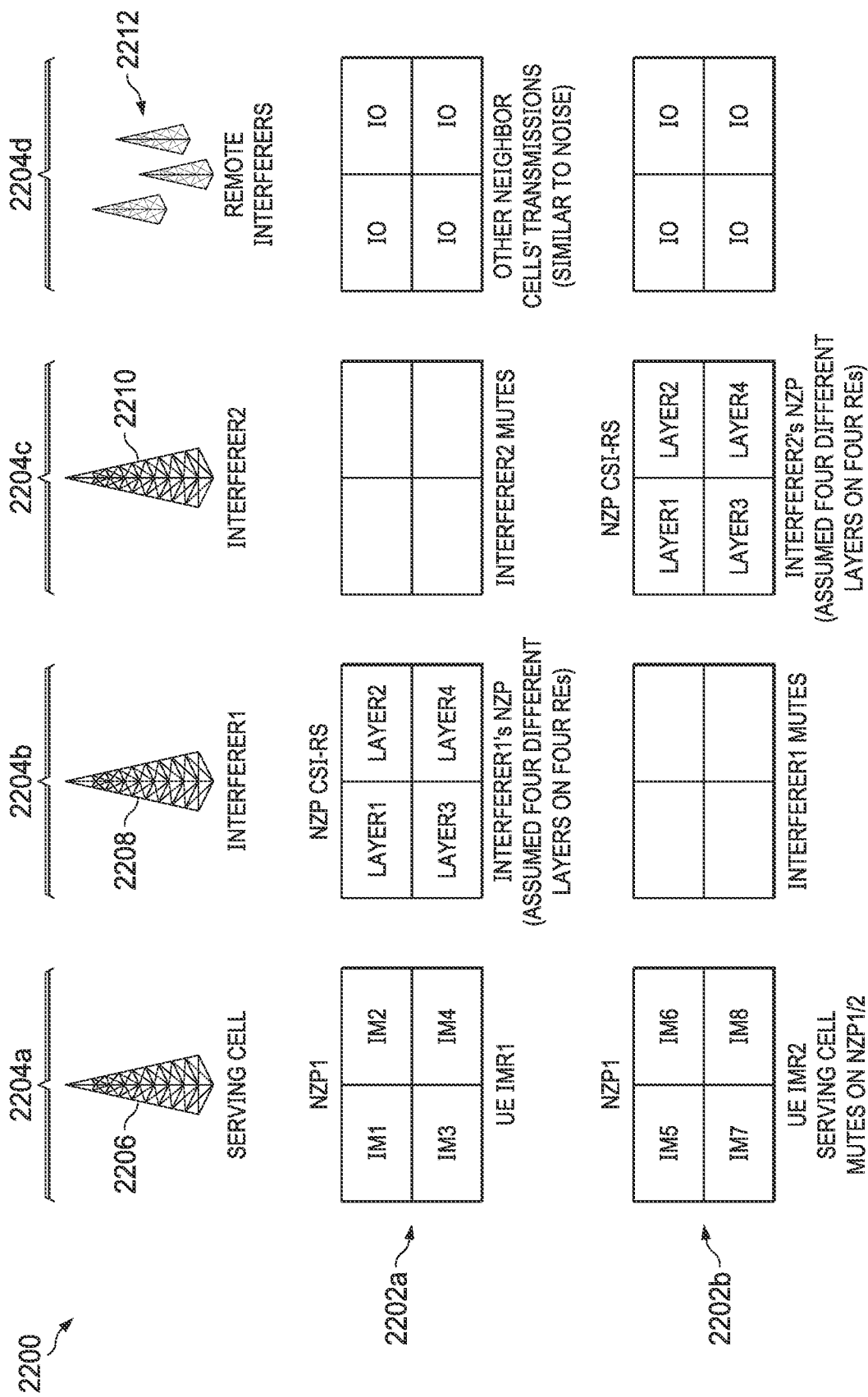
FIG. 22 illustrates example 2200 on another scenario when IM based on multiple non-zero-power (NZP) signals and not overlapped with CMR, according to certain embodiments of this disclosure.

FIG. 22 illustrates an example 2200 of IM based on multiple NZP CSI-RSs and not overlapped with CMR, according to certain embodiments of this disclosure. Two NZP CSI-RSs for IM are illustrated in this example (a first corresponds to row 2202a and a second corresponds to row 2202b). FIG. 22 shows four columns 2204 (column 2204a, column 2204b, column 2204c, and column 2204d) from perspectives of a serving cell 2206, interferer 1 2208, interferer 2 2210, and a plurality of remote interferers 2212, respectively.

On the NZP CSI-RSs, the serving cell mutes, while the interferers (which may be the same cell as the serving cell or a different cell than the serving cell) transmit on one of the NZP CSI-RSs and mutes on the other. In this case, the UE assumes no serving signal is transmitted on the NZP CSI-RS for IM, and an interference signal(s) is transmitted on the NZP CSI-RS for IM. If NZP CSI-RS interfering signal information is signaled to the UE, such as scrambling ID, layers/ports, CDM, Pc, such information can also be assumed by the UE (e.g., similar assumptions as CM NZP CSI-RS signal but the assumptions are for IM instead). In certain embodiments, no other assumption is made by the UE regarding the interference signal. In certain embodiments, if any of above information is not signaled to the UE, the UE does not make the associated assumption for IM.

Certain embodiments depend on whether the UE may be able to extract both NZP CSI-RSs, neither NZP CSI-RS, or one of the NZP CSI-RSs. If both may be extracted, a UE may estimate both interfering channel matrices H1 and H2, and obtain leftover interference and noise I0 by averaging the energy/power on the NZP CSI-RSs discounting the NZP CSI-RS signals. I0 is the noise plus other interference (e.g., all interference plus noise except for the interference associated with neither NZP CSI-RS signal). A UE may formulate the following:

$$Y=HSS+H1S1+H2S2+I0.$$

In this example, interference rejection/cancellation may be performed for CSI measurement and computation. If neither NZP CSI-RS is extracted, then in some scenarios the UE may obtain (I1+I0) on NZP1, where I1 and I0 are not separable, and UE may obtain (I2+I0) on NZP2, where I2 and I0 are not separable. Summing up (I1+I0) and (I2+I0) may lead to double counting of I0, potentially making averaging an appropriate technique. This implies that (I1+I2)/2+I0 may correspond to the actual PDSCH interference condition. A matrix rank-based argument may illustrate that this is not possible with four times of power boosting (corresponding to boosting to PDSCH level of that interferer), and instead this uses eight times of power boosting for the NZP CSI-RSs, where the eight comes from the reuse factor for NZP CSI-RS interference signals accounting both NZP CSI-RSs, not one NZP CSI-RS from one interferer. In some scenarios, however this boosting may cause bias to another UE that is configured with one of the NZP CSI-RSs for IM, and hence may not desirable in some scenarios. If one of the NZP CSI-RSs is extracted (e.g., NZP1 is extracted but NZP2 is not extracted), then the UE may separate I1 and I0 NZP1, but (I2+I0) on NZP2. The UE may formulate the following:

$$Y=HSS+H1S1+(I2+I0).$$

In this example, interference rejection/cancellation may be performed. Therefore, it may be desirable to adopt different UE behaviors based on the extractability of the NZP CSI-RSs as described above, and there may be cases in which unbiased interference estimation is difficult or not possible to obtain. Therefore, such configurations of IM may have limited benefits in practical situations.

Embodiments for IM based on one or more NZP CSI-RSs and one or more ZP CSI-RSs, and in which none is overlapped with the NZP CSI-RS for CM, are provided. In certain embodiments, this approach may overcome some challenges described above, and may improve the IM accuracy, at the possible price of higher measurement overhead. In some embodiments, the ZP CSI-RS(s) is specified to have the interference condition including all interference on the NZP CSI-RS IMRs. If any of the NZP CSI-RS is not extractable, the ZP CSI-RS(s) may be used to measure and average the interference. If all the NZP CSI-RSs are extracted, then the NZP CSI-RS interfering signals may be individually averaged and then summed up across all the NZP CSI-RSs, and the leftover interference plus noise on any or all of the NZP CSI-RSs may be averaged to obtain I0. The ZP CSI-RS(s) may also be used to obtain average leftover interference plus noise, by subtracting energy/power of the signals associated with NZP CSI-RSs (after removing the power boosting). In some other embodiments, the ZP CSI-RS(s) is specified to have the interference condition excluding all interference on the NZP CSI-RS IMRs.

If any of the NZP CSI-RS is not extractable, the UE may assume all NZP CSI-RSs are ZP CSI-RSs overlapping with RS, and similar to the multiple ZP CSI-RSs for IM, all the NZP CSI-RS(s) and the ZP CSI-RS(s) may be used to perform the specified operations (averaging, addition, subtraction) to obtain the interference in an unbiased way. In other words, all the NZP CSI-RSs are regarded as +, and all the ZP CSI-RSs are regarded as −. On the other hand, if all the NZP CSI-RSs are extracted, then the NZP CSI-RS interfering signals will be individually averaged and then summed up across all the NZP CSI-RSs, and the leftover interference plus noise on any or all of the NZP CSI-RSs and ZP CSI-RSs may be averaged to obtain I0. On the network side, the network may coordinate the NZP CSI-RSs/ZP CSI-RSs/IMRs/CMRs to attempt to ensure that the signaling (configuration/indication) corresponds to the desired IM/CM/CSI hypotheses/conditions. To properly orthogonalize, the NZP CSI-RSs and sometimes ZP CSI-RSs may use network coordination and relatively high measurement overhead.

The above embodiments are for non-overlapped CMRs and IMRs. If CMRs and IMRs may overlap, however, different embodiments, such as those described below, may be appropriate.

Some embodiments apply to scenarios in which NZP CSI-RS CMR and IMR completely overlap and one NZP CSI-RS resource is configured. A UE may assume that a serving signal(s) for the UE is transmitted on the resource according to the configuration/indication, and an interference signal(s) is also transmitted on the resource according to the configuration/indication. In other words, the UE performs CM and IM on the same set of REs of one NZP CSI-RS resource. Throughout this description, the term NZP or NZP CSI-RS may refer to NZP CSI-RS signal, NZP CSI-RS resource, or both NZP CSI-RS signal and NZP CSI-RS resource. In general, the particular meaning will be clear to one of ordinary skill in the art from the context in which the term is used. In some cases, this disclosure specifies a distinction. For example, in the overlapped cases, the NZP signal for CM and NZP signal for IM are on the same NZP resource.

Figure 23:
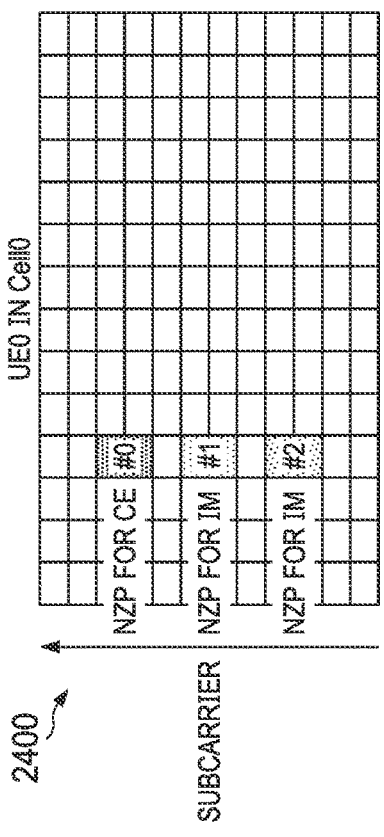
FIG. 23 illustrates a typical use case of overlapped CSI-RS resource for channel and interference, according to certain embodiments of this disclosure.

FIG. 23 illustrates an example use case 2300 of overlapped CSI-RS resource for channel and interference, according to certain embodiments of this disclosure. One NZP CSI-RS resource, as an example, may be configured for channel measurement as well as for interference measurement.

Based on prior CSI information, a gNB determines MU transmission on slot n+1 for a set of UEs. On the CSI-RS resource of slot n, the gNB transmits beamformed CSI-RS for each UE in the MU group. Each UE in the MU group could estimate a channel to obtain the intended signal, as well as interference by discounting (e.g., by subtracting) the UE's own intended signal from the received signal. For instance, from UE k's perspective, the received signal on the NZP CSI-RS may be expressed as:

$$Y_k = H_k W_k S_k + \Sigma_{i \neq k} H_k W_i S_i + I_k + n_k,$$

where $\Sigma_{i \neq k} H_k W_i S_i$ is the MU interference, $I_k$ represents inter-cell interference, and $n_k$ represents thermal noise. In some scenarios, when the NZP CSI-RS resource is aligned between surrounding cells, and each cell follows the same mechanism to transmit NZP CSI-RS, the term $I_k$ may reflect the inter-cell interference that would be experienced on the future PDSCH slot n+1. Hence, with this configuration, a gNB is able to predict the interference on the future PDSCH, including both MU interference and inter-cell interference. Another example of this predication capability is described below with reference to FIG. 30.

It may be noted that different CSI-RS ports (orthogonalized via, e.g., FDM, CDM) in a CSI-RS resource may be assigned to different users. For example, this mechanism may be used for a non-PMI feedback case (e.g., port index indication per CSI-RS resource may be configured by RRC to select the CSI-RS port(s) used for RI/CQI calculation per rank), although this disclosure contemplates use of this mechanism in other scenarios. With such a configuration, channel measurement on assigned CSI-RS ports might not be impacted by other interfering ports.

Figure 24:
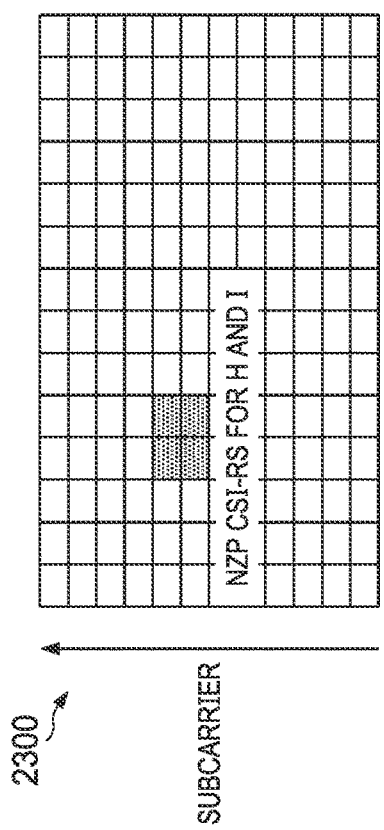
FIG. 24 illustrates an example for non-overlapped CSI-RS resource for channel and interference measurement, according to certain embodiments of this disclosure.

FIG. 24 illustrates an example use case 2400 for non-overlapped CSI-RS resource for channel and interference measurement, according to certain embodiments of this disclosure. From the UE0 perspective, NZP CSI-RS resource #0 is for channel measurement while NZP CSI-RS resource #1 and #2 for interference measurement. When a gNB emulates potential MU signals on NZP CSI-RS resources #1 and #2, UE0 may probe MU-interference by measuring interference on these two IM resources.

In some situations, however, inter-cell interference might not be fully captured in this way, even if the set of NZP CSI-RS resources is aligned with the neighboring cells' NZP CSI-RS resources.

Figure 25:
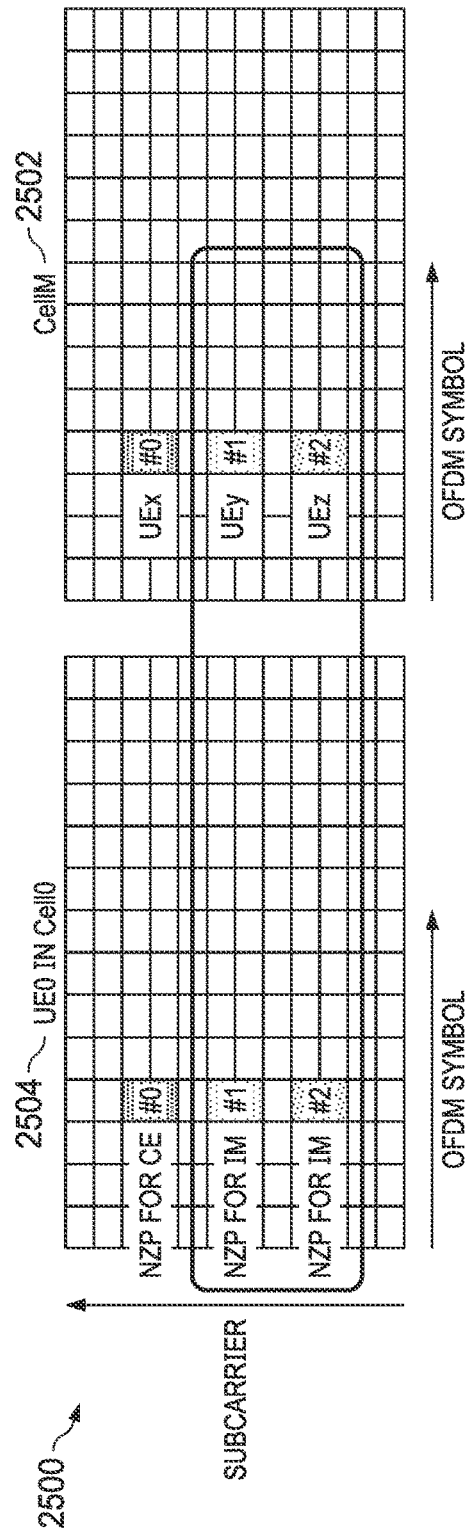
FIG. 25 illustrates an inter-cell interference with configuration of non-overlapped CMR and interference measurement (IM) resource (IMR), according to certain embodiments of this disclosure.

FIG. 25 illustrates an example use case 2500 showing inter-cell interference in a configuration with non-overlapped CMR and IMR, according to certain embodiments of this disclosure. In this scenario, the configuration of CSI-RS resources in cellM 2502 are the same as in cell0 2504, where resource #0, #1 and #2 are assigned to UEx, UEy and UEz for channel measurement. Users in cell0 also use these resources to probe the interference from cellM. However, from UE0's perspective, the inter-cell interference from cellM that are actually serving UEy and UEz is captured. The missing interference from UEx may result in the inaccurate probing of inter-cell interference. If, on the other hand, the set of NZP CSI-RS resources in cell0 is orthogonal to the neighboring cells' NZP CSI-RS resources, UE0 then may be configured with five NZP CSI-RS resources for IM to measure intra-cell MU interference and inter-cell interference from cellM. In general, if M interfering cells are in UE0's neighborhood, and each cell supports N UEs, (M+1)N NZP CSI-RS resources for IM are configured for UE0, leading to potentially undesirable overhead and complexity.

Probing inter-cell interference (especially fast varying inter-cell interference) may be an important characteristic of NZP CSI-RS based interference measurement. Probing inter-cell interference and/or MU interference may improve link adaptation. Thus, to realize the gain of better link adaptation, particularly for those cells that are capable of aligning NZP CSI-RS configuration, embodiments of this disclosure support overlapped CSI-RS resource(s) for channel and interference measurement.

A UE's assumptions and behavior for NZP-based IM may be defined in a standard specification. As described above, an NZP CSI-RS signal based on IM (in fallback mode and non-fallback mode) may be considered separately. For an NZP CSI-RS resource based on IM, both overlapped and non-overlapped may be considered.

Case 1: IM is obtained after extracting a serving signal

In this case, the UE extracts the serving signal on the NZP CSI-RS, and the leftover energy/power on the REs is to be used to obtain IM. Case 1 includes the following two scenarios:

Case 1-1: IMR and CMR completely overlap. In this scenario, the UE may assume the interference condition after discounting the serving signal corresponds to the actual interference condition, and further operations (except for averaging on all IMR REs) related to IM may be avoided, if appropriate.

Case 1-2: IMR and CMR partially overlap. In this scenario, after discounting the serving signal on some IMR REs, the UE obtains interference on additional IMR REs, and potentially on all the IMR REs.

The UE could adopt the addition/subtraction approach described above for Case 2 (described below), which uses additional network signaling and associated UE behavior. This addition/subtraction approach may get complicated if multiple NZPs and ZP(s) are used. For example, for three NZPs and one ZP, the UE may perform $|Y_1|^2+|Y_2|^2+|Y_3|^2-2I^2$. This scenario is similar to multiple ZPs described above, and the designs can be reused for the addition/subtraction approach.

Additionally or alternatively, the UE may assume that it is permissible to average across all IMR REs to obtain the desired interference condition for IM, and the network may attempt to ensure consistency. This approach may simplify UE assumption and behavior.

Case 2: IM is Obtained on the IMR without Extracting a Serving Signal

In this case, the NZP IMR REs contains interference, and the UE may estimate the energy/power on the NZP REs to obtain IM. Similar to Case 1-2, the addition/subtraction approach may be considered, but it may be desirable to use the simpler averaging approach.

Therefore, in all cases the UE behavior may be unified to be averaging on some, and potentially all, IMR REs. This averaging approach also may unify the UE behavior on NZP CSI-RS and/or ZP CSI-RS for IM. The base station implementation may attempt to ensure the IM obtained in this way corresponds to the desired interference condition. An embodiment is to standardize the UE behavior of averaging power/energy on all NZP CSI-RS/ZP CSI-RS IMR REs, after discounting serving signal if any.

For CSI-RS resource(s) configured for both channel and interference, the operation of subtraction may be defined. Then the remaining signals/power after subtracting intended signal are partial or entire interference.

For an NZP CSI-RS configured for IM but not CM (e.g., for cases with non-overlapped IMR and CMR) or configured for IM and CM but with serving signal subtracted, the summation or weighted summation of extracted interference ports may be performed by the UE. This approach may be due to a CSI-RS port corresponding to an interferer layer (e.g., interference transmission layer), such that the operation of summation or weighted summation potentially reflects the total interference. An appropriate network implementation may be used to provide this approach. One example of the weighted summation is averaging the interference power over all ports, which potentially uses no additional signaling support.

For CSI-RS resource(s) configured for both channel and interference, the UE assumes its desired signal(s) is transmitted on the resource and according to network configuration/indication, and interference signal(s) is also transmitted on the resource and according to network configuration/indication. The UE may perform CM on the resource by extracting the desired NZP CSI-RS signal. Then the remaining signals/power after discounting desired signal are interference to be measured by the UE.

When more than one NZP CSI-RS resource is to be configured for interference measurement, UE assumptions to allow the UE to properly combine the interference on NZP CSI-RS resources may be defined.

Figure 26:
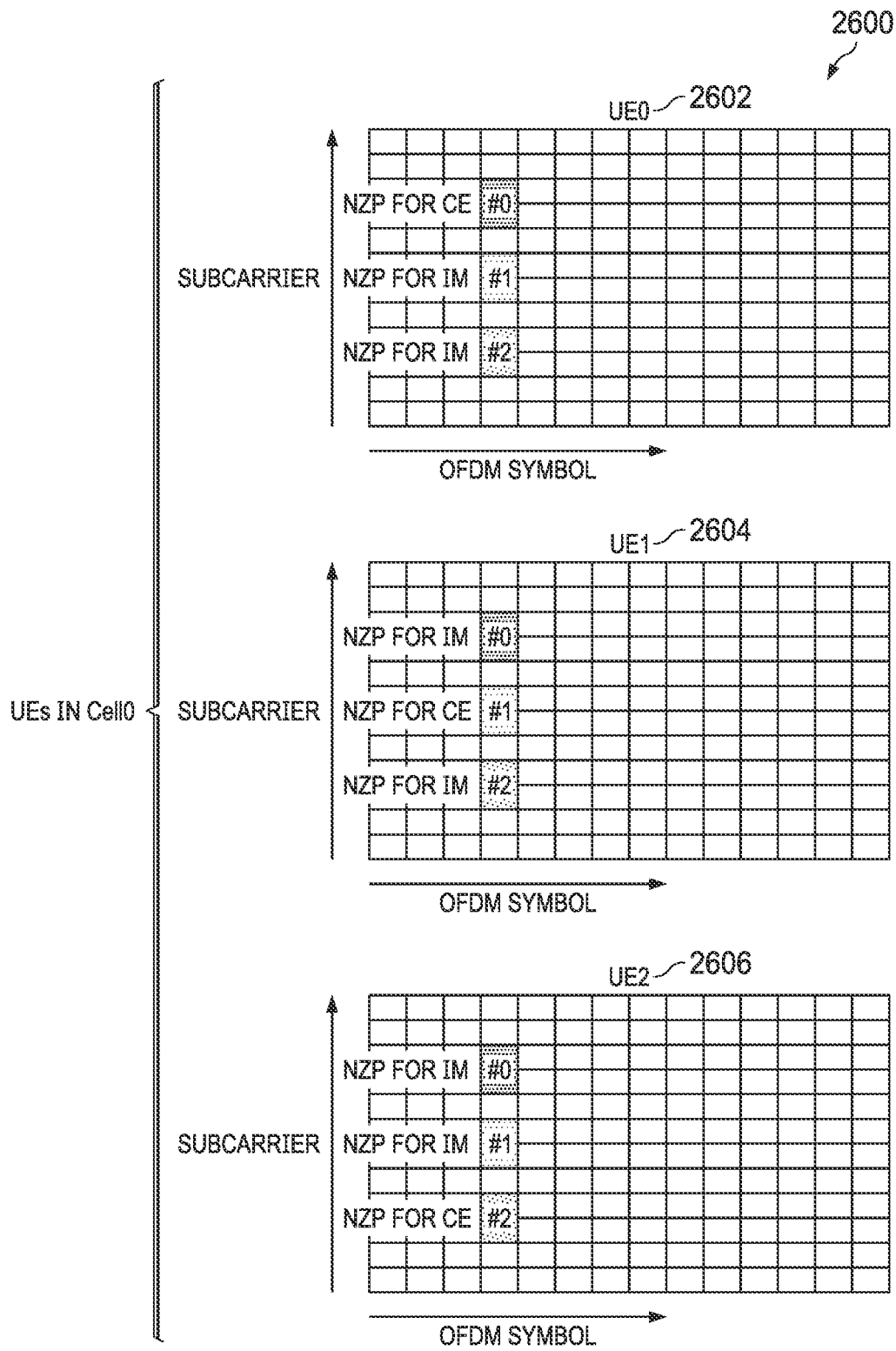
FIG. 26 illustrates another example configuration of a set of NZP CSI-RS resources, according to certain embodiments of this disclosure.

FIG. 26 illustrates another example configuration 2600 of a set of NZP CSI-RS resources, according to certain embodiments of this disclosure. Taking non-overlapped CSI-RS resources as an example, in cell0, NZP CSI-RS resource #0, #1, and #2 are assigned to UE0 (shown at 2602), UE1 (shown at 2604) and UE2 (shown at 2606), respectively, for channel measurement. For each UE, the other two CSI-RS resources, except for the CSI-RS resource for CM, are IMRs.

For UE0, the interference on resources #1 and #2 may be expressed as $Y_1=I_1+I_{inter}$ and $Y_2=I_2+I_{inter}$, respectively. $I_1$ and $I_2$ are the interference for UE1 and UE2, and $I_{inter}$ is the interference from a neighbor cell, which may reflect the downlink interference on a measurement slot. There is a higher layer parameter pc ('powerControlOffset') associated with each NZP CSI-RS resource, which is interpreted as power offset of NZP CSI-RS RE to PDSCH RE. Hence, assuming $p_{c,1}$, $p_{c,2}$ as the power offset associated with resource #1 and #2, Y1 and Y2 may be represented as follows:

$$Y_1=\sqrt{p_{c,1}} \times I_{PDSCH1}+I_{inter},$$

$$Y_2=\sqrt{p_{c,2}} \times I_{PDSCH2}+I_{inter}$$

Since an objective is to measure interference from MU PDSCH, the operation of weighted summation may be defined as $$\frac{1}{p_{c,1}}|Y_1|^2 + \frac{1}{p_{c,2}}|Y_2|^2 = |I_{PDSCH,1}|^2 + |I_{PDSCH,2}|^2 + \left(\frac{1}{p_{c,1}} + \frac{1}{p_{c,2}}\right) \cdot |I_{inter}|^2.$$

When $$\frac{1}{p_{c,1}} + \frac{1}{p_{c,2}} = 1,$$

the result would be MU and inter-cell interference. If the Pc's are the same, then each is 2 (e.g., a UE can average the interference energy on the NZP CSI-RS s for IM). Alternatively, if IMR also covers resource #0 and the UE can obtain $I_{inter}$ on the resource, then the UE can perform weighted sum on all three NZP CSI-RS s for IM, and if $$\frac{1}{p_{c,1}} + \frac{1}{p_{c,2}} + \frac{1}{3} = 1,$$

then unbiased IM can be obtained. If the Pc's are the same, then each is 3 (e.g., UE may average the interference energy on the NZPs for IM). In certain embodiments, the Pc is the reuse factor described above for power boosting.

Considering a variety of factors such as total number of NZP CSI-RS s for IM, NZP CSI-RS ports, and CDM factors, each layer may be power boosted to #ports/CDM, where #ports is for all IM NZP CSI-RSs, and CDM is for the layer. For each NZP CSI-RS, the CDM is the same, and hence the power boosting or Pc is the same for all layers in that NZP CSI-RS. The UE may assume that each interference layer is power boosted according to the factor of #ports/CDM. The UE may perform averaging operation over all such REs. The UE may overwrite/ignore if a different value is received. Additionally or alternatively, the UE may perform averaging if the power boosting value is the same as #ports/CDM. From the above description, when a gNB configured the correct powerControlOffset on each NZP CSI-RS interference resource, the UE may correctly estimate the interference power. Some restriction on the configured 'powerControlOffset' for each NZP CSI-RS resource may be appropriate.

Another alternative is to introduce an additional ZP CSI-RS resource to resolve the double-counted inter-cell interference issue. For example, the power of inter-cell interference may be estimated on ZP CSI-RS and denoted as $|I_{inter}|^2$, and the total MU and inter-cell interference may be obtained as $$\frac{1}{p_{c,1}}(|Y_1|^2 - |I_{inter}|^2) + \frac{1}{p_{c,2}}(|Y_2|^2 - |I_{inter}|^2) + |I_{inter}|^2.$$

In this example, there is no restriction on 'powerControlOffset'; however, this example uses an additional resource of ZP CSI-RS, and the ZP CSI-RS resource may be carefully coordinated among gNBs so that the approach may accurately capture the intended interference condition for the UE. In certain embodiments, no additional ZP CSI-RS resource is used, but the CMR is also specified as IMR, and the UE can obtain $I_{inter}$ on the resource.

When a set of NZP CSI-RS resources are aligned between cells, obtaining unbiased inter-cell interference measurement powerControlOffset might not necessarily be configured or used on resources with MU interference, or left for gNB implementation. The weighted summation over the interference on all NZP CSI-RS resources may accurately reflect the MU and inter-cell interference.

When a set of NZP CSI-RS resources in a serving cell is assumed to collide with a PDSCH of neighboring cells, proper 'powerControlOffset' may be configured for each NZP CSI-RS resource with MU interference. Then the weighted summation over the interference on all interference resources may reflect the MU and a slowly varying part of inter-cell interference. In certain embodiments, when configuring a NZP CSI-RS resource for IM, scrambling ID, layer/port, or CDM information may not need to be specified, if Pc powerControlOffset is specified and the Pc is selected to boost the NZP CSI-RS power to PDSCH level. In other words, the Pc summarizes the information about CDM and layers/ports. The Pc may be configured for each NZP CSI-RS resource within a NZP CSI-RS resource set. For the same NZP CSI-RS resource within different NZP CSI-RS resource sets, the Pc may be different, since the reuse factor may be different for different resource sets. In other words, Pc may be specific to an NZP CSI-RS resource set, but might not be specific to an NZP CSI-RS resource. If additional NZP CSI-RS signal information is configured/indicated (e.g., scrambling ID, layer/port, or CDM information), the additional NZP CSI-RS signal information may be specified for each NZP CSI-RS resource; in other words, the additional NZP CSI-RS signal information may be NZP CSI-RS resource specific.

When NZP CSI-RS resource(s) are configured for both channel and interference measurements, a UE assumes the remaining signals, after discounting serving signal, would be partially or entirely interference For each NZP CSI-RS resource configured for IM, the UE assumes the summation or weighted summation of extracted interference ports would reflect the interference on this resource.

The UE assumes weighted summation over interference estimated on all resources for interference measurement. A scaling factor associated with NZP CSI-RS Pc may be assumed.

A CSI request field may trigger aperiodic CSI-RS resource set(s) for channel and/or interference measurement. It may be desirable to indicate which resource set among these CSI-RS resource sets is for channel measurement and which is for interference measurement. Below are two example options for addressing this.

Option-1: each trigger state of a CSI request field would reflect the combination of {CSI reporting setting, CSI-RS resource set for channel, CSI-RS resource set for interference};

Option-2: each trigger state of CSI request field would indicate CSI reporting setting and this CSI reporting setting associated CSI-RS resource sets. An additional bit-field in the DCI may further select the resource set for channel and resource set for interference.

Both options may support NZP CSI-RS based interference measurement. Option-2 may provide more flexibility on selection of CSI-RS resources for channel or interference measurement. Option-1 may achieve the same flexibility when sufficient trigger states are supported in the CSI request field. RRC signaling, however, may configure each state corresponding to each measurement hypothesis and reporting setting. Taking component carriers into trigger states, the RRC signaling overhead and configuration complexity may be a consideration. Therefore, adjacent (or at another suitable location with respect to) the CSI request field, an additional bit-field in DCI to further select the resource set for channel measurement and resource set for interference measurement may be introduced.

In some embodiments, all NZP resources for CM/IM are assigned with the same scrambling ID, which may simplify the UE receiving operation. An NZP CSI-RS resource set may be assigned with the same scrambling ID. In certain embodiments, all resources are used for IM, and some layers and/or some resources are used for CM. Different UEs share the same scrambling ID if they are paired in MU mode. Multiple TRPs within a close neighborhood may share the same scrambling ID on probing resources.

CSI reporting setting(s) may be triggered via DCI. If the CSI report trigger is jointly indicated with CSI-RS resource trigger, an IE in DCI may indicate both CSI-RS resource and CSI reporting setting(s). Otherwise, two separate IEs may be used. The number of the CSI reporting settings may be more than one so as to report multiple CSIs to save CSI reception delay at the gNB side. In one embodiment, a DCI may trigger a CSI-RS resource set. This set may be used for IM, and additional DCI bits indicate a subset of the set for CM. Therefore, in certain embodiments, CMR may be a subset of IMR. In another embodiment, a DCI may trigger a CSI-RS resource set. This set may be used for CM and/or IM, and additional DCI bits indicate a subset of the set for CM and additional DCI bits indicate a subset of the set for IM. In another embodiment, a DCI may trigger a CSI-RS resource set. This set may be used for CM, and additional DCI bits indicate ZP/NZP CSI-RS resources as IMR. This disclosure contemplates the configuration and indication for CMR/IMR/CQI measurement/reporting/rate matching being performed in any suitable manner, according to particular implementations.

Certain embodiments described above refer to the energy/power on an RE or associated with a NZP CSI-RS signal on an RE for CM and/or IM. This energy/power may be referred to as energy per resource element (EPRE). Downlink power control may determine the EPRE. The term RE energy denotes the energy prior to cyclic prefix insertion. The term RE energy also denotes the average energy taken over all constellation points for the modulation scheme applied. Uplink power control determines the average power over an SC-FDMA symbol in which the physical channel is transmitted.

For the purpose of RSRP and RSRQ measurements, the UE may assume downlink cell-specific RS EPRE is constant across the downlink system bandwidth and constant across all subframes with discovery signal transmissions until different cell-specific RS power information is received.

For a cell that is not a Licensed Assisted Access (LAA) small cell (Scell), the UE may assume downlink cell-specific RS EPRE is constant across the downlink system bandwidth and constant across all subframes until different cell-specific RS power information is received.

The downlink cell-specific reference-signal EPRE may be derived from the downlink reference-signal transmit power given by the parameter referenceSignalPower provided by higher layers. The downlink reference-signal transmit power is defined as the linear average over the power contributions (in [W]) of all REs that carry cell-specific reference signals within the operating system bandwidth.

For an LAA SCell, the UE may assume that the EPRE of downlink cell-specific RS in subframe n is same as the EPRE of downlink cell-specific RS in subframe n−1, if all OFDM symbols of at least the second slot of subframe n−1, are occupied.

The ratio of PDSCH EPRE to cell-specific RS EPRE among PDSCH REs (not applicable to PDSCH REs with zero EPRE) for each OFDM symbol is denoted by either $\rho_A$ or $\rho_B$ according to the OFDM symbol index as given by Table 2 and Table 3 below.

TABLE 2

OFDM symbol indices within a slot of a non-MBSFN subframe where the ratio of the corresponding PDSCH EPRE to the cell-specific RS EPRE is denoted by $\rho_A$ or $\rho_B$.

| Number of antenna ports | OFDM symbol indices within a slot where the ratio of the corresponding PDSCH EPRE to the cell-specific RS EPRE is denoted by $\rho_A$ | | OFDM symbol indices within a slot where the ratio of the corresponding PDSCH EPRE to the cell-specific RS EPRE is denoted by $\rho_B$ | |
|---|---|---|---|---|
| | Normal cyclic prefix | Extended cyclic prefix | Normal cyclic prefix | Extended cyclic prefix |
| One or two | 1, 2, 3, 5, 6 | 1, 2, 4, 5 | 0, 4 | 0, 3 |
| Four | 2, 3, 5, 6 | 2, 4, 5 | 0, 1, 4 | 0, 1, 3 |

TABLE 3

OFDM symbol indices within a slot of an MBSFN subframe where the ratio of the corresponding PDSCH EPRE to the cell-specific RS EPRE is denoted by $\rho_A$ or $\rho_B$.

| Number of antenna ports | OFDM symbol indices within a slot where the ratio of the corresponding PDSCH EPRE to the cell-specific RS EPRE is denoted by $\rho_A$ | | | | OFDM symbol indices within a slot where the ratio of the corresponding PDSCH EPRE to the cell-specific RS EPRE is denoted by $\rho_B$ | | | |
|---|---|---|---|---|---|---|---|---|
| | Normal cyclic prefix | | Extended cyclic prefix | | Normal cyclic prefix | | Extended cyclic prefix | |
| | $n_s \bmod 2 = 0$ | $n_s \bmod 2 = 1$ | $n_s \bmod 2 = 0$ | $n_s \bmod 2 = 1$ | $n_s \bmod 2 = 0$ | $n_s \bmod 2 = 1$ | $n_s \bmod 2 = 0$ | $n_s \bmod 2 = 1$ |
| One or two | 1, 2, 3, 4, 5, 6 | 0, 1, 2, 3, 4, 5, 6 | 1, 2, 3, 4, 5 | 0, 1, 2, 3, 4, 5 | 0 | — | 0 | — |
| Four | 2, 3, 4, 5, 6 | 0, 1, 2, 3, 4, 5, 6 | 2, 4, 3, 5 | 0, 1, 2, 3, 4, 5 | 0, 1 | — | 0, 1 | — |

In addition, $\rho_A$ and $\rho_B$ are UE-specific.

Embodiments for measurement restriction in time domain for channel and interference measurement are provided. Taking into account the flexibilities to fit the rich channel conditions in various NR scenarios, measurement restriction by a configurable number of slots can be considered in NR. Moreover, the change of beamformer may be associated with certain events, e.g., TRP applying a new beam according to the beam indicator (e.g., CRI) or the like reported by the UE. Other events include RRC reconfiguration of measurement and/or resources. When such an event occurs, it may be appropriate for the UE to reset its channel measurement and not average the measurements before and after the event. Therefore, time domain channel measurement reset due to relevant events may be supported.

For similar reasons as described above for time domain channel measurement restriction, interference measurement restriction by a configurable number of slots can be considered in NR, in order to align with the possible configuration of time domain channel measurement restriction.

Therefore, in certain embodiments, a configurable number of slots are supported for time domain channel/interference measurement restriction and time domain measurement reset due to a change in CRI and/or measurement/resource configurations. In some scenarios, a slot value range may include at least {1 slot, unrestricted # of slots}. Linearly increasing numbers of slots may be supported, such as {1, n, 2n, 3n, . . . , unrestricted # of slots}, where n=5 or 10. Nonlinearly increasing numbers of slots may be supported, such as {1, 2, 4, unrestricted # of slots} for 2 bits or {1, 2, 4, 8, 16, 32, 64, unrestricted # of slots} for 3 bits. Note that the number of slots here is the number of slots with measurement resources, and excludes slots without measurement resources.

The frequency domain channel measurement restriction, on the other hand, may be considered in situations where multiple services exist in different parts of the whole frequency band. While channel measurement over the whole bandwidth is possible, it may be appropriate for certain services to measure one or a few bandwidth parts for the UE. In this regard, restricting the channel measurement in frequency domain may be beneficial.

Multiple bandwidth parts may be configured to a UE, each bandwidth part corresponding to a specific numerology to support the relevant service. At least one out of multiple bandwidth parts may be activated, while multiple bandwidth parts with different numerologies activated simultaneously may also be considered. With this flexibility of bandwidth part configuration, the frequency domain channel measurement restriction may be applicable in partial bandwidth measurements (e.g., measurement restricted to one or more bandwidth parts out of the full bandwidth).

Certain embodiments contemplate further measurement restriction within a bandwidth part. For instance, in beam management, a UE-group-specific CSI-RS may cover the whole band of the link or a specific subband. A UE-specific CSI-RS may be allocated within the frequency resources to a particular UE, in order to provide accurate beam information and/or CSI for example, and also to avoid affecting other FDM-ed transmissions. In this regard, a CSI-RS bandwidth smaller than the bandwidth part may be considered, and thus the frequency domain channel measurement restriction on the CSI-RS configured bandwidth within a bandwidth part may be appropriate.

CSI-RS may be configured with a bandwidth smaller than the UE's bandwidth part. In this way, channel measurement resources as well as interference measurement resources can be configured with their respective bandwidth, which can be equal to or smaller than the bandwidth part. For a derived CSI, NZP CSI-RS IMR bandwidth may be the same as the bandwidth of NZP CSI-RS CMR. Otherwise, it may not be reasonable to calculate CQI based on a NZP CSI-RS CMR configured in bandwidth part 1 but a NZP CSI-RS IMR in bandwidth part 2 for example. Thus, in certain embodiments, a UE might not expect to receive an NZP CSI-RS resource for interference measurement whose bandwidth is not the same as the bandwidth of channel measurement resource.

Regarding the signaling of measurement restriction via CSI-RS bandwidth, various techniques may be performed. For example, with a granularity of RBG, a bitmap may be used. The length of the bitmap depends on the RBG/CSI-RS bandwidth and corresponding RBG size. For continuous CSI-RS bandwidth, a starting position and a length of the bandwidth can be configured to the UE based on a granularity of RB, for example.

Channel and interference measurement restriction on CSI-RS resources within a configurable number of subbands may be supported, and if the CSI-RS resource has a configured bandwidth smaller than the bandwidth part, channel and interference measurements may be restricted to the CSI-RS resources within the configured bandwidth.

In certain embodiments, a UE may be assumed to perform channel/signal/RRM/RLM measurements for a CSI report on the RS (including CRS, CSI-RS) resource(s) indicated by dedicated signaling for the CSI report if the signaling is found, and otherwise on CRS. Furthermore, if a resource-restricted measurement subset is signaled for restricting signal/channel measurement resources (note that however, in 3GPP generally resource-restricted measurements are for restricting the interference measurement resources, not restricting the signal/channel measurement resources), then the UE is assumed to further restrict its signal/channel measurements within the indicated subset. In an embodiment, an eNB (or other network node) may configure three NZP CSI-RS resources for a UE, and an NZP CSI-RS resource may be assigned with no CQI report for signal measurements (and possibly no interference measurements). In such a case, the UE is not assumed to perform channel/signal/RRM/RLM measurements (nor interference measurements) on this resource until otherwise signaled by an eNB (or other network node). For example, when the UE receives and demodulates/decodes a PDSCH, the UE is assumed to perform rate matching and/or discarding of the REs indicated as NZP CSI-RS resources but not linked to any CQI. On those REs, the eNB (or other network node) can determine to transmit signals not limited to the signaled CSI-RS contents, but may choose to blank (e.g., so that a CSI-RS resource from another point/cell may transmit without interference from this point/cell), or may choose to transmit special signals (e.g., so that a CSI-RS resource from another point/cell may see the desired interference from this point/cell and a UE can perform the desired interference measurements).

For example, in HetNet Enhanced Inter-Cell Interference Control (eICIC), a pico UE may seek to report a CQI with a macro muting and a CQI with a macro interfering, based on measurements on CSI-RS resources. In certain embodiments, when the UE measures interference on CSI-RS resources associated with macro muting, the macro does not need to be in an almost blank subframe. However, it may be appropriate for the macro to blank on the corresponding REs and choose to mark these REs as an NZP CSI-RS resource that is not linked to any CQI report so that macro UEs may rate match around these REs. Similarly, when the UE measures interference on a CSI-RS resource associated with macro interfering, the macro does not need to be in a non-almost blank subframe. However, the macro may transmit any chosen signals on the corresponding REs and can choose to mark these REs as an NZP CSI-RS resource that is not linked to any CQI report so that macro UEs may rate match around these REs.

Similarly, in Further Enhanced Inter-Cell Interference Control (FeICIC), when the pico UE measures interference on a CSI-RS resource associated with macro interfering with reduced power, the macro does not need to be in an almost blank subframe, but may transmit at the reduced power on the corresponding REs. The macro can choose to mark these REs as an NZP CSI-RS resource that is not linked to any CQI report so that macro UEs may rate match around these REs. Similarly, in Coordinated Beam Blanking (CBB) or other semi-statically configured interference coordination schemes, when the UE measures interference on a CSI-RS resource associated with macro interfering with a spatial/ beamforming/beam-blanking pattern, the macro does not need to transmit PDSCH according to the pattern. However, the macro may transmit according to the pattern on the corresponding REs and can choose to mark these REs as an NZP CSI-RS resource that is not linked to any CQI report so that macro UEs may rate match around these REs. In other words, configuring an NZP CSI-RS resource that is not linked to any CQI report may allow an eNB to "emulate" or "mock" the desired interference on those REs without affecting operations of the eNB's UEs. Configuring an NZP CSI-RS resource that is not linked to any CQI report also may allow an eNB to perform an operation on those REs which may be backward incompatible. In other words, signaling a non-zero-power CSI-RS resource to a UE which is not used for a CQI report is a way for the network to transparently perform RE muting or interference emulation or non-compatible transmissions without affecting the UE behavior. As described below, another way of doing so is to signal a ZP CSI-RS resource to a UE which is not used for a CQI report. A possible advantage for using an NZP CSI-RS resource for this purpose is that the NZP CSI-RS resource can be configured more flexibly (e.g., in terms of periodicity, subframe offset, number of antenna ports) than the ZP CSI-RS resource, but higher signaling overhead may be involved.

In certain embodiments, a UE may assume that a signaled CSI-RS resource for channel/signal measurements for a CSI report corresponds to one channel/signal condition (within each resource-restricted measurement subset, if signaled). A CSI-RS resource signaled to a UE for channel/signal measurements can be associated with a unique CSI-RS index explicitly or implicitly. For instance, a CRS resource may be implicitly indexed as 0. In some embodiments, an eNB (or the network element) allows an NZP CSI-RS resource to be configured with zero (no), one, or more Pc values. As described above, Pc may be an assumed ratio of PDSCH EPRE to CSI-RS EPRE when UE derives CSI feedback. In certain embodiments, Pc takes values in the range of [−8, 15] dB with 1 dB step size, where the PDSCH EPRE corresponds to the symbols for which the ratio of the PDSCH EPRE to the cell-specific RS EPRE is denoted by $\rho_A$, as specified in Table 50.2-2 and Table 50.2-3 of TS 36.213. In other words, the Pc value may be used by the UE to compute the associated CQI report, and different Pc values can lead to different CQI feedback values even if the CQI feedback values are based on common channel/signal/interference measurement resources.

When there is a possibility of multiple CQI reports but a same NZP CSI-RS resource is configured for the signal/ channel measurements of these CQI reports, allowing more than one Pc values to be configured for the same NZP CSI-RS resource may allow the UE to compute each CQI report with the CQI-report-specific Pc value. Another possible advantage of allowing one or more Pc values to be associated with an NZP CSI-RS resource is that this resource may be used for generating two different CQI reports for resource-restricted measurements, namely, each CQI report may be associated with a Pc value. If no Pc value is configured for an NZP CSI-RS resource, the UE may be assumed to perform rate matching around the CSI-RS REs. Other ways to signal a UE to perform rate matching around the CSI-RS REs may be used, such as a bit to indicate so, or by not linking a CQI report to this CSI-RS resource.

With regard to interference measurements, in 3GPP it was proposed to use either NZP CSI-RS resources or ZP CSI-RS resources or both for interference measurement resources. If a ZP CSI-RS resource is to be used for interference measurement, it was generally proposed that each interference measurement resource is a 4-RE resource within a ZP CSI-RS resource and is associated with one bit of the 16-bit bitmap of the ZP CSI-RS resource. Such a 4-RE measurement resource unit may be referred to as an interference measurement resource (IMR), or channel-state information interference measurement (CSI-IM) resource, or a ZP CSI-RS resource for interference measurement. In an embodiment, an eNB (or other network node) can allow zero, one, or multiple NZP CSI-RS resources, and/or zero, one, or multiple ZP CSI-RS resources to be configured to a UE for interference measurements for CSI feedback by dedicated signaling. In an embodiment, the total number of NZP CSI-RS resources and/or ZP CSI-RS resources for a UE for interference measurements is configured by dedicated signaling. In an embodiment, the total number of ZP CSI-RS resources for a UE for interference measurements is configured by dedicated signaling. In an embodiment, the total number of ZP CSI-RS resources for a UE (not limited for the purpose of interference measurements) is configured by dedicated signaling. The maximum of any such total number may be predefined in standards specifications or specified as follows.

In another embodiment, the maximum number of NZP CSI-RS resources and/or ZP CSI-RS resources for a UE for interference measurements is predefined in standards specifications, e.g., 2, 3, 4, or more. An eNB/MME/CoMP set controller may further limit the actual maximum number via dedicated signaling. For example, the standards specification may predefine the maximum to be 4, but a CoMP set controller may signal to the eNBs (or other network nodes) controlled by the CoMP set controller an actual maximum to be 2. The eNBs (or other network nodes) inform the UEs via dedicated signaling. In another embodiment, no limit to the maximum number of NZP CSI-RS resources and/or ZP CSI-RS resources for a UE for interference measurements is specified/signaled. However, the actual maximum number of NZP CSI-RS resources and ZP CSI-RS resources for a UE for interference measurements may be practically limited by, e.g., the total number of CSI-RS resources for a UE.

In an embodiment, the total number of NZP CSI-RS resources and/or ZP CSI-RS resources for a UE is configured by dedicated signaling. In another embodiment, the maximum number of NZP CSI-RS resources and/or ZP CSI-RS resources for a UE is predefined in standards specifications, e.g., 2, 3, 4, or more. The eNB/MME/CoMP set controller may further limit the actual maximum number via dedicated signaling. For example, the standards specification may predefine the maximum to be 4, but a CoMP set controller may signal to the eNBs (or other network nodes) controlled by the CoMP set controller an actual maximum to be 2. The eNBs (or other network nodes) inform the UEs via dedicated signaling. In another embodiment, no limit to the maximum number of NZP CSI-RS resources and/or ZP CSI-RS resources for a UE is specified/signaled.

As described above, in some embodiments, it may be permissible for the configuration of the number of ZP CSI-RS resources for interference measurements to be unrelated to the configuration of the number of ZP CSI-RS resources (which may be used for interference measurements and/or RE muting and/or other purposes). This may be useful since it may provide more flexibility to configure ZP CSI-RS resources for interference measurements and ZP CSI-RS resources for purposes not limited to interference measurements; however, this may imply separate signaling of ZP CSI-RS resources for interference measurements and ZP CSI-RS resources.

In some embodiments, an eNB (or other network node) can allow a CSI report for a UE to be configured with zero, one, or more NZP CSI-RS resources and/or zero, one, or more ZP CSI-RS resources for interference measurements by dedicated signaling. If no or zero CSI-RS resource is configured for interference measurements for a CSI report by dedicated signaling to a UE, the UE is assumed to perform interference measurements for the CSI report based on CRS.

In an embodiment, a dedicated signaling to configure interference measurements to a UE can be signaled together with CSI-RS configurations. For example, in a CSI-RS configuration, a field may be added to indicate for which CQI report(s) this CSI-RS resource(s) is to be used for interference measurements. The CQI report(s) may be configured in a separate signaling and may be indexed, and the indication can be based on index(es) of the CQI report(s). However, when a CSI-RS resource is changed/added/removed, it may be appropriate to reconfigure the CQI reports. When a CQI report is to be reconfigured/added/removed, it may be appropriate to re-signal the CSI-RS configurations since some CQI configuration information is signaled with a CSI-RS configuration.

In an embodiment, a dedicated signaling to configure interference measurements to a UE can be signaled together with CQI report configurations. For example, in a CQI report configuration, a field may be added to indicate which (ZP or NZP) CSI-RS resource(s) are to be used for interference measurements for this CQI report. The CSI-RS resource(s) to be used for interference measurements may be configured in a separate signaling and may be indexed, and the indication can be based on index(es) of the resource(s). In this case, if the CQI report is reconfigured/added/removed, it may or may not be appropriate to re-signal the CSI-RS configurations. In an embodiment, a dedicated signaling to configure interference measurements to a UE can be signaled separately from CQI/CSI-RS configuration signaling, which may be a bitmap linking the CQI reports to the associated CSI-RS resources for interference measurements, or a bitmap linking the CSI-RS resources for interference measurements to the associated CQI reports. The indication can be based on index(es) of the resource(s) and the index(es) of the CQI report(s). In this case, if the CQI report is reconfigured/added/removed, it may or may not be appropriate to re-signal the CSI-RS configurations.

Further, a UE may be assumed to perform interference measurements for a CSI report on the RS (including CRS, CSI-RS) resource(s) indicated by dedicated signaling for the CSI report if the signaling is found, and otherwise on CRS. Furthermore, if a resource-restricted measurement subset is signaled, then the UE may be assumed to further restrict its interference measurements within the indicated subset. In an embodiment, an eNB (or other network node) may configure three CSI-RS resources for a UE, and a CSI-RS resource may be assigned with no CQI report for signal measurements and no interference measurements. In such a case, the UE is not assumed to perform any measurements on this resource until otherwise signaled by an eNB (or other network node).

For example, for PDSCH reception the UE may be assumed to perform rate matching and/or discarding of the REs indicated as resources for interference measurements but associated with no CQI report. On those REs, the eNB can decide to transmit signals not limited to the signaled CSI-RS contents, but may choose to blank (e.g., so that a CSI-RS resource from another point/cell may transmit without interference from this point/cell), or to transmit special signals (e.g., so that a CSI-RS resource from another point/cell may see the desired interference from this point/cell and a UE can perform the desired interference measurements). If an NZP CSI-RS resource is signaled to a UE for interference measurements, the UE also may be informed by dedicated signaling whether the UE is assumed to remove the signal of that CSI-RS or not when performing interference measurements. This assumption may be indicated using a bit in the dedicated signaling. Further, a CSI-RS resource signaled to a UE for interference measurements can be associated with a unique CSI-RS index explicitly or implicitly. For instance, CRS resource may be implicitly indexed as 0.

With regard to CSI configuration and calculation, an eNB (or another network node) allows one or multiple CQI reports to be configured for a UE by dedicated signaling. In an embodiment, the total number of CQI reports for a UE is configured by dedicated signaling. In another embodiment, the maximum number of CQI reports for a UE is predefined in the standards specifications, for instance, 2, or 3, or 4, or more CQI reports for a UE. In another embodiment, an eNB does not explicitly specify a limit to the maximum number of CQI reports for a UE. In some embodiments, an eNB (or other network node) can allow a CQI report for a UE to be configured, such as via dedicated signaling, to be periodic with a reporting period, subframe offset, and Physical Uplink Control Channel (PUCCH) mode, and/or to be aperiodic with a PUSCH mode.

When multiple CQI reports are to be fed back based on multiple CSI-RS resources and possibly CRS resources, it may be appropriate to link a CQI report to the reference signals properly, for instance via dedicated signaling. For example, for a UE, an eNB (or other network node) may allow a CQI report to be configured based on signal/channel measurements of CRS resources as in Release 10 or signal/channel measurements of zero, one, or multiple NZP CSI-RS resources, and based on interference measurements of CRS resources as in Release 10 or interference measurements of zero, one, or multiple NZP and/or ZP CSI-RS resources. If the signaling to link CQI with RS for a UE is not found for a CQI report, the UE may be assumed to compute the CQI report based on CRS.

NZP CSI-RS for IM is supported in Release 15, as a key element to facilitate probing/pre-scheduling/emulation based link adaptation for MU-MIMO and other applications. One issue is the subband measurement assumption/behavior when NZP CSI-RS for IM is configured, where a subband includes 4, 8, 16, or 32 PRBs depending on the bandwidth and configuration. However, the UE pairing and/or NZP CSI-RS rank/precoding may be generally different for different subbands. For example, each Precoding Resource Block Group (PRG) (e.g., including 2 or 4 PRBs or wideband) may have a precoding different from any other PRG. Averaging across subbands with different UE pairing and/or NZP CSI-RS rank/precoding might not generate any meaningful measurement results for a subband. Thus, in certain embodiments, it may be appropriate to prohibit calculating averages across subbands with different UE pairing and/or NZP CSI-RS rank/precoding.

Although subband CSI reporting is supported (see, e.g., 5.2.1.4 of TS 38.214), the standard does not define UE assumptions on the precoding of the subbands and also does not regulate UE subband measurement behavior. In other words, for either wideband or subband reporting, typically the UE first generates a measurement for each subband, and then derives reporting one or more quantities (e.g., CQI) for each subband. In the first step, the subband measurement may be generated based on the current subband or multiple subbands, which is not specified in the standards. Therefore, it is generally up to the UE implementation, and for some UE implementations, the UE may utilize some other subbands to generate one subband report, and for some UE implementations, the UE may utilize some other subbands to generate one subband measurement, which may lead to misleading outcomes. The following describes a few possible embodiments for reducing or eliminating these misleading outcomes.

In an embodiment, if NZP CSI-RS for IM is configured and CQI reporting without PMI is configured, the UE may interpret that each subband in the CSI reporting band may be associated with a signal transmission assumption (associated with the NZP for CM) and an interference transmission assumption (associated with the NZP for IM) different from those on any other subbands. As a result, the UE would not perform processing blindly across multiple subbands when estimating signal/interference over NZP CSI-RS resources. This embodiment specifies UE assumptions for its measurement operations.

In an embodiment, the above signal transmission assumption is the UE assumption of NZP port precoding. In other words, if interference measurement is performed on NZP CSI-RS and if the associated CSI-ReportConfig is configured with the higher layer parameter reportQuantity set to 'cri-RI-CQI', the UE may assume, for a subband of the CSI reporting band, a precoding matrix is applied to form the ports of the NZP CSI-RS resource different from the precoding matrix on any other subband of the CSI reporting band, for channel measurement. Likewise, the UE may assume, for a subband of the CSI reporting band, a precoding matrix is applied to form the ports of the NZP CSI-RS resource different from the precoding matrix on any other subband of the CSI reporting band, for channel measurement.

In an embodiment, the frequency domain granularity is not subbands, but PRG of the associated DMRS, a bundle of a number (e.g., 2, 4, or 8) of subbands, or a number of subbands as signaled by the network. For a UE configured with a CSI-ReportConfig with the higher layer parameter reportQuantity set to 'cri-RI-CQI', the standard (TS 38.214) specifies that, when calculating the CQI for a rank, the UE shall use the ports indicated for that rank for the selected CSI-RS resource, and the precoder for the indicated ports shall be assumed to be the identity matrix. This does not contradict the assumption in this embodiment, since the precoding matrix applied to form the ports of the NZP is not necessarily the precoding matrix assumed by the UE for the ports of the NZP for deriving CQI.

In an embodiment, if NZP CSI-RS for IM is configured and CQI reporting without PMI is configured, the UE may interpret that within each subband in the CSI reporting band there is a signal transmission assumption and an interference transmission assumption. As a result, the UE may perform processing within one subband when estimating signal/interference over NZP CSI-RS resources. This embodiment specifies UE assumption for its measurement operations. In other words, the UE can assume a common precoding for forming the ports of NZP within one subband, and if the UE attempts to incorporate NZP on other subbands to assist the measurement on this subband, the UE has to verify the validity based on the received NZP on these subbands. If the UE can infer that multiple subbands have the same precoding forming the ports, the UE can average/process across these subbands for one subband's measurement, and otherwise the UE will restrict the measurement based on the NZP in the subband. Similarly as above, the frequency domain granularity may be different from subbands. Therefore, when a UE is configured with NZP CSI-RS resource setting for interference measurement and the associated reporting quantity is cri-RI-CQI, the UE may assume, for the PRBs within a subband of the CSI reporting band, a single precoding matrix is applied to form the ports for the NZP CSI-RS resources for channel measurement, and a single precoding matrix is applied to form the ports for the NZP CSI-RS resources for interference measurement.

In an embodiment, if NZP CSI-RS for IM is configured and subband CQI reporting is configured, the UE may interpret that each subband in the CSI reporting band is associated with a signal transmission assumption and an interference transmission assumption different from those on another subband. In other words, when a UE is configured with NZP CSI-RS resource setting for interference measurement and cqi-FormatIndicator is configured as subbandCQI, the UE may assume different precoding on each subband within the CSI reporting band for the NZP CSI-RS resources for channel measurement and the NZP CSI-RS resources for interference measurement. Additionally or alternatively, the UE may assume that, for the PRBs within a subband of the CSI reporting band, a single precoding matrix is applied to form the ports for the NZP CSI-RS resources for channel measurement, and a single precoding matrix is applied to form the ports for the NZP CSI-RS resources for interference measurement. Similar as above, the frequency domain granularity may be different from subbands.

In an embodiment, UE behavior may be specified to restrict its measurement in frequency domain (e.g., for each subband) according to measurement restriction configuration or other configuration combination such as NZP CSI-RS for IM and CQI reporting without PMI. Note that the subband measurement is applicable to subband reporting and wideband reporting. Therefore, if interference measurement is performed on NZP CSI-RS and if the associated CSI-ReportConfig is configured with the higher layer parameter reportQuantity set to 'cri-RI-CQI', a UE may restrict its measurement within each subband of the CSI reporting band for the NZP CSI-RS resource for channel measurement and the NZP CSI-RS resources for interference measurement. In this context, restriction refers to the measurement resources within a subband that can be used to derive the measurement result for that subband.

In an embodiment that can be combined with any of the above embodiments, if there may be an issue regarding the subband measurement accuracy due to the low density of NZP CSI-RS, the network may configure the larger subband size (e.g., eight PRBs in a subband rather than four PRBs in a subband). The network may restrict probing to performing probing with the larger PRG size (e.g., four PRBs). Furthermore, a bundle of a number (e.g., 2, 4, or 8) of subbands may be pre-specified, or a bundle of a number (e.g., 2, 4, or 8) of subbands may be determined by the density of the NZP (e.g., equal to N/density, where N may be 12 or 24 associated with DMRS density), or a number of subbands as signaled by the network associated with a reporting configuration, based on which the above UE assumptions or UE frequency-domain measurement restriction is applied.

In an embodiment that can be combined with any of the above embodiments, the combination of configuration conditions leading to the above UE assumptions or UE behavior may be replaced by one or more the following: 1) a signaling (RRC, MAC, or DCI) that specifies a probing/pre-scheduling mode, such as linking the reporting to a PDSCH/DMRS, signaling designed above for probing, etc.; 2) a signaling (RRC, MAC, or DCI) that specifies a subband (or any other granularity in frequency domain) measurement assumption; 3) a signaling (RRC, MAC, or DCI) that specifies a subband (or any other granularity in frequency domain) reporting; 4) interference measurement that is performed on NZP CSI-RS; 5) a CSI-ReportConfig that is configured with the higher layer parameter reportQuantity set to 'cri-RI-CQI'; 6) aperiodic CSI-RS; 7) aperiodic CSI reporting; or 8) a signaling (RRC, MAC, or DCI) that specifies a subband (or any other granularity in frequency domain) measurement restriction. In certain embodiments, the subband UE assumption or UE behavior may be applied to interference measurement, channel/signal measurement only, or both (which may use one or two signaling as given above, for example, one for both channel and interference, or one for channel and the other for interference).

Figure 27:
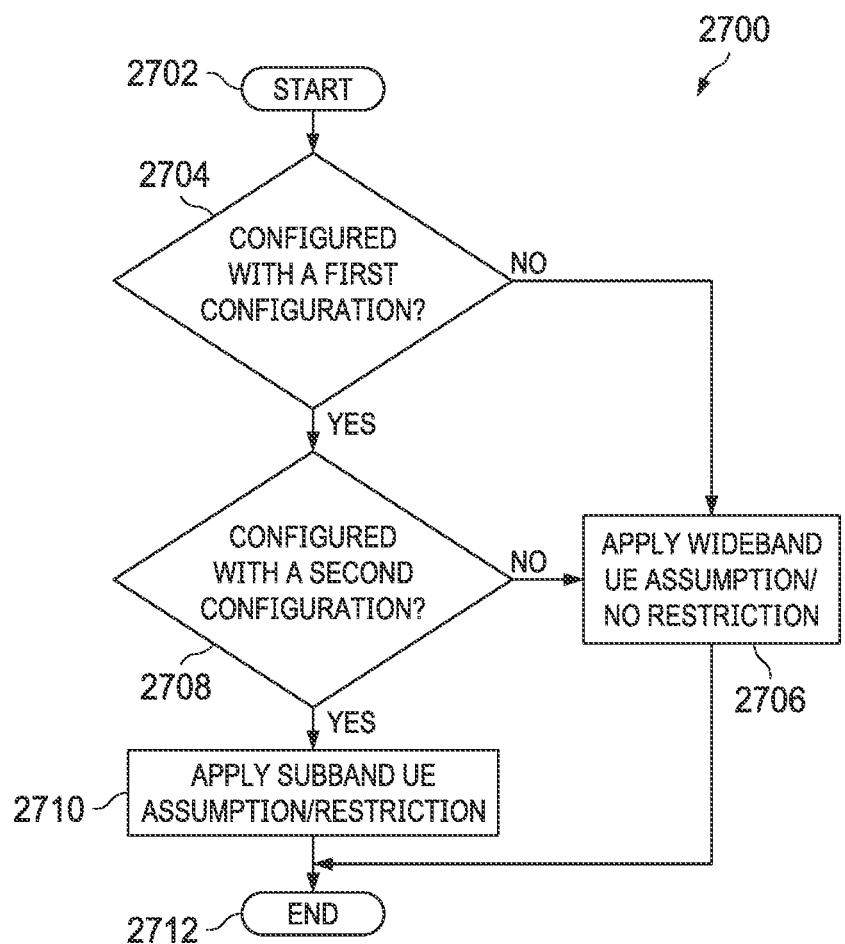
FIG. 27 illustrates an example method in which a combination of UE behaviors is implemented, according to certain embodiments of this disclosure.

FIG. 27 illustrates an example method 2700 in which a combination of UE behaviors is implemented, according to certain embodiments of this disclosure. The method begins at step 2702. NZP CSI-RS for IM is configured and CQI reporting without PMI is configured subband CQI reporting is configured, At step 2704, the UE determines whether it is configured with a first configuration. In certain embodiments, the first configuration is using NZP CSI-RS for interference measurement. If the UE determines that it is not configured with the first configuration (e.g., that NZP CSI-RS for IM is not configured), then at step 2706, the UE applies a wideband UE assumption/no restriction, as described above.

Returning to step 2704, if the UE determines that it is configured with the first configuration (e.g., that NZP CSI-RS for IM is configured), then the UE proceeds to step 2708.

At step 2708, the UE determines whether it is configured with a second configuration. In certain embodiments, the second configuration is CQI reporting without PMI. As another example, the second configuration could be subband CQI reporting. If the UE determines that it is not configured with the second configuration (e.g., that CQI reporting without PMI is not configured or that subband CQI reporting is not configured), then the method proceeds to step 2706 at which the UE applies a wideband UE assumption/no restriction, as described above.

Returning to step 2708, if the UE determines that it is configured with the second configuration (e.g., that CQI reporting without PMI is configured or that subband CQI reporting is configured), then the UE proceeds to step 2710.

At step 2710, the UE applies a subband UE assumption/restriction, as described above.

Although particular configurations are described for the first and second configurations, this disclosure contemplates any suitable configurations, such as those described above, as being the first and second configurations. Additionally, although the particular configurations described with reference to the method of FIG. 27 are designated as the first and second configurations, this disclosure contemplates reversing which of these configurations is the first and which is the second, as appropriate. Furthermore, the example method show in FIG. 27 includes the combination of two configurations. This disclosure, however, contemplates a UE being implemented with one configuration or multiple configurations (different than or in addition to those described with reference to method 2700), including any of the possible above-described configurations. The associated embodiment subband UE assumption, UE behavior, and measurement restriction are also listed above.

In an embodiment, if a sounding reference signal (SRS) is associated with an NZP CSI-RS resource via spatialRelationInfo, then the subband measurement applied to the NZP leads to subband precoding of the SRS, with the same frequency-domain granularity.

In an embodiment, if reportQuantity is set to 'cri-RI-CQI', a rank indicator (RI) restriction may be signaled. The RI restriction can be a 8-bit bitmap configured in CSI-ReportConfig to specify which rank(s) of rank 1 to rank 8 is selected, where the i-th bit (from 0 to 7) is for rank i+1. The UE performs measurements for the allowed RIs and does not perform measurements for other RIs (e.g., the ports/layers associated with the bitmap location set to be 1 are used by the UE). Based on these measurements, the UE selects one RI and associated CRI/RI to report. The RI restriction bitmap may be a new field in CSI-ReportConfig, or may reuse the typeI-SinglePanel-ri-Restriction in CodebookConfig (the UE ignore other fields in CodebookConfig). Multiple CSI-ReportConfig may be associated with the same PortIndexFor8Ranks if they are based on the same NZP, but each has its own RI restriction to specify different ranks, which saves signaling overhead.

Figure 28:
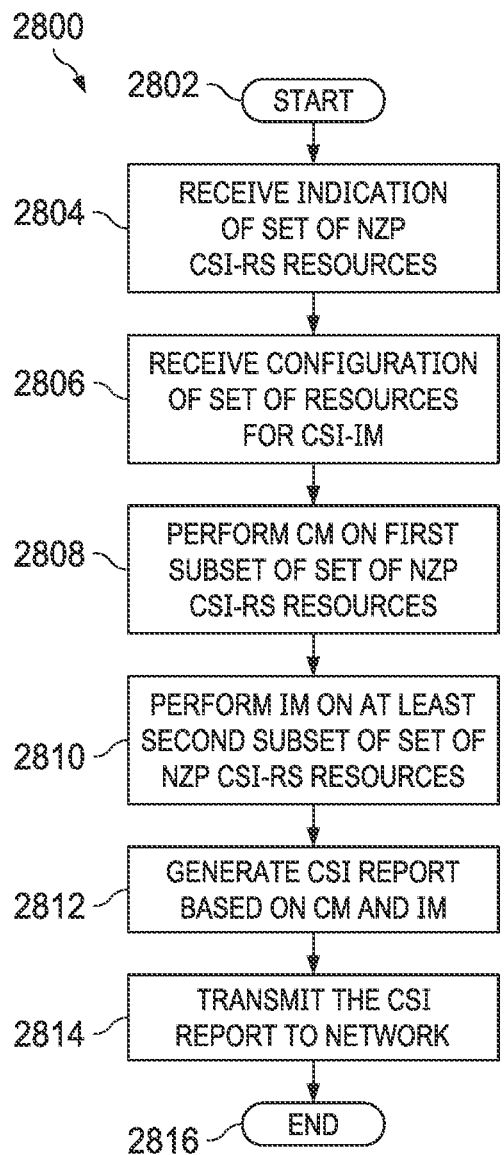
FIG. 28 illustrates an example method 2800 for wireless communication, according to certain embodiments of this disclosure.

FIG. 28 illustrates an example method 2800 for wireless communication, according to certain embodiments of this disclosure. For purposes of this example, a UE is described as performing the steps of method 2800. The method begins at step 2802.

At step 2804, the UE receives an indication of a set of NZP CSI-RS resources for channel measurement (CM) and interference measurement (IM). As an example, the indication of the set of NZP CSI-RS resources for CM and IM may be received by the UE from a network node, such as a NodeB, an eNB, a gNB, or any other suitable type of network node. A first subset of the set of NZP CSI-RS resources may be configured for CM, and a second subset of the set of NZP CSI-RS resources may be configured for IM. In certain embodiments, the indication of the set of NZP CSI-RS resources for CM and IM includes an indication the first subset of the set of NZP CSI-RS resources configured for CM and the second subset of the set of NZP CSI-RS resources configured for IM. As described above, the first subset of the NZP CSI-RS resources and the second subset of the NZP CSI-RS resources might or might not overlap.

In certain embodiments, the UE receives (e.g., from the network node) the indication of the first subset of the NZP CSI-RS resources and the second subset of the NZP CSI-RS resources via DCI. Additionally or alternatively, the UE may receive (e.g., from the network node) the indication of the first subset of the NZP CSI-RS resources and the second subset of the NZP CSI-RS resources via a combination of DCI and MAC signaling. In certain embodiments, the DCI provides a dynamic triggering of one or more CSI reporting settings.

At step 2806, the UE receives a configuration of a set of resources for CSI-IM, which may affect the assumptions made by the UE for interference measurement. This disclosure further contemplates the UE receiving (e.g., from a network node) a configuration of a measurement restriction associated with channel measurement, receiving (e.g., from a network node) a configuration of a measurement restriction associated with interference measurement, or receiving (e.g., from a network node) both a configuration of a measurement restriction associated with channel measurement and a configuration of a measurement restriction associated with interference measurement.

At step 2808, the UE performs a channel measurement on the first subset of the set of NZP CSI-RS resources. To the extent the UE received (e.g., from a network node) a configuration of a measurement restriction associated with channel measurement, the channel measurement performed at step 2808 may be performed in accordance with the received configuration of the measurement restriction associated with the channel measurement. The channel measurement may be performed in association with a CSI report.

At step 2810, the UE performs an interference measurement on at least the second subset of the set of NZP CSI-RS resources. The second subset of the set of NZP CSI-RS resources may include one or more NZP CSI-RS ports. In certain embodiments, the UE performs the interference measurement according to one or more assumptions.

As a first example assumption, the UE may perform the interference measurement according to an assumption that each NZP CSI-RS port in the second subset of the set of NZP CSI-RS resources corresponds to an interference transmission layer, and the interference measurement may be in accordance with a set of energy per resource element (EPRE) ratios each associated with one NZP CSI-RS resource in the second subset of the set of NZP CSI-RS resources. In certain embodiments, each EPRE ratio in the set of EPRE ratios that are each associated with one NZP CSI-RS resource in the second subset of the set of NZP CSI-RS resources specifies an assumed ratio of a PDSCH EPRE to an EPRE of an NZP CSI-RS signal on the NZP CSI-RS resource.

As a second example assumption, the UE may perform the interference measurement according to an assumption that other interference not associated with an interference transmission layer to which an NZP CSI-RS port in the second subset of the set of NZP CSI-RS resources corresponds is on the first subset of the set of NZP CSI-RS resources and the second subset of the set of NZP CSI-RS resources.

As a third example assumption, to the extent the UE received a configuration of a set of resources for CSI-IM (e.g., at step 2806), the UE may perform the interference measurement according to an assumption that other interference not associated with an interference transmission layer to which an NZP CSI-RS port in the second subset of the set of NZP CSI-RS resources corresponds is on the set of resources for CSI-IM.

Furthermore, the UE may perform the interference measurement in accordance with any suitable combination of the described assumptions as well as other assumptions.

To the extent the UE received (e.g., from a network node) a configuration of a measurement restriction associated with interference measurement, the interference measurement performed at step 2810 may be performed in accordance with the received configuration of the measurement restriction associated with the interference measurement. The interference measurement may be performed in association with a CSI report.

At step 2812, the UE may generate a CSI report based on the channel measurement (e.g., performed at step 2808) and the interference measurement (e.g., performed at step 2810). In certain embodiments, the CSI report includes at least a CQI but not a PMI. It should be noted, however, that this disclosure contemplates the CSI report including any suitable combination of information, including a PMI if appropriate.

At step 2814, the UE may transmit the CSI report to the network. For example, the UE may transmit the CSI report to a network node, which might or might not be the same network node that transmitted the set of NZP CSI-RS resources to the UE at step 2804.

At step 2816, the method ends.

Figure 29:
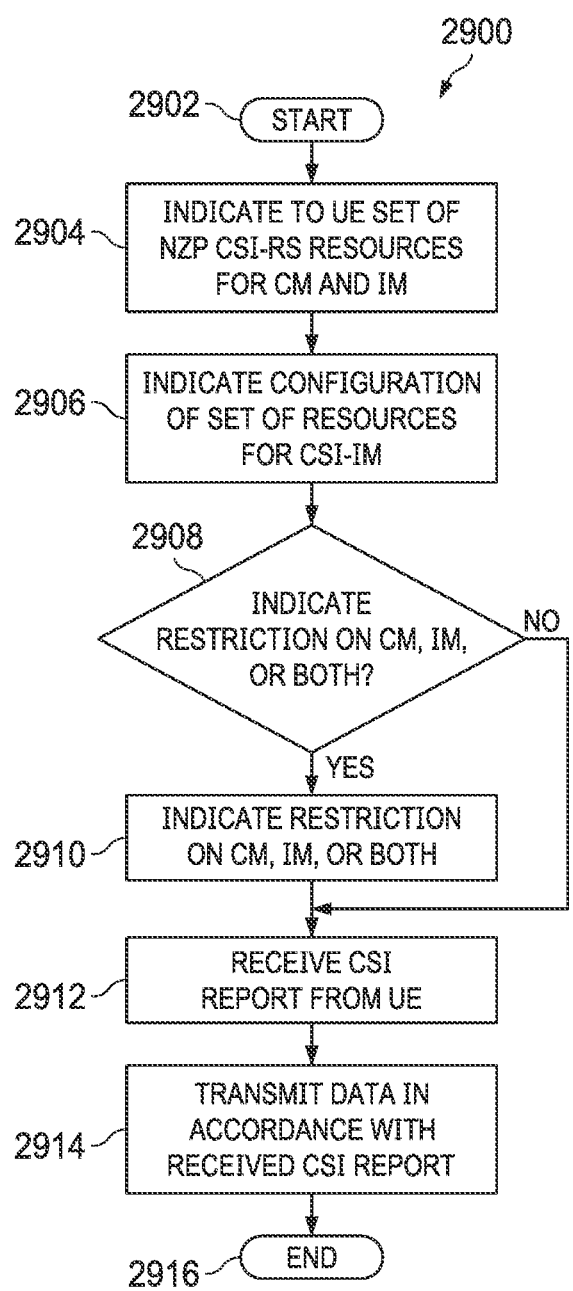
FIG. 29 illustrates an example method 2900 for wireless communication, according to certain embodiments of this disclosure.

FIG. 29 illustrates an example method 2900 for wireless communication, according to certain embodiments of this disclosure. For purposes of this example, a network node is described as performing the steps of method 2900. For example, the network node may be a NodeB, an eNB, a gNB, or any other suitable type of network node. The method begins at step 2902.

At step 2904, the network node may indicate to a UE a set of NZP CSI-RS resources for channel measurement (CM) and interference measurement (IM). A first subset of the set of NZP CSI-RS resources may be configured for CM, and a second subset of the set of NZP CSI-RS resources may be configured for IM. In certain embodiments, the indication of the set of NZP CSI-RS resources for CM and IM includes an indication the first subset of the set of NZP CSI-RS resources configured for CM and the second subset of the set of NZP CSI-RS resources configured for IM. As described above, the first subset of the NZP CSI-RS resources and the second subset of the NZP CSI-RS resources might or might not overlap.

In certain embodiments, the network node communicates (e.g., to the UE) the indication of the first subset of the NZP CSI-RS resources and the second subset of the NZP CSI-RS resources via DCI. Additionally or alternatively, the network node may communicate (e.g., to the UE) the indication of the first subset of the NZP CSI-RS resources and the second subset of the NZP CSI-RS resources via a combination of DCI and MAC signaling. In certain embodiments, the DCI provides a dynamic triggering of one or more CSI reporting settings. Although particular techniques for the network node to indicate the set of NZP CSI-RS resources, the first subset of the set of NZP CSI-RS resources, and the second subset of the set of NZP CSI-RS resources are described, this disclosure contemplates the network node indicating these resources to the UE in any suitable manner.

At step 2906, the network node indicates to the UE a configuration of a set of resources for CSI-IM, which may affect the assumptions made by the UE for interference measurement.

At step 2908, the network node determines whether to provide a measurement restriction associated with channel measurement, a measurement restriction associated with interference measurement, or both.

If the network node determines at step 2908 to provide a measurement restriction, then at step 2910 and depending on the type of measurement restriction the network node determines to issue, the network node indicates one or more configurations of one or more suitable types of measurement restrictions. For example, if the network node determines at step 2908 to provide a measurement restriction associated with channel measurement, then at step 2910, the network node indicates to the UE a configuration of a measurement restriction associated with channel measurement. As another example, if the network node determines at step 2908 to provide a measurement restriction associated with interference measurement, then at step 2910, the network node indicates to the UE a configuration of a measurement restriction associated with interference measurement. As another example, if the network node determines at step 2908 to provide both a measurement restriction associated with channel measurement and a measurement restriction associated with interference measurement, then at step 2910, the network node indicates to the UE both a configuration of a measurement restriction associated with channel measurement and a configuration of a measurement restriction associated with interference measurement.

Returning to step 2908, if the network node determines not to provide a measurement restriction, then the method proceeds to step 2912.

At step 2912, the network node receives from the UE a CSI report. The received CSI report is based on the channel measurement and interference measurement performed by the UE in response to the indication by the network node to the UE of NZP CSI-RS resources at step 2904.

For example, the UE may have performed the channel measurement on the first subset of the set of NZP CSI-RS resources. To the extent the network node indicated to the UE a configuration of a measurement restriction associated with channel measurement, the channel measurement performed by the UE may have been performed in accordance with the indicated configuration of the measurement restriction associated with the channel measurement.

As another example, the UE may have performed the interference measurement on at least the second subset of the set of NZP CSI-RS resources. The second subset of the set of NZP CSI-RS resources may include one or more NZP CSI-RS ports. In certain embodiments, the UE may have performed the interference measurement according to one or more assumptions.

As a first example assumption, the UE may have performed the interference measurement according to an assumption that each NZP CSI-RS port in the second subset of the set of NZP CSI-RS resources corresponds to an interference transmission layer, and the interference measurement may be in accordance with a set of energy per resource element (EPRE) ratios each associated with one NZP CSI-RS resource in the second subset of the set of NZP CSI-RS resources. In certain embodiments, each EPRE ratio in the set of EPRE ratios that are each associated with one NZP CSI-RS resource in the second subset of the set of NZP CSI-RS resources specifies an assumed ratio of a PDSCH EPRE to an EPRE of an NZP CSI-RS signal on the NZP CSI-RS resource.

As a second example assumption, the UE may have performed the interference measurement according to an assumption that other interference not associated with an interference transmission layer to which an NZP CSI-RS port in the second subset of the set of NZP CSI-RS resources corresponds is on the first subset of the set of NZP CSI-RS resources and the second subset of the set of NZP CSI-RS resources.

As a third example assumption, to the extent the network node indicated a configuration of a set of resources for CSI-IM (e.g., at step 2906), the UE may have performed the interference measurement according to an assumption that other interference not associated with an interference transmission layer to which an NZP CSI-RS port in the second subset of the set of NZP CSI-RS resources corresponds is on the set of resources for CSI-IM.

Furthermore, the UE may perform the interference measurement in accordance with any suitable combination of the described assumptions as well as other assumptions.

To the extent the network node indicated to the UE (e.g., at step 2910) a configuration of a measurement restriction associated with interference measurement, the interference measurement performed by the UE may have been performed in accordance with the indicated configuration of the measurement restriction associated with the interference measurement.

In certain embodiments, the CSI report includes at least a CQI but not a PMI. It should be noted, however, that this disclosure contemplates the CSI report including any suitable combination of information, including a PMI if appropriate.

At step 2914, the network node may transmit data in accordance with the received CSI report. For example, based on information included in the CSI report received from the UE, the network node may select appropriate resources for communicating with the UE.

At step 2916, the method ends.

Although this disclosure describes particular components as performing particular operations for the various methods and process described in this disclosure, this disclosure contemplates other components performing those operations. Additionally, although this disclosure describes or illustrates particular operations for the various methods and process described in this disclosure as occurring in a particular order, this disclosure contemplates any suitable operations occurring in any suitable order. Moreover, this disclosure contemplates any suitable operations being repeated one or more times in any suitable order. Although this disclosure describes or illustrates particular operations for the various methods and process described in this disclosure as occurring in sequence, this disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

Figure 30:
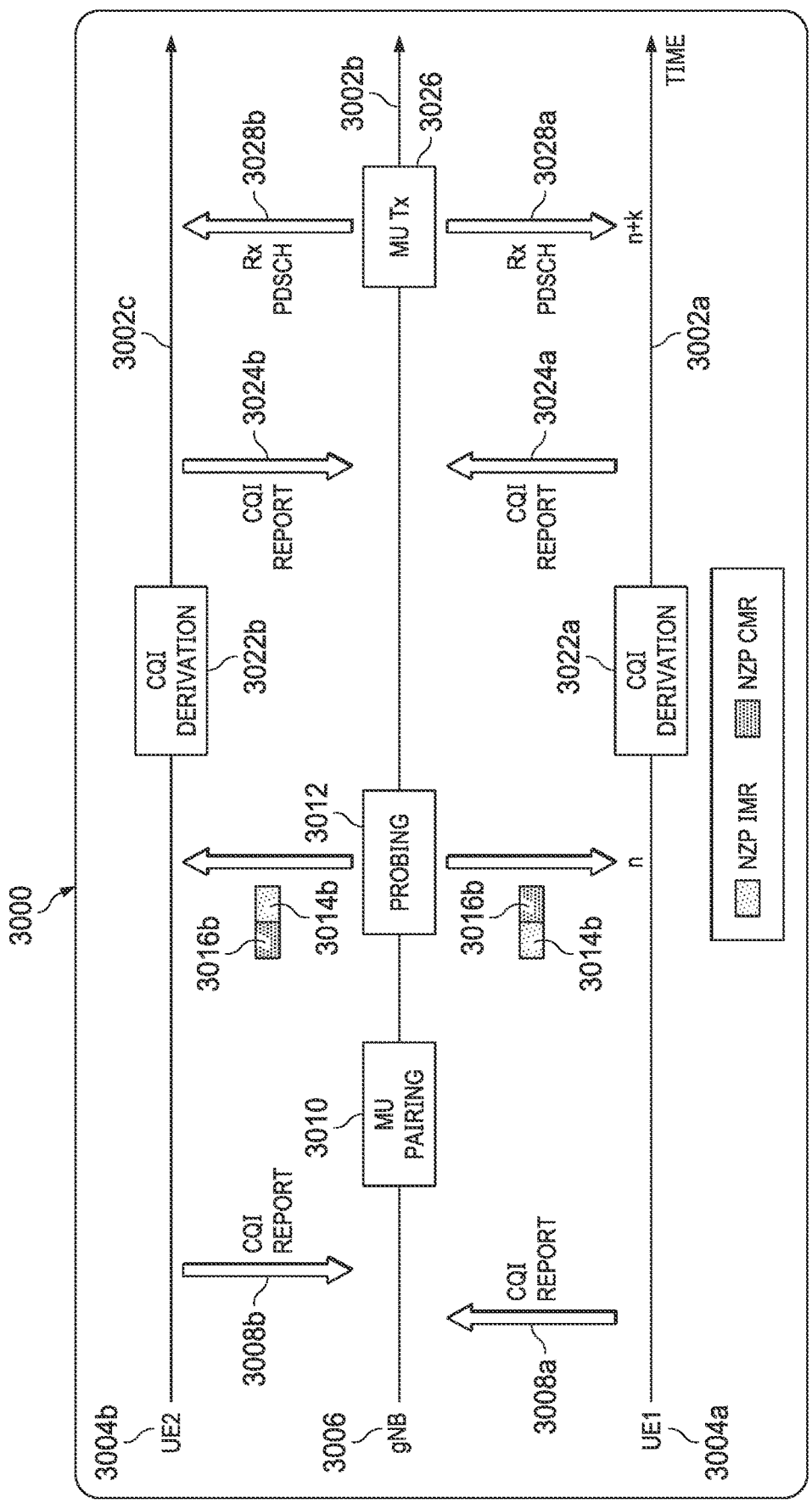
FIG. 30 illustrates an example communication flow showing multi-user multiple-input, multiple-output (MU-MIMO) link adaptation based on NZP CSI-RS for interference measurement, according to certain embodiments of this disclosure.

FIG. 30 illustrates an example communication flow showing MU-MIMO link adaptation based on NZP CSI-RS for interference measurement, according to certain embodiments of this disclosure. The illustrated example includes three timelines 3002, a timeline 3002*a* for a first UE 3004*a* (UE1), a timeline 3002*b* for a gNB 3006, and a timeline 3002*c* for a second UE 3004*b* (UE2). Although gNB 3006 is described as a gNB, this disclosure contemplates gNB 3006 being any suitable type of network node.

UE1 transmits a CQI report to gNB 3006 at 3008*a*, and UE2 transmits a CQI report to gNB 3006 at 3008*b*. gNB 3006 performs multi-user pairing at 3010. At 3012 (at time n), gNB 3006 probes UE1 and UE2, including transmitting appropriate resources for channel measurement and interference measurement to UE1 and UE2. For example, gNB transmits NZP CSI-RS resources for interference measurement (NZP IMR 3014*a*) and NZP CSI-RS resources for channel measurement (NZP CMR 3016*a*) to UE1 and transmits NZP CSI-RS resources for interference measurement (NZP IMR 3014*b*) and NZP CSI-RS resources for channel measurement (NZP CMR 3016*b*) to UE2. As described above, various measurement restrictions also could be indicated by gNB 3006 as part of the probing process.

In response to the interference and channel measurement resources, UE1 and UE2 perform CQI derivation 3022*a* and 3022*b*, respectively. This CQI derivation includes performing respective channel measurements and interferences measurements using the indicated resources indicated at 3012 (probing). As described above, the interference measurements may be performed according to one or more assumptions.

UE1 transmits another CQI report to gNB 3006 at 3024*a*, and UE2 transmits another CQI report to gNB 3006 at 3024*b*. Based on the information received in the CQI reports at 3024, gNB 3006 performs multi-user transmission 3026. The transmission may be a PDSCH. At 3028*a* and 3028*b*, respectively, UE1 and UE2 may receive the PDSCH transmission (at time n+k).

In the illustrated example, the interference measurement resources at time n reflect multi-user interference at time n+k. The channel measurement resources 3016*a* for UE1 are the interference measurement resources 3014*b* for UE2. Furthermore, the NZP CSI-RS for interference measurement at time n is a pre-coded reference signal from an interferer (inter-cell or intra-cell), reflecting interference at time n+k.

Embodiments of this disclosure may provide one or more technical advantages. In certain embodiments, configuring NZP CSI-RS resources for interference measurement provides improved link adaptation performance. Certain embodiments facilitate use of a higher spectrum frequency. Certain embodiments provide improved performance that is suitable for use with multiple-input and multiple-output (MIMO) and massive MIMO systems. Link adaptation according to certain embodiments of this disclosure allows interference measurement resources at a time, n, to reflect multi-user interference at a time n+k, with a channel measurement resource of a first UE being an interference measurement resource of a second UE, which may be advantageous in a multi-user MIMO system. Certain embodiments may improve performance in carrier aggregation/channel aggregation and in coverage enhancement.

Figure 31:
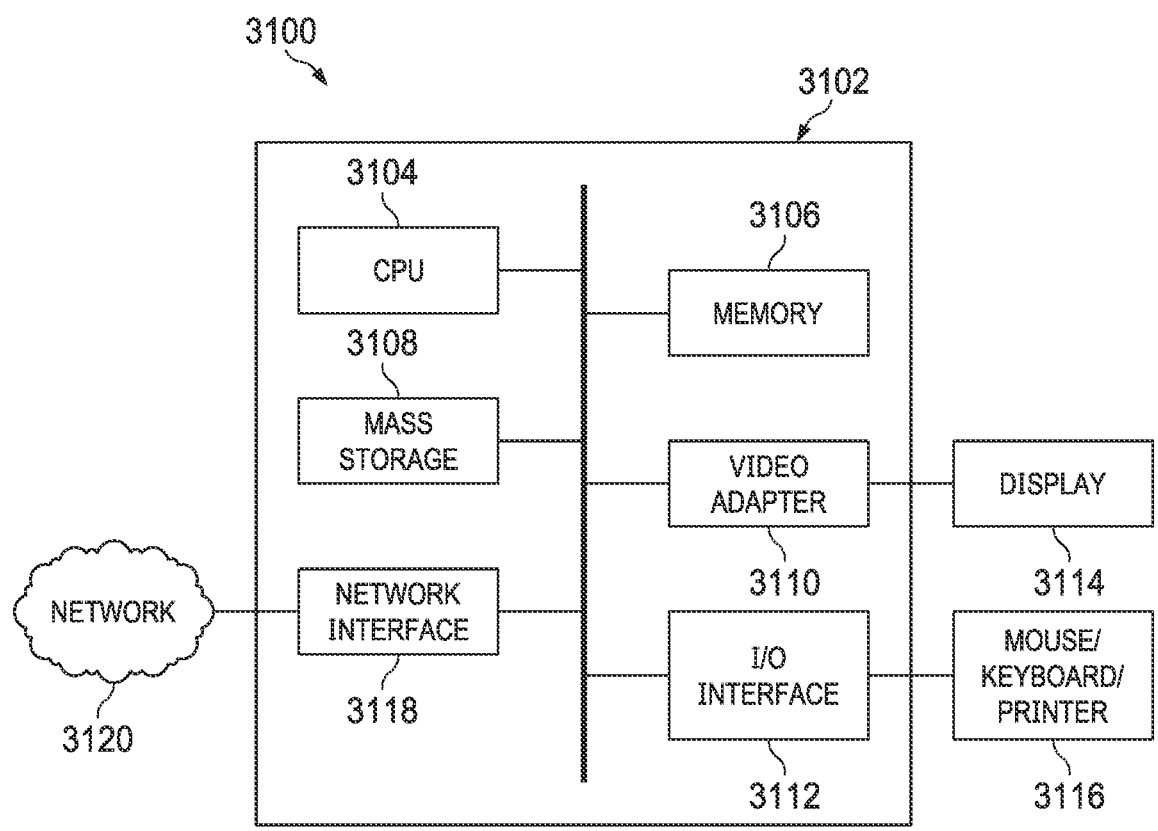
FIG. 31 is a block diagram of a processing system 2700, according to certain embodiments of this disclosure.

FIG. 31 is a block diagram of a processing system 3100 that may be used for implementing the system, apparatuses, devices, and methods disclosed herein, according to certain embodiments of this disclosure.

Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit 3102 equipped with one or more input/output devices, such as a speaker, microphone, mouse, touchscreen, keypad, keyboard, printer, display, and the like. Processing unit 3102 may include a central processing unit (CPU) 3104, memory 3106, a mass storage device 3108, a video adapter 3110, and an I/O interface 3112 connected to a bus.

The bus may be one or more of any type of several bus architectures including a memory bus or memory controller, a peripheral bus, video bus, or the like. CPU 3104 may comprise any type of electronic data processor. Memory 3106 may comprise any type of system memory such as static random access memory (SRAM), dynamic random access memory (DRAM), synchronous DRAM (SDRAM), read-only memory (ROM), a combination thereof, or the like. In an embodiment, memory 3106 may include ROM for use at boot-up, and DRAM for program and data storage for use while executing programs.

Mass storage device 3108 may comprise any type of storage device configured to store data, programs, and other information and to make the data, programs, and other information accessible via the bus. Mass storage device 3108 may comprise, for example, one or more of a solid state drive, hard disk drive, a magnetic disk drive, an optical disk drive, or the like.

Video adapter 3110 and the I/O interface 3112 provide interfaces to couple external input and output devices to the processing unit 3102. As illustrated, examples of input and output devices include a display 3114 coupled to video adapter 3110 and a mouse/keyboard/printer 3116 coupled to I/O interface 3112. Other devices may be coupled to the processing unit 3102, and additional or fewer interface cards may be utilized. For example, a serial interface card (not shown) may be used to provide a serial interface for a printer.

Processing unit 3102 also includes one or more network interfaces 3118, which may comprise wired links, such as an Ethernet cable or the like, and/or wireless links to access nodes or different networks 3120. Network interface 3118 allows processing unit 3102 to communicate with remote units via networks 3120. For example, network interface 3118 may provide wireless communication via one or more transmitters/transmit antennas and one or more receivers/receive antennas. In an embodiment, processing unit 3102 is coupled to a local-area network or a wide-area network for data processing and communications with remote devices, such as other processing units, the Internet, remote storage facilities, or the like.

An embodiment processing system for performing methods described herein, which may be installed in a host device. The processing system may include a processor, a memory, and interfaces. The processor may be any component or collection of components adapted to perform computations and/or other processing related tasks, and the memory may be any component or collection of components adapted to store programming and/or instructions for execution by the processor. In an embodiment, the memory includes a non-transitory computer readable medium. The interfaces may be any component or collection of components that allow the processing system to communicate with other devices/components and/or a user. For example, one or more of the interfaces may be adapted to communicate data, control, or management messages from the processor to applications installed on the host device and/or a remote device. As another example, one or more of the interfaces may be adapted to allow a user or user device (e.g., personal computer (PC), etc.) to interact/communicate with the processing system. The processing system may include additional components not depicted in the figure, such as long term storage (e.g., non-volatile memory, etc.).

In some embodiments, the processing system is included in a network device that is accessing, or part otherwise of, a telecommunications network. In one example, the processing system is in a network-side device in a wireless or wireline telecommunications network, such as a base station, a relay station, a scheduler, a controller, a gateway, a router, an applications server, or any other device in the telecommunications network. In other embodiments, the processing system is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

In some embodiments, one or more of the interfaces connects the processing system to a transceiver adapted to transmit and receive signaling over the telecommunications network.

In some embodiments, a transceiver adapted to transmit and receive signaling over a telecommunications network is provided. The transceiver may be installed in the host device. The transceiver comprises a network-side interface, a coupler, a transmitter, a receiver, a signal processor, and a device-side interface. The network-side interface may include any component or collection of components adapted to transmit or receive signaling over a wireless or wireline telecommunications network. The coupler may include any component or collection of components adapted to facilitate bi-directional communication over the network-side interface. The transmitter may include any component or collection of components (e.g., up-converter, power amplifier, etc.) adapted to convert a baseband signal into a modulated carrier signal suitable for transmission over the network-side interface. The receiver may include any component or collection of components (e.g., down-converter, low noise amplifier, etc.) adapted to convert a carrier signal received over the network-side interface into a baseband signal. The signal processor may include any component or collection of components adapted to convert a baseband signal into a data signal suitable for communication over the device-side interface(s), or vice-versa. The device-side interface(s) may include any component or collection of components adapted to communicate data-signals between the signal processor and components within the host device (e.g., the processing system, local area network (LAN) ports, etc.).

The transceiver may transmit and receive signaling over any type of communications medium. In some embodiments, the transceiver transmits and receives signaling over a wireless medium. For example, the transceiver may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface comprises one or more antenna/radiating elements. For example, the network-side interface may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by an indicating unit/module, a measuring unit/module and/or a determining unit/module. The respective units/modules may be hardware, software, or a combination thereof. For instance, one or more of the units/modules may be an integrated circuit, such as field programmable gate arrays (FPGAs) or application-specific integrated circuits (ASICs).

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

For example, the various elements or components may be combined or integrated in another system or certain features may be omitted, or not implemented. In addition, techniques, systems, subsystems, and methods described and illustrated in the various embodiments as discrete or separate may be combined or integrated with other systems, modules, techniques, or methods without departing from the scope of this disclosure. Other items shown or described as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for wireless communications, the method comprising:

receiving, by a user equipment (UE), control information of a first subset of a set of non-zero-power (NZP) channel state information (CSI) reference signal (CSI-RS) (NZP CSI-RS) resources and a second subset of the set of NZP CSI-RS resources, the second subset of the set of NZP CSI-RS resources comprising one or more NZP CSI-RS ports, the control information being associated with a CSI report;

performing, by the UE, a channel measurement on the first subset of the set of NZP CSI-RS resources;

performing, by the UE, an interference measurement on at least the second subset of the set of NZP CSI-RS resources in accordance with each NZP CSI-RS port in the second subset of the set of NZP CSI-RS resources corresponding to a corresponding interference transmission layer, and in accordance with other interference not associated with any of corresponding interference transmission layers, the other interference being on at least the second subset of the set of NZP CSI-RS resources;

generating, by the UE, the CSI report based on the channel measurement and the interference measurement; and transmitting, by the UE, the CSI report to a network.

2. The method of claim 1, wherein the control information associated with the CSI report also includes a set of resources for CSI-IM.

3. The method of claim 2, wherein the other interference being on at least the second subset of the set of NZP CSI-RS resources and the set of resources for CSI-IM, the other interference on the set of resources for CSI-IM not being associated with any of the corresponding interference transmission layers corresponding to the second subset of the set of NZP CSI-RS resources.

4. The method of claim 1, wherein the control information excludes a set of resources for CSI-IM, and the CSI report is not associated with any set of resources for CSI-IM.

5. The method of claim 1, wherein the interference measurement is further in accordance with other interference on the first subset of the set of NZP CSI-RS resources, the other interference on the first subset of the set of NZP CSI-RS resources not being associated with any of the corresponding interference transmission layers corresponding to the second subset of the set of NZP CSI-RS resources.

6. The method of claim 1, wherein the CSI report comprises at least a channel quality indicator (CQI) and excludes a precoding matrix indicator (PMI).

7. The method of claim 1, further comprising:
receiving a configuration of measurement restriction associated with channel measurement.

8. The method of claim 1, wherein the first subset of the set of NZP CSI-RS resources and the second subset of the set of NZP CSI-RS resources overlap.

9. The method of claim 1, further comprising:
receiving, by the UE from a network node, a signaling of the set of NZP CSI-RS resources for the channel measurement and the interference measurement.

10. The method of claim 1, further comprising:
receiving, by the UE from a network node, a signaling indicating the first subset of the set of NZP CSI-RS resources, the second subset of the set of NZP CSI-RS resources, and the CSI report.

11. The method of claim 10, wherein the signaling is received via downlink control information (DCI).

12. The method of claim 11, wherein the DCI provides a triggering of one or more CSI reporting settings.

13. The method of claim 10, wherein the signaling is received via media access control (MAC) signaling.

14. The method of claim 1, wherein the interference measurement is further performed in accordance with energy per resource element (EPRE) ratios associated with the second subset of the set of NZP CSI-RS resources.

15. The method of claim 14, wherein each of the EPRE ratios specifies a corresponding ratio of a corresponding physical downlink shared channel (PDSCH) EPRE to a corresponding NZP CSI-RS EPRE of the second subset of the set of NZP CSI-RS resources.

16. A user equipment (UE), comprising:
one or more processors; and
a non-transitory computer-readable storage medium storing programming for execution by the one or more processors, the programming including instructions to cause the UE to:
receive control information of a first subset of a set of non-zero-power (NZP) channel state information (CSI) reference signal (CSI-RS) (NZP CSI-RS) resources and a second subset of the set of NZP CSI-RS resources, the second subset of the set of NZP CSI-RS resources comprising one or more NZP CSI-RS ports, the control information being associated with a CSI report;
perform a channel measurement on the first subset of the set of NZP CSI-RS resources;
perform an interference measurement on at least the second subset of the set of NZP CSI-RS resources in accordance with each NZP CSI-RS port in the second subset of the set of NZP CSI-RS resources corresponding to a corresponding interference transmission layer and in accordance with other interference not associated with any of corresponding interference transmission layers, the other interference being on at least the second subset of the set of NZP CSI-RS resources;
generate the CSI report based on the channel measurement and interference measurement; and
transmit the CSI report to a network.

17. The UE of claim 16, wherein the control information associated with the CSI report also includes a set of resources for CSI-IM.

18. The UE of claim 17, wherein the other interference being on at least the second subset of the set of NZP CSI-RS resources and the set of resources for CSI-IM, the other interference on the set of resources for CSI-IM not being associated with any of the corresponding interference transmission layers corresponding to the second subset of the set of NZP CSI-RS resources.

19. The UE of claim 16, wherein the control information excludes a set of resources for CSI-IM, and the CSI report is not associated with any set of resources for CSI-IM.

20. The UE of claim 16, wherein the UE further performs the interference measurement in accordance with other interference on the first subset of the set of NZP CSI-RS resources, the other interference on the first subset of the set of NZP CSI-RS resources not being associated with any of the corresponding interference transmission layers corresponding to the second subset of the set of NZP CSI-RS resources.

21. The UE of claim 16, wherein the CSI report comprises at least a channel quality indicator (CQI) and excludes a precoding matrix indicator (PMI).

22. The UE of claim 16, wherein the programming further includes instructions to cause the UE to:
receive a configuration of measurement restriction associated with channel measurement.

23. The UE of claim 16, wherein the first subset of the set of NZP CSI-RS resources and the second subset of the set of NZP CSI-RS resources overlap.

24. The UE of claim 16 wherein the programming further includes instructions to cause the UE to:
receive, from a network node, a signaling of the set of NZP CSI-RS resources for the channel measurement and the interference measurement.

25. The UE of claim 16, wherein the programming further includes instructions to cause the UE to:
receive, from a network node, a signaling indicating the first subset of the set of NZP CSI-RS resources, the second subset of the set of NZP CSI-RS resources, and the CSI report.

26. The UE of claim 25, wherein the signaling is received via downlink control information (DCI).

27. The UE of claim 26, wherein the DCI provides a triggering of one or more CSI reporting settings.

28. The UE of claim 25, wherein the signaling is received via media access control (MAC) signaling.

29. The UE of claim 16, wherein the UE further performs the interference measurement in accordance with energy per resource element (EPRE) ratios associated with the second subset of the set of NZP CSI-RS resources.

30. The UE of claim 29, wherein each of the EPRE ratios specifies a corresponding ratio of a corresponding physical downlink shared channel (PDSCH) EPRE to a corresponding NZP CSI-RS EPRE of the second subset of the set of NZP CSI-RS resources.

* * * * *